US 11,610,045 B2

(12) United States Patent
Rimmer et al.

(10) Patent No.: US 11,610,045 B2
(45) Date of Patent: *Mar. 21, 2023

(54) RESOURCE SIZE-BASED CONTENT ITEM SELECTION

(71) Applicant: GOOGLE LLC, Mountain View, CA (US)

(72) Inventors: Graeme John Rimmer, Twickenham (GB); Lewis Jay Hemens, London (GB); Gaurav Bhaya, Sunnyvale, CA (US); Robert Stets, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/393,220

(22) Filed: Aug. 3, 2021

(65) Prior Publication Data

US 2021/0374324 A1 Dec. 2, 2021

Related U.S. Application Data

(63) Continuation of application No. 16/696,558, filed on Nov. 26, 2019, now Pat. No. 11,093,686, which is a
(Continued)

(51) Int. Cl.
*G06F 40/103* (2020.01)
*H04L 65/75* (2022.01)
(Continued)

(52) U.S. Cl.
CPC .......... *G06F 40/103* (2020.01); *G06F 40/131* (2020.01); *G06F 40/186* (2020.01);
(Continued)

(58) Field of Classification Search
CPC ... H04L 29/0809; H04L 65/60; H04L 65/601; G06F 17/211; G06F 16/9577; G06F 17/212
See application file for complete search history.

(56) References Cited

U.S. PATENT DOCUMENTS 4,603,430 A  7/1986  Sacks
5,542,107 A  7/1996  Kay
(Continued)

FOREIGN PATENT DOCUMENTS

CA    2633177 A1   12/2009
CN    101410815 A   4/2009
(Continued)

OTHER PUBLICATIONS

"10 Tips to Improve the Performance of Google Product Listing Ads", Foghorn Labs, retrieved Mar. 18, 2013 from URL: http://www.foghornlabs.com/2012/11/21/product-listing-ads-best-practices/ (5 pages).
(Continued)

*Primary Examiner* — David R Lazaro
(74) *Attorney, Agent, or Firm* — Dority & Manning, P.A.

(57) ABSTRACT

Systems and methods for automatically determining a content item size may be based on a size of a viewport and a width of a parent element. A script may be configured to determine a size of a viewport, determine a width of a parent element of a resource, and determine a content item size based, at least in part, on the size of the view port and the width of the parent element. A dimension of the determined content item size may be used by a content item selection system to determine a set of content items. A content item selection system may select a content item from the deter-
(Continued)

mined set of content items and serve data to effect display of the selected content item in the parent element with the resource.

21 Claims, 14 Drawing Sheets

Related U.S. Application Data continuation of application No. 15/638,312, filed on Jun. 29, 2017, now Pat. No. 10,614,153, which is a continuation-in-part of application No. 14/048,921, filed on Oct. 8, 2013, now Pat. No. 9,703,757, and a continuation-in-part of application No. 15/395,725, filed on Dec. 30, 2016, now Pat. No. 10,630,751, and a continuation-in-part of application No. 15/395,694, filed on Dec. 30, 2016, now Pat. No. 10,431,209.

(60) Provisional application No. 61/884,822, filed on Sep. 30, 2013.

(51) Int. Cl.
  *H04L 67/02* (2022.01)
  *G06F 40/131* (2020.01)
  *G06F 40/186* (2020.01)
  *G06F 40/189* (2020.01)
  *G10L 15/22* (2006.01)

(52) U.S. Cl.
  CPC ............ *G06F 40/189* (2020.01); *H04L 65/75* (2022.05); *H04L 67/02* (2013.01); *G10L 2015/225* (2013.01)

(56) References Cited

U.S. PATENT DOCUMENTS

| | | | |
|---|---|---|---|
| 5,581,686 A | 12/1996 | Koppolu et al. | |
| 5,608,727 A | 3/1997 | Perreault et al. | |
| 6,275,806 B1 | 8/2001 | Pertrushin | |
| 6,684,249 B1 | 1/2004 | Frerichs et al. | |
| 6,771,390 B1 | 8/2004 | Weidlich | |
| 6,857,007 B1 | 2/2005 | Bloomfield | |
| 7,003,729 B1 | 2/2006 | Rajala et al. | |
| 7,219,309 B2 | 5/2007 | Kaasila et al. | |
| 7,222,306 B2 | 5/2007 | Kaasila et al. | |
| 7,337,392 B2 | 2/2008 | Lue | |
| 7,853,255 B2 | 12/2010 | Karaoguz et al. | |
| 7,865,404 B2 | 1/2011 | Peckover | |
| 7,877,696 B2 | 1/2011 | Telek et al. | |
| 7,900,137 B2 | 3/2011 | Ivarsoy et al. | |
| 7,925,138 B2 | 4/2011 | Ando et al. | |
| 7,962,522 B2 | 6/2011 | Norris, III | |
| 7,964,841 B2 | 6/2011 | Imai | |
| 8,151,183 B2 | 4/2012 | Chen et al. | |
| 8,195,133 B2 | 6/2012 | Ramer et al. | |
| 8,195,508 B1* | 6/2012 | Calder ................ G06Q 30/0207 |
| | | | 705/14.1 |
| 8,208,788 B2 | 6/2012 | Ando et al. | |
| 8,265,220 B2 | 9/2012 | Komaili et al. | |
| 8,302,000 B2 | 10/2012 | Uehori | |
| 8,386,386 B1 | 2/2013 | Zhu | |
| 8,402,379 B2 | 3/2013 | Barak | |
| 8,413,070 B1 | 4/2013 | Castrucci et al. | |
| 8,448,074 B2 | 5/2013 | Forutanpour et al. | |
| 8,453,051 B1 | 5/2013 | Weiss et al. | |
| 8,510,237 B2 | 8/2013 | Cascaval et al. | |
| 8,620,748 B1* | 12/2013 | Ruarte .................. G06Q 30/02 |
| | | | 705/14.42 |
| 8,756,523 B2 | 6/2014 | Chiba et al. | |
| 8,903,716 B2 | 12/2014 | Chen et al. | |
| 8,914,753 B2 | 12/2014 | Miyata | |
| 8,938,672 B2 | 1/2015 | Desantis et al. | |
| 9,014,483 B2 | 4/2015 | Ito et al. | |
| 9,164,966 B1 | 10/2015 | Llach et al. | |
| 9,183,319 B2 | 11/2015 | Joel et al. | |
| 9,357,075 B1 | 5/2016 | Kloberdans et al. | |
| 9,542,956 B1 | 1/2017 | Nostrant | |
| 9,703,757 B2* | 7/2017 | Rimmer ............... G06F 40/103 |
| 10,431,209 B2* | 10/2019 | Bhaya ................. G10L 15/1822 |
| 10,467,655 B1* | 11/2019 | Feldman ............ G06Q 30/0201 |
| 10,614,153 B2* | 4/2020 | Rimmer ............... G06F 40/186 |
| 10,630,751 B2* | 4/2020 | Bhaya .................. G06F 40/279 |
| 2001/0016034 A1 | 8/2001 | Singh et al. | |
| 2002/0178005 A1 | 11/2002 | Dusan et al. | |
| 2003/0023656 A1 | 1/2003 | Hutchison et al. | |
| 2004/0056894 A1 | 3/2004 | Zaika et al. | |
| 2004/0098251 A1 | 5/2004 | Vainio et al. | |
| 2004/0141016 A1 | 7/2004 | Fukatsu et al. | |
| 2004/0177316 A1 | 9/2004 | Layzell et al. | |
| 2005/0060709 A1 | 3/2005 | Kanai et al. | |
| 2005/0086345 A1 | 4/2005 | Philyaw et al. | |
| 2005/0096979 A1* | 5/2005 | Koningstein ...... G06Q 30/0277 |
| | | | 705/14.68 |
| 2006/0103667 A1 | 5/2006 | Amit et al. | |
| 2006/0242017 A1 | 10/2006 | Libes et al. | |
| 2006/0253796 A1 | 11/2006 | Wang et al. | |
| 2007/0005433 A1 | 1/2007 | Lee et al. | |
| 2007/0019549 A1 | 1/2007 | Okabe | |
| 2007/0097975 A1 | 5/2007 | Rakers et al. | |
| 2007/0118797 A1 | 5/2007 | Layzell | |
| 2007/0127688 A1 | 6/2007 | Doulton | |
| 2008/0037656 A1 | 2/2008 | Hannuksela | |
| 2008/0114747 A1 | 5/2008 | Goller et al. | |
| 2008/0147388 A1 | 6/2008 | Singh | |
| 2008/0235574 A1 | 9/2008 | Telek et al. | |
| 2009/0085921 A1 | 4/2009 | Do et al. | |
| 2009/0132578 A1 | 5/2009 | Parikh et al. | |
| 2009/0183065 A1 | 7/2009 | Endo et al. | |
| 2009/0234713 A1* | 9/2009 | Bi .......................... G06Q 30/02 |
| | | | 705/14.54 |
| 2009/0279108 A1 | 11/2009 | Hoshi et al. | |
| 2009/0300120 A1 | 12/2009 | Schmidt | |
| 2009/0327032 A1 | 12/2009 | Gunawardana et al. | |
| 2009/0327346 A1* | 12/2009 | Teinila ................... G06Q 30/02 |
| 2010/0011316 A1 | 1/2010 | Sar et al. | |
| 2010/0082780 A1 | 4/2010 | Muilenburg et al. | |
| 2010/0198694 A1* | 8/2010 | Muthukrishnan ...... G06Q 30/02 |
| | | | 705/14.71 |
| 2010/0199209 A1 | 8/2010 | Sueoka et al. | |
| 2010/0199210 A1 | 8/2010 | Harada et al. | |
| 2010/0199211 A1 | 8/2010 | Igawa et al. | |
| 2010/0325430 A1 | 12/2010 | Denninghoff | |
| 2011/0093605 A1 | 4/2011 | Choudhury et al. | |
| 2011/0258562 A1* | 10/2011 | Zhu ........................ G06F 9/451 |
| | | | 715/768 |
| 2012/0060111 A1 | 3/2012 | Kim | |
| 2012/0123856 A1* | 5/2012 | Paunikar ............ G06Q 30/0275 |
| | | | 705/14.48 |
| 2012/0150667 A1* | 6/2012 | Salari ................. G06Q 30/0241 |
| | | | 705/14.73 |
| 2012/0158490 A1 | 6/2012 | Neumeyer et al. | |
| 2012/0159314 A1 | 6/2012 | Schrier et al. | |
| 2012/0165009 A1 | 6/2012 | Oba et al. | |
| 2012/0265528 A1 | 10/2012 | Gruber et al. | |
| 2013/0007602 A1 | 1/2013 | Dougherty et al. | |
| 2013/0021377 A1 | 1/2013 | Doll | |
| 2013/0024757 A1 | 1/2013 | Doll et al. | |
| 2013/0089098 A1 | 4/2013 | Mital et al. | |
| 2013/0117022 A1 | 5/2013 | Chen et al. | |
| 2013/0174047 A1 | 7/2013 | Sivakumar et al. | |
| 2013/0275164 A1 | 10/2013 | Gruber et al. | |
| 2013/0298085 A1 | 11/2013 | Kritt et al. | |
| 2013/0304758 A1 | 11/2013 | Gruber et al. | |
| 2013/0305144 A1 | 11/2013 | Jackson et al. | |
| 2013/0305145 A1 | 11/2013 | Jackson et al. | |
| 2013/0325585 A1* | 12/2013 | Amit ................... G06Q 30/0241 |
| | | | 705/14.66 |
| 2014/0033228 A1 | 1/2014 | Lucash | |
| 2014/0108941 A1* | 4/2014 | Joel ....................... H04L 67/565 |
| | | | 715/738 |

(56) References Cited

U.S. PATENT DOCUMENTS

| | | | |
|---|---|---|---|
| 2014/0122255 A1* | 5/2014 | Snyder | G06Q 30/0276 705/14.72 |
| 2014/0164147 A1* | 6/2014 | Jacobson | G06Q 30/0277 705/14.73 |
| 2014/0180796 A1 | 6/2014 | Sas et al. | |
| 2014/0222436 A1 | 8/2014 | Binder et al. | |
| 2014/0258849 A1* | 9/2014 | Chung | G06F 40/106 715/243 |
| 2014/0281918 A1 | 9/2014 | Wei et al. | |
| 2014/0337127 A1* | 11/2014 | Morel | H04L 67/01 705/14.49 |
| 2015/0019957 A1 | 1/2015 | Ying et al. | |
| 2015/0066479 A1 | 3/2015 | Pasupalak et al. | |
| 2015/0088970 A1 | 3/2015 | Wei et al. | |
| 2015/0095768 A1* | 4/2015 | Rimmer | G06F 40/103 715/238 |
| 2015/0242908 A1 | 8/2015 | Kobyakov et al. | |
| 2015/0254732 A1* | 9/2015 | Snyder | G06Q 30/0276 705/14.72 |
| 2015/0350598 A1 | 12/2015 | Yang et al. | |
| 2015/0379670 A1 | 12/2015 | Koker et al. | |
| 2016/0092699 A1 | 3/2016 | Riva et al. | |
| 2016/0274864 A1 | 9/2016 | Zomet et al. | |
| 2016/0308981 A1 | 10/2016 | Cortes Gomez | |
| 2016/0357717 A1* | 12/2016 | Metz | G06T 13/80 |
| 2017/0068423 A1 | 3/2017 | Napolitano et al. | |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0169817 A1 | 6/2017 | Vanblon et al. | |
| 2017/0250936 A1 | 8/2017 | Rosenberg et al. | |
| 2017/0300456 A1* | 10/2017 | Rimmer | G06F 40/189 |
| 2017/0315962 A1* | 11/2017 | Kovar | H04L 67/02 |
| 2017/0358301 A1 | 12/2017 | Raitio et al. | |
| 2018/0012595 A1 | 1/2018 | Weingartner | |
| 2018/0190271 A1 | 7/2018 | Bhaya et al. | |
| 2018/0191798 A1* | 7/2018 | Zhu | G06F 16/958 |
| 2019/0215556 A1* | 7/2019 | Nugent | H04N 21/812 |
| 2020/0097524 A1* | 3/2020 | Rimmer | H04L 65/75 |
| 2020/0210639 A1* | 7/2020 | Rimmer | G06F 40/189 |

FOREIGN PATENT DOCUMENTS

| | | |
|---|---|---|
| CN | 105654950 | 6/2016 |
| CN | 106033476 A | 10/2016 |
| EP | 1 965 564 A1 | 9/2008 |
| EP | 2 814 244 A1 | 12/2014 |
| JP | 2005-043959 A | 2/2005 |
| JP | 2006-146939 A | 6/2006 |
| JP | 2006-519435 | 8/2006 |
| JP | 2009-512005 A | 3/2009 |
| JP | 2011-066623 A | 3/2011 |
| JP | 2012-073863 A | 4/2012 |
| JP | 2014-132464 A | 7/2014 |
| JP | 2014-531076 A | 11/2014 |
| KR | 10-1029786 B1 | 4/2011 |
| KR | 10-1045589 | 7/2011 |
| KR | 2014-0143768 A | 12/2017 |
| WO | WO-2004/084109 A1 | 9/2004 |
| WO | WO-2011/065564 A1 | 6/2011 |
| WO | WO-2011/088053 A2 | 7/2011 |
| WO | WO-2012/002351 A1 | 1/2012 |
| WO | WO-2014/014745 A2 | 1/2014 |
| WO | WO-2015/179510 A1 | 11/2015 |
| WO | WO-2016/054230 A1 | 4/2016 |
| WO | WO-2016/111881 A1 | 7/2016 |

OTHER PUBLICATIONS

"'Dolphin' attacks fool Amazon, Google voice assistants", BBC News, Sep. 7, 2017 (8 pages).
"Google Assistant SDK", Google Developers Newsletter, Google Developers, developers.google.com, accessed on Jul. 12, 2017 (2 pages).
"Products Feed Specification", Google Merchant Center Help, Google, Inc., retrieved Mar. 18, 2013 from URL: http://www.support.google.com/merchants/bin/answer.py?hl=en&answer=188494#US (6 pages).
"Supported File Formats", Google Merchant Center Help, Google, Inc., retrieved Mar. 18, 2013 from URL: http://www.support.google.com/merchants/bin/answer.py?hl=en&answer=160567 (1 page).
"Walmart and Google to offer voice-enabled shopping", BBC News, Aug. 23, 2017 (10 pages).
Abrams, Brad, "Help users find, interact & re-engage with your app on the Google Assistant", Google Developers Blog, Nov. 15, 2017 (16 pages).
Albrecht, Chris, "Alexa, How Can You Be Used in Restaurants?", The Spoon, Dec. 10, 2017 (6 pages).
Amazon, "Echo Look | Hands-Free Camera and Style Assistant", retrieved Aug. 22, 2017 from URL: https://www.amazon.com/gp/product/B0186JAEWK?ref%5F=cm%5Fsw%5Fr%5Ffa%5Fdp%5Ft2%5FC5oazbJTKCB18&pldnSite=1 (7 pages).
Barr, Jeff, "AWS DeepLens—Get Hands-On Experience with Deep Learning With Our New Video Camera", AWS News Blog, Nov. 29, 2017 (11 pages).
Broussard, Mitchel, "Chatbot-Like Siri Patent Includes Intelligent Image, Video, and Audio Recognition Within Messages", Mac Rumors, May 11, 2017, retrieved Jul. 12, 2017 from URL: https://www.macrumors.com/2017/05/11/siri-chatbot-like-patent/ (11 pages).
Buckland et al., "Amazon's Alexa Takes Open-Source Route to Beat Google Into Cars", Bloomberg, Feb. 27, 2018 (6 pages).
Chen, Lulu Yilun, "Alibaba Challenges Google, Amazon With New Echo-Like Device", Bloomberg, Jul. 5, 2017, retrieved Jul. 12, 2017 from URL: https://www.bloomberg.com/news/articles/2017-07-05/alibaba-challenges-google-amazon-with-new-echo-like-device (3 pages).
Close, Kerry, "Amazon Echo Will Give You These Deals If You Order Through Alexa This Weekend," Time.com, Nov. 18, 2016 (2 pages).
Clover, Juli, "Amazon and Google Want to Turn Their Smart Home Speakers Into Telephone Replacements", MacRumors, Feb. 15, 2017 (5 pages).
Coberly, Cohen, "Apple patent filing reveals potential whispering Siri functionality", Techspot, Dec. 14, 2017 (4 pages).
Collins, et al., "Can Twitter Save Itself?", CNET, Apr. 26, 2017, retrieved Aug. 22, 2017 from URL: https://www.cnet.com/news/twitter-q1-2017-earnings/ (3 pages).
Cook, John, "A Siri for advertising: These mobile ads talk back to you," GeekWire, Apr. 1, 2013, geekwire.com (7 pages).
Corrected Notice of Allowability for U.S. Appl. No. 15/621,806 dated Sep. 17, 2019 (2 pages).
Corrected Notice of Allowability for U.S. Appl. No. 16/818,736 dated Nov. 30, 2020 (3 pages).
Corrected Notice of Allowability for U.S. Appl. No. 16/818,736 dated Nov. 6, 2020 (3 pages).
Corrected Notice of Allowance for U.S. Appl. No. 16/818,736 dated Oct. 6, 2020 (4 pages).
Crist, Ry, "Logitech Harmony's Alexa skill just got a whole lot better", CNET, Jul. 13, 2017 (2 pages).
Estes, Adam Clark, "Amazon's Newest Gadget Is a Tablet That's Also an Echo", Gizmodo, Sep. 19, 2017 (3 pages).
Examination Report for AU Appln. Ser. No. 2017386098 dated Mar. 3, 2020 (3 pages).
Examination Report for EP Appln. Ser. No. 17771624.8 dated Apr. 6, 2021 (5 pages).
Examination Report for EP Appln. Ser. No. 17771624.8 dated Jan. 21, 2020 (6 pages).
Examination Report for IN Appln. Ser. No. 201647007182 dated Jul. 14, 2020 (7 pages).
Examination Report for IN Appln. Ser. No. 201747039648 dated Sep. 21, 2020 (5 pages).
Examination Report for IN Appln. Ser. No. 201747040055 dated Oct. 21, 2020 (6 pages).
Extended European Search Report for EP Appln. Ser. No. 14849752 dated Jun. 4, 2017 (8 pages).

(56) References Cited

OTHER PUBLICATIONS

Extended European Search Report for EP Appln. Ser. No. 19187924.6 dated Sep. 3, 2019 (6 pages).
Fiegerman, Seth, "Alexa, shut up: Raging Against the New Machines", CNN, Aug. 22, 2017 (6 pages).
Final Office Action for U.S. Appl. No. 13/222,380 dated Aug. 16, 2013 (5 pages).
Final Office Action for U.S. Appl. No. 14/048,921 dated Jul. 20, 2016 (21 pages).
Final Office Action for U.S. Appl. No. 15/361,668 dated Jan. 4, 2018 (7 pages).
Final Office Action for U.S. Appl. No. 15/395,725 dated Jun. 28, 2019 (27 pages).
Final Office Action for U.S. Appl. No. 15/590,861 dated Nov. 22, 2019 (14 pages).
First Office Action for CN Appln. Ser. No. 201480054057.8 dated Jan. 17, 2018 (41 pages).
First Office Action for CN Appln. Ser. No. 201780001629.X dated Jul. 14, 2020 (19 pages).
First Office Action for CN Appln. Ser. No. 201780001636.X dated Sep. 8, 2020 (10 pages).
Forrest, Conner, "Essential Home wants to be 'bridge' between Amazon Alexa, Apple's Siri, and Google Assistant," TechRepublic, May 31, 2017 (9 pages).
Foxx, Chris, "Apple reveals HomePod smart speaker", BBC, Jun. 5, 2017 (9 pages).
Gebhart, Andrew, "Google Assistant is spreading, but it needs its own 'Echo Dot'", CNET, May 20, 2017 (6 pages).
Gebhart, Andrew, "Google Home to the Amazon Echo: 'Anything you can do . . .'", CNET, May 18, 2017 (7 pages).
Gibbs, Samuel, "Your Facebook Messenger app is about to be filled with ads", The Guardian, Jul. 12, 2017, retrieved Aug. 22, 2017 from URL: https://www.theguardian.com/technology/2017/jul/12/facebook-messenger-app-adverts (3 pages).
Golgowski, Nina, "This Burger King Ad Is Trying to Control Your Google Home Device", HuffPost, Apr. 12, 2017 (7 pages).
Gurman et al., "Apple Is Manufacturing a Siri Speaker to Outdo Google and Amazon", Bloomberg, May 31, 2017 (3 pages).
Hardwick, Tim, "Facebook Smart Speaker Coming Next Year With 15-inch Touch Panel", MacRumors, Jul. 25, 2017 (5 pages).
Heater, Brian, "Amazon Alexa devices can finally tell voices apart", TechCrunch, Oct. 11, 2017 (6 pages).
International Preliminary Report on Patentability, Ch. I, for PCT Appln. Ser. No. PCT/US2014/057247 dated Apr. 14, 2016 (10 pages).
International Preliminary Report on Patentability, Ch. II, for PCT Appln. Ser. No. PCT/US2017/049766 dated Mar. 13, 2019 (7 pages).
International Preliminary Report on Patentability, Ch. II, for PCT Appln. Ser. No. PCT/US2017/049780 dated Sep. 10, 2018 (7 pages).
International Search Report and Written Opinion for PCT Appln. Ser. No. PCT/US2017/049766 dated Nov. 24, 2017 (11 pages).
International Search Report and Written Opinion for PCT Appln. Ser. No. PCT/US2017/049780 dated Nov. 28, 2017 (11 pages).
International Search Report and Written Opinion on PCT Appln. Ser. No. PCT/US2014/057247 dated Dec. 30, 2014 (19 pages).
Johnson, Khari, "Amazon's Alexa Wants to Learn More About Your Feelings", VentureBeat, Dec. 22, 2017 (4 pages).
Johnston, Lisa, "Amazon Whirlwind: New Echo, Plus, Spot, Connect, Fire TV Take The Stage", Twice, Sep. 27, 2017 (10 pages).
Kelion, Leo, "Amazon revamps Echo smart speaker family", BBC News, Sep. 27, 2017 (11 pages).
Kelion, Leo, "Amazon's race to make Alexa smarter", BBC News, Jul. 28, 2017 (8 pages).
Koetsier, John, "Ads on Amazon Echo: Wendy's, ESPN, And Progressive Among Brands Testing", Forbes, May 11, 2017 (3 pages).
Koetsier, John, "This AI Can Recognize Anger, Awe, Desire, Fear, Hate, Grief, Love . . . By How You Touch Your Phone", Consumer Tech, Aug. 31, 2018 (4 pages).
Krishna, Swapna, "Jim Beam's smart decanter will pour you a shot when you ask", engadget, Nov. 29, 2017 (3 pages).
Lacy, Lisa, "Improving search and advertising are the next frontiers for voice-activated devices", TechCrunch, Dec. 20, 2017 (13 pages).
Lardinois, Frederic, "Google Launches New Ad Unit for Responsive Sites," Google AdSense, http://techcrunch.com/2013/07/31/google-launches-new-ad-unit-for-responsive-sites/, Jul. 31, 2013 (3 pages).
Larson, Selena, "Google Home now recognizes your individual voice", CNN Money, San Francisco, California, Apr. 20, 2017 (3 pages).
Lee, Dave, Take Two for Samsung's troubled Bixby assistant, BBC News, Oct. 19, 2017 (6 pages).
Lee, Dave, "The five big announcements from Google I/O", BBC, May 18, 2017 (11 pages).
Liberatore, Stacy, "Now Alexa knows when you're angry: Amazon's virtual assistant will analyse emotions in user's voices", DailyMail.com, Jun. 13, 2016 (33 pages).
Lund, Pamela, "Mastering Google Product Feeds and Product Listing Ads—Part 1", retrieved Dec. 28, 2013 from URL: http://www.blueglass.com/blog/mastering-google-product-feeds-and-product-listing-ads-part-1/#comments (17 pages).
Machine translation of JP 2012-073863, J-PlatPat, Apr. 12, 2012 (22 pages).
Medeiros, J. "Virtual Assistants Can Detect Your Bad Mood and Do Something About It", Voice Summit Blog, Dec. 1, 2018 (7 pages).
Nieva, Richard, "Google Home and eBay can tell you how much that's worth", CNET, Mar. 8, 2017 (3 pages).
Non-Final Office Action for U.S. Appl. No. 13/222,380 dated Apr. 3, 2013 (22 pages).
Non-Final Office Action for U.S. Appl. No. 14/048,921 dated Nov. 25, 2015 (22 pages).
Non-Final Office Action for U.S. Appl. No. 14/176,845 dated Apr. 2, 2015 (8 pages).
Non-Final Office Action for U.S. Appl. No. 14/870,725 dated May 12, 2016 (13 pages).
Non-Final Office Action for U.S. Appl. No. 15/361,668 dated Aug. 23, 2017 (5 pages).
Non-Final Office Action for U.S. Appl. No. 15/361,668 dated Sep. 22, 2017 (8 pages).
Non-Final Office Action for U.S. Appl. No. 15/395,694 dated Aug. 9, 2018 (8 pages).
Non-Final Office Action for U.S. Appl. No. 15/395,725 dated Nov. 16, 2018 (7 pages).
Non-Final Office Action for U.S. Appl. No. 15/590,861 dated Jul. 25, 2019 (14 pages).
Non-Final Office Action for U.S. Appl. No. 15/590,861 dated Mar. 17, 2020 (6 pages).
Non-Final Office Action for U.S. Appl. No. 15/621,806 dated Sep. 25, 2018 (25 pages).
Non-Final Office Action for U.S. Appl. No. 15/638,312 dated May 16, 2019 (6 pages).
Non-Final Office Action for U.S. Appl. No. 16/544,367 dated Oct. 31, 2019 (11 pages).
Non-Final Office Action for U.S. Appl. No. 16/586,271 dated Jan. 1, 2021 (14 pages).
Non-Final Office Action for U.S. Appl. No. 16/696,558 dated Mar. 31, 2021 (9 pages).
Non-Final Office Action for U.S. Appl. No. 16/816,077 dated Apr. 1, 2021 (9 pages).
Notice of Allowance for CN Appln. Ser. No. 201480054057.8 dated Aug. 30, 2019 (4 pages).
Notice of Allowance for JP Appln. Ser. No. 2016-545216 dated Feb. 4, 2019 (5 pages).
Notice of Allowance for JP Appln. Ser. No. 2017-556886 dated May 27, 2019 (6 pages).
Notice of Allowance for JP Appln. Ser. No. 2017-556911 dated Jun. 10, 2019 (5 pages).
Notice of Allowance for KR Appln. Ser. No. 10-2017-7031379 dated Jul. 31, 2019 (3 pages).

(56) References Cited

OTHER PUBLICATIONS

Notice of Allowance for KR Appln. Ser. No. 10-2017-7031385 dated Jun. 19, 2019 (3 pages).
Notice of Allowance for U.S. Appl. No. 13/222,380 dated Oct. 7, 2013 (9 pages).
Notice of Allowance for U.S. Appl. No. 14/048,921 dated Mar. 13, 2017 (9 pages).
Notice of Allowance for U.S. Appl. No. 14/176,845 dated Aug. 6, 2015 (8 pages).
Notice of Allowance for U.S. Appl. No. 14/870,725 dated Sep. 1, 2016 (7 pages).
Notice of Allowance for U.S. Appl. No. 15/361,668 dated Feb. 9, 2018 (7 pages).
Notice of Allowance for U.S. Appl. No. 15/361,668 dated Jun. 14, 2018 (5 pages).
Notice of Allowance for U.S. Appl. No. 15/361,668 dated May 7, 2018 (5 pages).
Notice of Allowance for U.S. Appl. No. 15/395,694 dated Dec. 10, 2018 (8 pages).
Notice of Allowance for U.S. Appl. No. 15/395,694 dated Jun. 18, 2019 (8 pages).
Notice of Allowance for U.S. Appl. No. 15/395,694 dated Mar. 20, 2019 (8 pages).
Notice of Allowance for U.S. Appl. No. 15/395,725 dated Jan. 21, 2020 (14 pages).
Notice of Allowance for U.S. Appl. No. 15/395,725 dated Oct. 18, 2019 (14 pages).
Notice of Allowance for U.S. Appl. No. 15/590,861 dated Jul. 16, 2020 (5 pages).
Notice of Allowance for U.S. Appl. No. 15/590,861 dated Nov. 12, 2020 (5 pages).
Notice of Allowance for U.S. Appl. No. 15/621,806 dated Aug. 13, 2019 (2 pages).
Notice of Allowance for U.S. Appl. No. 15/621,806 dated Jun. 4, 2019 (5 pages).
Notice of Allowance for U.S. Appl. No. 15/621,806 dated Mar. 21, 2019 (10 pages).
Notice of Allowance for U.S. Appl. No. 15/638,312 dated Jan. 2, 2020 (8 pages).
Notice of Allowance for U.S. Appl. No. 15/638,312 dated Sep. 17, 2019 (8 pages).
Notice of Allowance for U.S. Appl. No. 16/544,367 dated Jan. 29, 2020 (8 pages).
Notice of Allowance for U.S. Appl. No. 16/586,271 dated Jun. 10, 2021 (6 pages).
Notice of Allowance for U.S. Appl. No. 16/696,558 dated Jun. 25, 2021 (7 pages).
Notice of Allowance for U.S. Appl. No. 16/815,077 dated Jul. 2, 2021 (8 pages).
Notice of Allowance for U.S. Appl. No. 16/818,736 dated Oct. 2, 2020 (20 pages).
Notice of Reasons for Rejection for JP 2019-127639 dated Sep. 7, 2020 (6 pages).
Novet, et al., "Amazon is getting ready to bring Alexa to work", CNBC, Nov. 29, 2017 (4 pages).
Office Action for CN Appln. Ser. No. 201480054057.8 dated Mar. 5, 2019 (30 pages).
Office Action for JP Appln. Ser. No. 2017-556886 dated Feb. 8, 2019 (8 pages).
Office Action for JP Appln. Ser. No. 2017-556911 dated Feb. 25, 2019 (7 pages).
Office Action for JP Appln. Ser. No. 2019-039721 dated Mar. 30, 2020 (4 pages).
Office Action for KR Appln. Ser. No. 10-2016-7009406 dated Dec. 15, 2020 (6 pages).
Office Action for KR Appln. Ser. No. 10-2017-7031379 dated Jan. 21, 2019 (7 pages).
Office Action for KR Appln. Ser. No. 10-2017-7031385 dated Feb. 21, 2019 (21 pages).

Office Action for KR Appln. Ser. No. 10-2019-7026715 dated Aug. 2, 2020 (6 pages).
Office Action for KR Appln. Ser. No. 10-2019-7032040 dated Mar. 30, 2020 (9 pages).
Office Action for KR Appln. Ser. No. 10-2021-7002298 dated Apr. 16, 2021 (9 pages).
Office Action for KR Appln. Ser. No. 10-2021-7003319 dated Mar. 12, 2021 (13 pages).
Palladino, Valentina, "Garmin teamed up with Amazon to make a tiny Echo Dot for your car", ars TECHNICA, Oct. 17, 2017 (2 pages).
Perez, Sarah, "Alexa's 'Routines' will combine smart home control with other actions, like delivering your news and weather", TechCrunch, Sep. 28, 2017 (10 pages).
Perez, Sarah, "The first ad network for Alexa Skills shuts down following Amazon's policy changes", TechCrunch, Jun. 15, 2017 (8 pages).
Porter, Jon, "Amazon Echo Show release date, price, news and features", TechRadar, Jun. 26, 2017 (11 pages).
Pringle, Ramona, "'I'm sorry to hear that': Why training Siri to be a therapist won't be easy", CBC News, Sep. 24, 2017 (3 pages).
Purcher, Jack, "Apple Patent Reveals a New Security Feature Coming to Siri", Patently Apple, Apr. 4, 2017, reprinted from http://www.patentlyapple.com/patently-apple/2017/04/apple-patent-reveals-a-new-security-feature-coming-to-siri.html (6 pages).
Purcher, Jack, "The Patent behind Google Home's new Feature of Understanding Different Voices in the Home Surfaced Today", Patently Mobile, Apr. 20, 2017, reprinted from http://www.patentlymobile.com/2017/04/the-patent-behind-google-homes-new-feature-of-understanding-different-voices-in-the-home-surfaced-today.html (3 pages).
Purcher, Jack, "Today Google Home's Virtual Assistant can learn its Owner's voice for Security Reasons like Apple's Patent Pending Idea", Patently Apple, Apr. 20, 2017 (4 pages).
Reasons for Rejection for JP Appln. Ser. No. 2016-545216 dated Aug. 13, 2018 (6 pages).
Roberston, Katie, "Amazon Bets on an Empathetic Alexa", The New York Times, Mar. 3, 2019 (3 pages).
Sablich, Justin, "Planning a Trip With the Help of Google Home", New York Times, dated May 31, 2017 (6 pages).
Second Office Action for CN Appln. Ser. No. 201480054057.8 dated Aug. 30, 2018 (7 pages).
Second Office Action for CN Appln. Ser. No. 201780001636.X dated Jan. 25, 2021 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", CNET, Feb. 13, 2017 (9 pages).
Siegal, Daniel, "IP Attys Load Up Apps' Legal Challenges At 'Silicon Beach'", Law360, Los Angeles, California, Feb. 2, 2017 (4 pages).
Simonite, Tom, "Dinner and a Movie? Amazon Alexa Makes It Easier to Do Both", WIRED, Jun. 5, 2019, retrieved Sep. 23, 2020 from URL: https://www.wired.com/story/dinner-movie-amazon-alexa-makes-easier-do-both/ (5 pages).
Simonite, Tom, "How Alexa, Siri, and Google Assistant Will Make Money Off You," Technology Review, May 31, 2016, technologyreview.com (9 pages).
Simonite, Tom, "How Assistant Could End Up Eating Google's Lunch," Technology Review, Sep. 23, 2016, technologyreview.com (8 pages).
Smith, Dave, "The Amazon Echo got 2 incredibly useful features thanks to a new update", Business Insider, Jun. 1, 2017 (2 pages).
Stackoverflow, "Is it possible for a thread to deadlock itself", 2010, Stackoverflow, accessed from: www.stackoverflow.com/questions/3493441/is-it-possible-for-a-thread-to-deadlock-itself (23 pages).
Stackoverflow, "What is deadlock", 2008, Stackoverflow, accessed from: www.stackoverflow.com/questions/34512/what-is-a-deadlock# (17 pages).
Willens, Max, "For publishers, Amazon Alexa holds promise but not much money (yet)", DIGIDAY, Jul. 6, 2017 (5 pages).

* cited by examiner

RESOURCE SIZE-BASED CONTENT ITEM SELECTION

CROSS-REFERENCE TO RELATED PATENT APPLICATIONS

This application claims the benefit of priority under 35 U.S.C. § 120 as a continuation of U.S. patent application Ser. No. 16/696,558, filed Nov. 26, 2019, which claims the benefit of priority under 35 U.S.C. § 120 as a continuation of U.S. patent application Ser. No. 15/638,312, filed Jun. 29, 2017, which claims the benefit of priority under 35 U.S.C. § 120 as a continuation-in-part of U.S. patent application Ser. No. 14/048,921, filed Oct. 8, 2013, which claims the benefit of priority of U.S. Provisional Application No. 61/884,822, filed Sep. 30, 2013. U.S. patent application Ser. No. 15/638,312, filed Jun. 29, 2017, to which this application claims the benefit of priority as a continuation under 35 U.S.C. § 120, also claims the benefit of priority under 35 U.S.C. § 120 as a continuation-in-part of U.S. patent application Ser. No. 15/395,694, filed Dec. 30, 2016. U.S. patent application Ser. No. 15/638,312, filed Jun. 29, 2017, to which this application claims the benefit of priority as a continuation under 35 U.S.C. § 120, also claims the benefit of priority under 35 U.S.C. § 120 as a continuation-in-part of U.S. patent application Ser. No. 15/395,725, filed Dec. 30, 2016. Each of the foregoing is hereby incorporated by reference herein in its entirety.

BACKGROUND

In a networked environment, such as the Internet or other networks, first-party content providers can provide information for public presentation on resources, for example web pages, documents, applications, and/or other resources. Excessive network transmissions, packet-based or otherwise, of network traffic data between computing devices can prevent a computing device from properly processing the network traffic data, completing an operation related to the network traffic data, or timely responding to the network traffic data. The excessive network transmissions of network traffic data can also complicate data routing or degrade the quality of the response if the responding computing device is at or above its processing capacity, which may result in inefficient bandwidth utilization. The control of network transmissions corresponding to content item objects can be complicated by the large number of content item objects that can initiate network transmissions of network traffic data between computing devices.

SUMMARY

One implementation relates to a method for selecting and serving a content item based on a determined content item size for a resource. The present disclosure is generally directed to improving the efficiency and effectiveness of information transmission and processing over disparate computing resources. It is challenging for disparate computing resource to efficiently process instructions to serve content in, for example, a text or voice-based computing environment. For example, the disparate computing resources may not have access to the same voice models, or may have access to out of date or unsynchronized voice models that can make it challenging to accurately and consistently parse the audio-based instructions.

The method can include serving a script to a client device in response to a request. The script may be configured to determine a size of a viewport, determine a width of a parent element of a resource, and determine a content item size based, at least in part, on the size of the view port and the width of the parent element. The method may further include receiving a dimension of the determined content item size and determining a set of content items based, at least in part, on the received dimension of the determined content item size. The method further includes selecting a content item from the determined set of content items and serving data to effect display of the selected content item in the parent element with the resource.

At least one aspect relates to a system for serving content items that includes one or more processing modules and one or more storage devices storing instructions that, when executed by the one or more processing modules, cause the one or more processing modules to perform several operations. The operations may include serving a script to a client device in response to a request. The script may be configured to determine a size of a viewport, determine a width of a parent element of a resource, rank each predetermined standard size of a set of predetermined standard sizes based, at least in part, on the size of the viewport and the width of the parent element, and determine a content item size based on the ranking of each predetermined standard size of the set of predetermined sizes. The operations may further include receiving a dimension of the determined content item size and determining a set of content items based, at least in part, on the received dimension of the determined content item size. The operations further include selecting a content item from the determined set of content items and serving data to effect display of the selected content item in the parent element with the resource.

At least one aspect relates to a computer-readable storage device storing instructions that, when executed by one or more processing modules, cause the one or more processing modules to perform several operations. The operations include serving a script to a client device in response to a request. The script may be configured to determine a size of a viewport, determine a width of a parent element of a resource, rank each predetermined standard size of a set of predetermined standard sizes based, at least in part, on an area of each predetermined standard size and a ratio match value, and determine a content item size based on the ranking of each predetermined standard size of the set of predetermined sizes. The operations may further include receiving a dimension of the determined content item size and determining a set of content items based, at least in part, on the received dimension of the determined content item size. The operations further include selecting a content item from the determined set of content items and serving data to effect display of the selected content item in the parent element with the resource.

At least one aspect related to a system to serve content. The system can include a data processing system including one or more processing modules and memory. The data processing system can receive, from a client device, a request for content responsive to a resource loading for presentation via the client. The system can determine a size of a slot and a parameter of a resource. The system can rank each predetermined standard size of a set of predetermined standard sizes based, at least in part, on the size of the slot and the parameter of the resource. The system can determine a content item size based on the ranking of each predetermined standard size of the set of predetermined standard sizes. The system can determine a set of content items based, at least in part, on the content item size. The system can select, from the set of content items based on the content item size, a content item. The system can serve, to the client device, data to effect presentation of the content item in the resource.

At least one aspect related to a method of serving content. The method can be performed by a data processing system including one or more processing modules and memory. The method can include receiving, from a client device, a request for content responsive to a resource loading for presentation via the client. The method can include determining a size of a slot and a parameter of a resource. The method can include ranking each predetermined standard size of a set of predetermined standard sizes based, at least in part, on the size of the slot and the parameter of the resource. The method can include determining a content item size based on the ranking of each predetermined standard size of the set of predetermined standard sizes. The method can include determining a set of content items based, at least in part, on the content item size. The method can include selecting, from the set of content items based on the content item size, a content item. The method can include serving, to the client device, data to effect presentation of the content item in the resource.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1A:
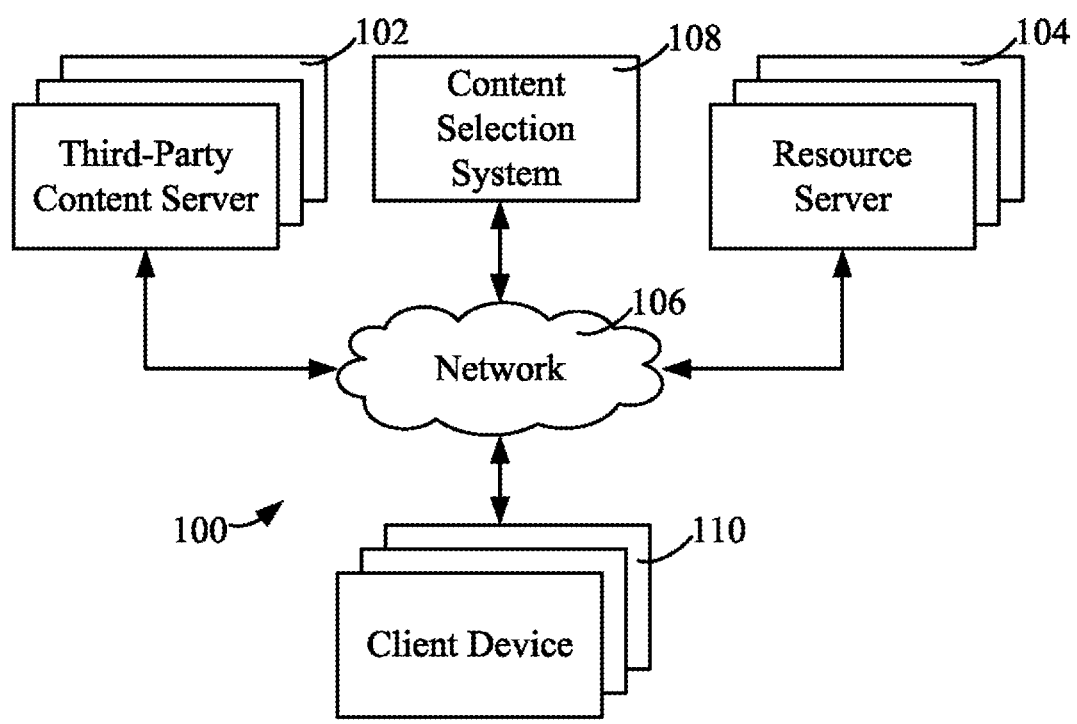
FIG. 1A is a block diagram depicting an implementation of a system for providing information via a network.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Following below are more detailed descriptions of various concepts related to, and implementations of, methods, apparatuses, and systems for providing information on a computer network. The various concepts introduced above and discussed in greater detail below may be implemented in any of numerous ways, as the described concepts are not limited to any particular manner of implementation. Examples of specific implementations and applications are provided primarily for illustrative purposes.

A computing device (e.g., a client device) can view a resource, such as a web page, via the Internet by communicating with a server, such as a web page server, corresponding to that resource. The resource includes first-party content that is the subject of the resource from a first-party content provider, as well as additional third-party provided content, such as digital content or other content. Website visitors use a wide range of devices with a wide range of screen sizes for viewing web pages. Accordingly, the presentation of the resource may be modified based on the type of device requesting the resource (e.g., a desktop computer, a tablet computer, a mobile device, etc.), a screen size of the device requesting the resource, and/or a viewable size of the first-party content on the client device. Such responsive web design enables the resource to be displayed in an aesthetically pleasing manner to an end user based on the client device and/or how the first-party content is being displayed on the client device. In some implementations, website owners manually decide what sizes of third-party content items they want for to be displayed with their web pages. That is, the presentation of third-party content items may be specified for the different types of devices requesting the resource, the different screen sizes, and/or the different viewable sizes of the first-party content such that the third-party content item does not dominate the viewable area of the device, yet is not overly small relative to the first-party content of the resource. For example, a large third-party content item that looks good and converts well on a large desktop screen may be too large on a mobile device. Conversely, a third-party content item that is of a small size, such as 320 pixels (px) by 50 pixels, designed to be presented on small displays of mobile devices may not be noticeable on a large desktop screen. Thus, it may be useful to automatically determine the size for a content item to be presented with the resource and to select and serve a third-party content item based on the determined size, as will be described in greater detail herein.

The selection and serving of the third-party content item may be in response to a request to access a web page from a web page server and/or a client device that communicates with a data processing system, such as a content item selection system, to request a content item to be presented with the requested web page. The content item selection system can select a third-party content item and provide data to effect presentation of the content item with the requested web page on a display of the client device. In some instances, the content item is selected and served with a resource associated with a search query. For example, a search engine may return search results on a search results web page and may include third-party content items related to the search query in one or more content item slots of the search results web page.

In some instances, a device identifier is associated with the client device. The device identifier may include a randomized number associated with the client device to identify the device during subsequent requests for resources and/or content items. In some instances, the device identifier is configured to store and/or cause the client device to transmit information related to the client device to the content item selection system and/or resource server (e.g., a web browser type, an operating system, prior resource requests, prior content item requests, etc.).

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

A third-party content provider, when providing third-party content items for presentation with requested resources via the Internet or other network, may utilize a content item management service to control or otherwise influence the selection and serving of the third-party content items. For instance, a third-party content provider may specify selection criteria (such as keywords) and corresponding bid values that are used in the selection of the third-party content items. The bid values may be utilized by the content item selection system in a content selection process to select and serve content items for display with a resource. For example, a third-party content provider may place a bid in the content selection process that corresponds to an agreement to pay a certain amount of money if a user interacts with the provider's content item (e.g., the provider agrees to pay $3 if a user clicks on the provider's content item). In other implementations, a third-party content provider may place a bid in the content selection process that corresponds to an agreement to pay a certain amount of money if the content item is selected and served (e.g., the provider agrees to pay $0.005 each time a content item is selected and served). In some instances, the content item selection system uses content item interaction data to determine the performance of the third-party content provider's content items. For example, users may be more inclined to click on third-party content items on certain web pages over others. Accordingly, bids to place the third-party content items may be higher for high-performing web pages, categories of web pages, and/or other criteria, while the bids may be lower for low-performing web pages, categories of web pages, and/or other criteria.

In some instances, a web page or other resource (such as, for example, an application) includes one or more content item slots or units in which a selected and served third-party content item may be displayed. The code (e.g., JavaScript®, HTML, etc.) defining a content item slot for a web page or other resource may include instructions to request a third-party content item from the content item selection system to be displayed with the web page. Such code may be executed by the client device to perform other tasks prior to requesting the third-party content item. For example, the code may be configured to automatically determine the size for a content item to be presented with the resource based on a type of the client device, a screen size of the client device, a viewable size of the first-party content on the client device, and/or the size of a parent element to the content item slot or unit of the resource such that the request sent to the content item selection system results in an appropriately sized content item for the resource presented on the display of the client device. Such responsive content item slots or units provide first-party content providers with an easy solution and implementation for presenting third-party content items without having to manually define the sizes for content items for the various sizes that the first-party content may be displayed at.

While the foregoing has provided an overview of a content item selection system that can automatically determine a size for a content item, more specific implementations and methods for such a system will now be described.

FIG. 1A is a block diagram of an implementation of a system 100 for providing information via at least one computer network such as the network 106. The network 106 may include a local area network (LAN), wide area network (WAN), a telephone network, such as the Public Switched Telephone Network (PSTN), a wireless link, an intranet, the Internet, or combinations thereof. The system 100 can also include at least one data processing system or processing module, such as a content item selection system 108. The content item selection system 108 can include at least one logic device, such as a computing device having a processing module, to communicate via the network 106, for example with a resource server 104, a client device 110, and/or a third-party content server 102. The content item selection system 108 can include one or more data processors, such as a content placement processor, configured to execute instructions stored in a memory device to perform one or more operations described herein. In other words, the one or more data processors and the memory device of the content item selection system 108 may form a processing module. The data processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions.

The instructions may include code from any suitable computer programming language such as, but not limited to, ActionScript®, C, C++, C#, HTML, Java®, JavaScript®, Perl®, Python®, Visual Basic®, and XML. The processing module may process instructions and output data to effect a presentation of one or more content items to the resource server 104 and/or the client device 110. In addition to the processing module, the content item selection system 108 may include one or more databases configured to store data. The content item selection system 108 may also include an interface configured to receive data via the network 106 and to provide data from the content item selection system 108 to any of the other devices on the network 106. The content item selection system 108 can include a server, such as a content server or otherwise.

The client device 110 can include one or more devices such as a computer, laptop, desktop, smart phone, tablet, personal digital assistant, set-top box for a television set, a smart television, or server device configured to communicate with other devices via the network 106. The device may be any form of portable electronic device that includes a data processor and a memory, i.e., a processing module. The memory may store machine instructions that, when executed by a processor, cause the processor to perform one or more of the operations described herein. The memory may also store data to effect presentation of one or more resources, content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C#, Java®, ActionScript®, JavaScript®, JSON, Perl®, HTML, HTML5, XML, Python®, and Visual Basic®.

The client device 110 can execute a software application (e.g., a web browser or other application) to retrieve content from other computing devices over network 106. Such an application may be configured to retrieve first-party content from a resource server 104. In some cases, an application running on the client device 110 may itself be first-party content (e.g., a game, a media player, etc.). In one implementation, the client device 110 may execute a web browser application which provides a browser window on a display of the client device. The web browser application that provides the browser window may operate by receiving input of a uniform resource locator (URL), such as a web address, from an input device (e.g., a pointing device, a keyboard, a touch screen, or another form of input device). In response, one or more processors of the client device executing the instructions from the web browser application may request data from another device connected to the network 106 referred to by the URL address (e.g., a resource server 104). The other device may then provide webpage data and/or other data to the client device 110, which causes visual indicia to be displayed by the display of the client device 110. Accordingly, the browser window displays the retrieved first-party content, such as webpages from various websites, to facilitate user interaction with the first-party content.

The resource server 104 can include a computing device, such as a server, configured to host a resource, such as a webpage or other resource (e.g., articles, comment threads, music, video, graphics, search results, information feeds, etc.). The resource server 104 may be a computer server (e.g., a file transfer protocol (FTP) server, file sharing server, web server, etc.) or a combination of servers (e.g., a data center, a cloud computing platform, etc.). The resource server 104 can provide resource data or other content (e.g., text documents, PDF files, and other forms of electronic documents) to the client device 110. In one implementation, the client device 110 can access the resource server 104 via the network 106 to request data to effect presentation of a resource of the resource server 104.

One or more third-party content providers may have third-party content servers 102 to directly or indirectly provide data for third-party content items to the content item selection system 108 and/or to other computing devices via network 106. The content items may be in any format that may be presented on a display of a client device 110, for example, graphical, text, image, audio, video, etc. The content items may also be a combination (hybrid) of the formats. The content items may be banner content items, interstitial content items, pop-up content items, rich media content items, hybrid content items, etc. The content items may also include embedded information such as hyperlinks, metadata, links, machine-executable instructions, annotations, etc. In some instances, the third-party content servers 102 may be integrated into the content item selection system 108 and/or the data for the third-party content items may be stored in a database of the content item selection system 108.

In one implementation, the content item selection system 108 can receive, via the network 106, a request for a content item to present with a resource. The received request may be received from a resource server 104, a client device 110, and/or any other computing device. The resource server 104 may be owned or ran by a first-party content provider that may include instructions for the content item selection system 108 to provide third-party content items with one or more resources of the first-party content provider on the resource server 104. In one implementation, the resource may include a webpage. The client device 110 may be a computing device operated by a user (represented by a device identifier), which, when accessing a resource of the resource server 104, can make a request to the content item selection system 108 for one or more content items to be presented with the resource, for instance. The content item request can include requesting device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, etc.) and resource information (e.g., URL of the requested resource, one or more keywords of the content of the requested resource, text of the content of the resource, a title of the resource, a category of the resource, a type of the resource, a property of the resource, an interactivity level of the resource, a ranking of the resource, a popularity of the resource, a category of a publisher associated with the resource, a type of a publisher associated with the resource, a property of a publisher associated with the resource, etc.). The information or parameters that the content item selection system 108 receives can include a HyperText Transfer Protocol (HTTP) cookie which contains a device identifier (e.g., a random number) that represents the client device 110. In some implementations, the device and/or the resource information or parameters may be appended to a content item request URL (e.g., /page/contentitem?devid=abc123& devnfo=A34r0). In some implementations, the device and/or the resource information or parameters may be encoded prior to being appended the content item request URL. The requesting device and/or the resource information or parameters may be utilized by the content item selection system 108 to select third-party content items to be served with the requested resource and presented on a display of a client device 110. In some implementations, a height value and a width value may be included with the content item request such that the content item selection system 108 may use the height and width as part of the selection of a content item.

In some instances, a resource of a resource server 104 may include a search engine feature. The search engine feature may receive a search query (e.g., a string of text) via an input feature (an input text box, etc.). The search engine may search an index of documents (e.g., other resources, such as webpages, etc.) for relevant search results based on the search query. The search results may be transmitted as a second resource to present the relevant search results, such as a search result webpage, on a display of a client device 110. The search results may include webpage titles, hyperlinks, etc. One or more third-party content items may also be presented with the search results in a content item slot of the search result webpage. Accordingly, the resource server 104 and/or the client device 110 may request one or more content items from the content item selection system 108 to be presented in the content item slot of the search result webpage. The content item request may include additional information, such as the client device information, the resource information, a quantity of content items, a format for the content items, the search query string, keywords of the search query string, information related to the query (e.g., geographic location information and/or temporal information), etc. In some implementations, a delineation may be made between the search results and the third-party content items to avert confusion.

In some implementations, the third-party content provider may manage the selection and serving of content items by content item selection system 108. For example, the third-party content provider may set bid values and/or selection criteria via a user interface that may include one or more content item conditions or constraints regarding the serving of content items. A third-party content provider may specify that a content item and/or a set of content items should be selected and served for client devices 110 having device identifiers associated with a certain geographic location or region, a certain language, a certain operating system, a certain web browser, etc. In another implementation, the third-party content provider may specify that a content item or set of content items should be selected and served when the resource, such as a webpage, document, etc., contains content that matches or is related to certain keywords, phrases, etc. The third-party content provider may set a single bid value for several content items, set bid values for subsets of content items, and/or set bid values for each content item. The third-party content provider may also set the types of bid values, such as bids based on whether a user clicks on the third-party content item, whether a user performs a specific action based on the presentation of the third-party content item, whether the third-party content item is selected and served, and/or other types of bids.

Figure 1B:
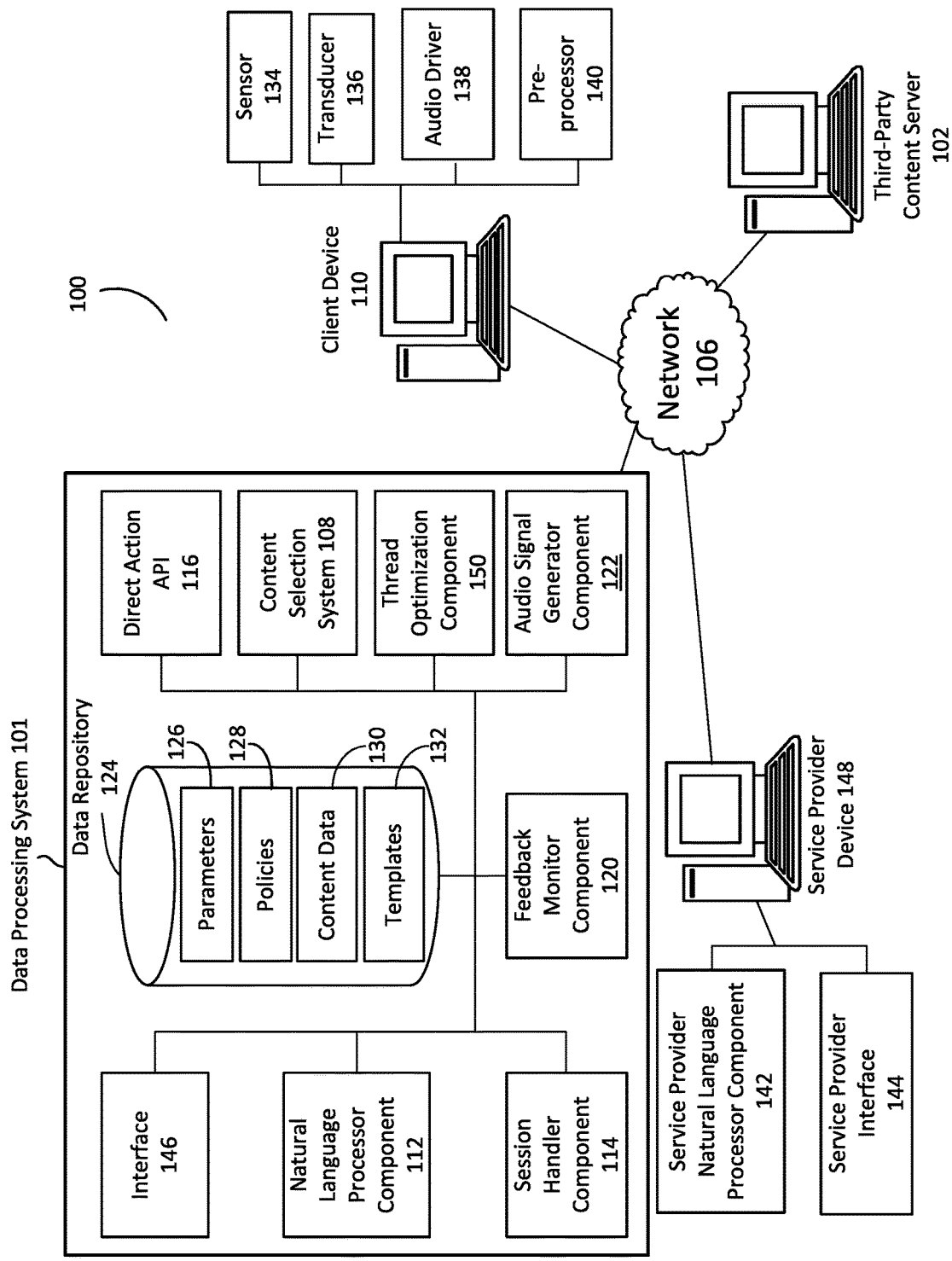
FIG. 1B is an illustration of a feedback control system for data transmissions over a computer network.

FIG. 1B illustrates an example feedback control system 100 for data transmissions over a computer network. The system 100 can include content selection infrastructure. The system 100 can include a data processing system 101. The data processing system 101 can communicate with one or more of a content provider computing device 106, service provider computing device 108, or client device 110 via a network 106. The network 106 can include computer networks such as the Internet, local, wide, metro, or other area networks, intranets, satellite networks, and other communication networks such as voice or data mobile telephone networks. The network 106 can be used to access information resources such as web pages, web sites, domain names, or uniform resource locators that can be presented, output, rendered, or displayed on at least one client device 110, such as a laptop, desktop, tablet, personal digital assistant, smart phone, portable computers, or speaker. For example, via the network 106 a user of the client device 110 can access information or data provided by a service provider 108 or content provider 106.

The network 106 can include or constitute a display network, e.g., a subset of information resources available on the internet that are associated with a content placement or search engine results system, or that are eligible to include third party content items as part of a content item placement campaign. The network 106 can be used by the data processing system 101 to access information resources such as web pages, web sites, domain names, or uniform resource locators that can be presented, output, rendered, or displayed by the client device 110. For example, via the network 106 a user of the client device 110 can access information or data provided by the content provider computing device 106 or the service provider computing device 108.

The network 106 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 106 may include a wireless link, such as an infrared channel or satellite band. The topology of the network 106 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 101. The data processing system 101 can include at least one logic device such as a computing device having a processor to communicate via the network 106, for example with the client device 110, the third-party content server 102 (content provider 106), or the service provider device 148 (or service provider 108). The data processing system 101 can include at least one computation resource, server, processor or memory. For example, the data processing system 101 can include a plurality of computation resources or servers located in at least one data center. The data processing system 101 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 101 components, including servers and storage systems, and coupling them with advanced system management tools allows more efficient use of server resources, which saves power and processing requirements and reduces bandwidth usage.

The system 100 can include, access, or otherwise interact with at least one service provider device 148. The service provider device 148 can include at least one logic device such as a computing device having a processor to communicate via the network 106, for example with the client device 110, the data processing system 101, or the content provider 106. The service provider device 148 can include at least one computation resource, server, processor or memory. For example, service provider device 148 can include a plurality of computation resources or servers located in at least one data center. The service provider device 148 can include one or more component or functionality of the data processing system 101.

The content provider computing device 106 can provide audio based content items for display by the client device 110 as an audio output content item. The content item can include an offer for a good or service, such as a voice based message that states: "Would you like me to order you a taxi?" For example, the content provider computing device 155 can include memory to store a series of audio content items that can be provided in response to a voice based query. The content provider computing device 106 can also provide audio based content items (or other content items) to the data processing system 101 where they can be stored in the data repository 124. The data processing system 101 can select the audio content items and provide (or instruct the content provider client device 110 to provide) the audio content items to the client device 110. The audio based content items can be exclusively audio or can be combined with text, image, or video data.

The service provider device 148 can include, interface, or otherwise communicate with at least one service provider natural language processor component 142 and a service provider interface 144. The service provider computing device 108 can include at least one service provider natural language processor (NLP) component 142 and at least one service provider interface 144. The service provider NLP component 142 (or other components such as a direct action API of the service provider computing device 108) can engage with the client device 110 (via the data processing system 101 or bypassing the data processing system 101) to create a back-and-forth real-time voice or audio based conversation (e.g., a session) between the client device 110 and the service provider computing device 108. The service provider NLP 142 can include one or more function or feature as the NLP component 112 of the data processing system 101. For example, the service provider interface 144 can receive or provide data messages to the direct action API 116 of the data processing system 101. The service provider computing device 108 and the content provider computing device 106 can be associated with the same entity. For example, the content provider computing device 106 can create, store, or make available content items for a car sharing service, and the service provider computing device 108 can establish a session with the client computing device 106 to arrange for a delivery of a taxi or car of the car share service to pick up the end user of the client device 110. The data processing system 101, via the direct action API 116, the NLP component 112 or other components can also establish the session with the client computing device, including or bypassing the service provider client device 110, to arrange for example for a delivery of a taxi or car of the car share service.

The client device 110 can include, interface, or otherwise communicate with at least one sensor 134, transducer 136, audio driver 138, or pre-processor 140. The sensor 134 can include, for example, an ambient light sensor, proximity sensor, temperature sensor, accelerometer, gyroscope, motion detector, GPS sensor, location sensor, microphone, or touch sensor. The transducer 136 can include a speaker or a microphone. The audio driver 138 can provide a software interface to the hardware transducer 136. The audio driver can execute the audio file or other instructions provided by the data processing system 101 to control the transducer 136 to generate a corresponding acoustic wave or sound wave. The pre-processor 140 can be configured to detect a keyword and perform an action based on the keyword. The pre-processor 140 can filter out one or more terms or modify the terms prior to transmitting the terms to the data processing system 101 for further processing. The pre-processor 140 can convert the analog audio signals detected by the microphone into a digital audio signal, and transmit one or more data packets carrying the digital audio signal to the data processing system 101 via the network 106. In some cases, the pre-processor 140 can transmit data packets carrying some or all of the input audio signal responsive to detecting an instruction to perform such transmission. The instruction can include, for example, a trigger keyword or other keyword or approval to transmit data packets comprising the input audio signal to the data processing system 101.

The client device 110 can be associated with an end user that enters voice queries as audio input into the client device 110 (via the sensor 134) and receives audio output in the form of a computer generated voice that can be provided from the data processing system 101 (or the content provider computing device 106 or the service provider computing device 108) to the client device 110, output from the transducer 136 (e.g., a speaker). The computer generated voice can include recordings from a real person or computer generated language.

The data repository 124 can include one or more local or distributed databases, and can include a database management system. The data repository 124 can include computer data storage or memory and can store one or more parameters 126, one or more policies 128, content data 130, or templates 132 among other data. The parameters 126, policies 128, and templates 132 can include information such as rules about a voice based session between the client device 110 and the data processing system 101 (or the service provider computing device 108). The content data 130 can include content items for audio output or associated metadata, as well as input audio messages that can be part of one or more communication sessions with the client device 110.

The data processing system 101 can include a content placement system having at least one computation resource or server. The data processing system 101 can include, interface, or otherwise communicate with at least one interface 146. The data processing system 101 can include, interface, or otherwise communicate with at least one natural language processor component 112. The data processing system 101 can include, interface, or otherwise communicate with at least one direct action application programming interface ("API") 116. The data processing system 101 can include, interface, or otherwise communicate with at least one session handler 114. The data processing system 101 can include, interface, or otherwise communicate with at least one content selection system 108. The data processing system 101 can include, interface, or otherwise communicate with at least one thread optimization component 150. The data processing system 101 can include, interface, or otherwise communicate with at least one feedback monitor component 120. The data processing system 101 can include, interface, or otherwise communicate with at least one audio signal generator 122. The data processing system 101 can include, interface, or otherwise communicate with at least one data repository 124. The at least one data repository 124 can include or store, in one or more data structures or databases, parameters 126, policies 128, content data 130, or templates 132. Parameters 126 can include, for example, thresholds, distances, time intervals, durations, scores, or weights. Content data 130 can include, for example, content campaign information, content groups, content selection criteria, content item objects or other information provided by a content provider 106 or obtained or determined by the data processing system to facilitate content selection. The content data 130 can include, for example, historical performance of a content campaign.

The interface 146, natural language processor component 112, session handler 114, direct action API 116, content selection system 108, feedback monitor component 120, or audio signal generator component 122 can each include at least one processing unit or other logic device such as programmable logic array engine, or module configured to communicate with the database repository or database 124. The interface 146, natural language processor component 112, session handler 114, direct action API 116, content selection system 108, feedback monitor component 120, audio signal generator component 122 and data repository 124 can be separate components, a single component, or part of the data processing system 101. The system 100 and its components, such as a data processing system 101, can include hardware elements, such as one or more processors, logic devices, or circuits.

The data processing system 101 can obtain anonymous computer network activity information associated with a plurality of computing devices 104. A user of a client device 110 can affirmatively authorize the data processing system 101 to obtain network activity information corresponding to the user's client device 110. For example, the data processing system 101 can prompt the user of the client device 110 for consent to obtain one or more types of network activity information. The identity of the user of the client device 110 can remain anonymous and the client device 110 can be associated with a unique identifier (e.g., a unique identifier for the user or the computing device provided by the data processing system or a user of the computing device). The data processing system can associate each observation with a corresponding unique identifier.

A content provider 106 can establish an electronic content campaign. The electronic content campaign can be stored as content data 130 in data repository 124. An electronic content campaign can refer to one or more content groups that correspond to a common theme. A content campaign can include a hierarchical data structure that includes content groups, content item data objects, and content selection criteria. To create a content campaign, content provider 106 can specify values for campaign level parameters of the content campaign. The campaign level parameters can include, for example, a campaign name, a preferred content network for placing content item objects, a value of resources to be used for the content campaign, start and end dates for the content campaign, a duration for the content campaign, a schedule for content item object placements, language, geographical locations, type of computing devices on which to provide content item objects. In some cases, an impression can refer to when a content item object is fetched from its source (e.g., data processing system 101 or content provider 106), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the content item object for display on the client device 110. In some cases, an impression can refer to a viewable or audible impression; e.g., the content item object is at least partially (e.g., 20%, 30%, 30%, 40%, 50%, 60%, 70%, or more) viewable on a display device of the client device 110, or audible via a speaker 136 of the client device 110. A click or selection can refer to a user interaction with the content item object, such as a voice response to an audible impression, a mouse-click, touch interaction, gesture, shake, audio interaction, or keyboard click. A conversion can refer to a user taking a desired action with respect to the content item objection; e.g., purchasing a product or service, completing a survey, visiting a physical store corresponding to the content item, or completing an electronic transaction.

The content provider 106 can further establish one or more content groups for a content campaign. A content group includes one or more content item objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the content item in the presence of the negative keyword on main content), bids for keywords, or parameters associated with the bid or content campaign.

To create a new content group, the content provider can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the content provider 106 can use to capture a topic or subject matter for which content item objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The content provider 106 can provide one or more keywords and content item objects to each content group. Keywords can include terms that are relevant to the product or services of associated with or identified by the content item objects. A keyword can include one or more terms or phrases. For example, the car dealership can include "sports car," "V-6 engine," "four-wheel drive," "fuel efficiency," as keywords for a content group or content campaign. In some cases, negative keywords can be specified by the content provider to avoid, prevent, block, or disable content placement on certain terms or keywords. The content provider can specify a type of matching, such as exact match, phrase match, or broad match, used to select content item objects.

The content provider 106 can provide one or more keywords to be used by the data processing system 101 to select a content item object provided by the content provider 106. The content provider 106 can identify one or more keywords to bid on, and further provide bid amounts for various keywords. The content provider 106 can provide additional content selection criteria to be used by the data processing system 101 to select content item objects. Multiple content providers 106 can bid on the same or different keywords, and the data processing system 101 can run a content selection process responsive to receiving an indication of a keyword of an electronic message.

The content provider 106 can provide one or more content item objects for selection by the data processing system 101. The data processing system 101 (e.g., via content selection system 108) can select the content item objects when a content placement opportunity becomes available that matches the resource allocation, content schedule, maximum bids, keywords, and other selection criteria specified for the content group. Different types of content item objects can be included in a content group, such as a voice content item, audio content item, a text content item, an image content item, video content item, multimedia content item, or content item link. Upon selecting a content item, the data processing system 101 can transmit the content item object for rendering on a client device 110 or display device of the client device 110. Rendering can include displaying the content item on a display device, or playing the content item via a speaker of the client device 110. The data processing system 101 can provide instructions to a client device 110 to render the content item object. The data processing system 101 can instruct the client device 110, or an audio driver 138 of the client device 110, to generate audio signals or acoustic waves.

The data processing system 101 can include an interface component 110 designed, configured, constructed, or operational to receive and transmit information using, for example, data packets. The interface 146 can receive and transmit information using one or more protocols, such as a network protocol. The interface 146 can include a hardware interface, software interface, wired interface, or wireless interface. The interface 146 can facilitate translating or formatting data from one format to another format. For example, the interface 146 can include an application programming interface that includes definitions for communicating between various components, such as software components.

The data processing system 101 can include an application, script or program installed at the client device 110, such as an app to communicate input audio signals to the interface 146 of the data processing system 101 and to drive components of the client computing device to render output audio signals. The data processing system 101 can receive data packets or other signal that includes or identifies an audio input signal. For example, the data processing system 101 can execute or run the NLP component 112 to receive or obtain the audio signal and parse the audio signal. For example, the NLP component 112 can provide for interactions between a human and a computer. The NLP component 112 can be configured with techniques for understanding natural language and allowing the data processing system 101 to derive meaning from human or natural language input. The NLP component 112 can include or be configured with technique based on machine learning, such as statistical machine learning. The NLP component 112 can utilize decision trees, statistical models, or probabilistic models to parse the input audio signal. The NLP component 112 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP component 112 converts the audio input signal into recognized text by comparing the input signal against a stored, representative set of audio waveforms (e.g., in the data repository 124) and choosing the closest matches. The set of audio waveforms can be stored in data repository 124 or other database accessible to the data processing system 101. The representative waveforms are generated across a large set of users, and then may be augmented with speech samples from the user. After the audio signal is converted into recognized text, the NLP component 112 matches the text to words that are associated, for example via training across users or through manual specification, with actions that the data processing system 101 can serve.

The audio input signal can be detected by the sensor 134 or transducer 136 (e.g., a microphone) of the client device 110. Via the transducer 136, the audio driver 138, or other components the client device 110 can provide the audio input signal to the data processing system 101 (e.g., via the network 106) where it can be received (e.g., by the interface 146) and provided to the NLP component 112 or stored in the data repository 124.

The NLP component 112 can obtain the input audio signal. From the input audio signal, the NLP component 112 can identify at least one request or at least one trigger keyword corresponding to the request. The request can indicate intent or subject matter of the input audio signal. The trigger keyword can indicate a type of action likely to be taken. For example, the NLP component 112 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The NLP component 112 can parse the input audio signal to identify, determine, retrieve, or otherwise obtain the request and the trigger keyword. For instance, the NLP component 112 can apply a semantic processing technique to the input audio signal to identify the trigger keyword or the request. The NLP component 112 can apply the semantic processing technique to the input audio signal to identify a trigger phrase that includes one or more trigger keywords, such as a first trigger keyword and a second trigger keyword. For example, the input audio signal can include the sentence "I need someone to do my laundry and my dry cleaning." The NLP component 112 can apply a semantic processing technique, or other natural language processing technique, to the data packets comprising the sentence to identify trigger phrases "do my laundry" and "do my dry cleaning". The NLP component 112 can further identify multiple trigger keywords, such as laundry, and dry cleaning. For example, the NLP component 112 can determine that the trigger phrase includes the trigger keyword and a second trigger keyword.

The NLP component 112 can filter the input audio signal to identify the trigger keyword. For example, the data packets carrying the input audio signal can include "It would be great if I could get someone that could help me go to the airport", in which case the NLP component 112 can filter out one or more terms as follows: "it", "would", "be", "great", "if", "I", "could", "get", "someone", "that", "could", or "help". By filtering out these terms, the NLP component 112 may more accurately and reliably identify the trigger keywords, such as "go to the airport" and determine that this is a request for a taxi or a ride sharing service.

In some cases, the NLP component can determine that the data packets carrying the input audio signal includes one or more requests. For example, the input audio signal can include the sentence "I need someone to do my laundry and my dry cleaning." The NLP component 112 can determine this is a request for a laundry service and a dry cleaning service. The NLP component 112 can determine this is a single request for a service provider that can provide both laundry services and dry cleaning services. The NLP component 112 can determine that this is two requests; a first request for a service provider that performs laundry services, and a second request for a service provider that provides dry cleaning services. In some cases, the NLP component 112 can combine the multiple determined requests into a single request, and transmit the single request to a service provider device 148. In some cases, the NLP component 112 can transmit the individual requests to respective service provider devices 108, or separately transmit both requests to the same service provider device 148.

The data processing system 101 can include a direct action API 116 designed and constructed to generate, based on the trigger keyword, an action data structure responsive to the request. Processors of the data processing system 101 can invoke the direct action API 116 to execute scripts that generate a data structure to a service provider device 148 to request or order a service or product, such as a car from a car share service. The direct action API 116 can obtain data from the data repository 124, as well as data received with end user consent from the client device 110 to determine location, time, user accounts, logistical or other information to allow the service provider device 148 to perform an operation, such as reserve a car from the car share service. Using the direct action API 116, the data processing system 101 can also communicate with the service provider device 148 to complete the conversion by in this example making the car share pick up reservation.

The direct action API 116 can execute a specified action to satisfy the end user's intention, as determined by the data processing system 101. Depending on the action specified in its inputs, the direct action API 116 can execute code or a dialog script that identifies the parameters required to fulfill a user request. Such code can look-up additional information, e.g., in the data repository 124, such as the name of a home automation service, or it can provide audio output for rendering at the client device 110 to ask the end user questions such as the intended destination of a requested taxi. The direct action API 116 can determine necessary parameters and can package the information into an action data structure, which can then be sent to another component such as the content selection system 108 or to the service provider computing device 108 to be fulfilled.

The direct action API 116 can receive an instruction or command from the NLP component 112, or other component of the data processing system 101, to generate or construct the action data structure. The direct action API 116 can determine a type of action in order to select a template from the template repository 132 stored in the data repository 124. Types of actions can include, for example, services, products, reservations, or tickets. Types of actions can further include types of services or products. For example, types of services can include car share service, food delivery service, laundry service, maid service, repair services, or household services. Types of products can include, for example, clothes, shoes, toys, electronics, computers, books, or jewelry. Types of reservations can include, for example, dinner reservations or hair salon appointments. Types of tickets can include, for example, movie tickets, sports venue tickets, or flight tickets. In some cases, the types of services, products, reservations or tickets can be categorized based on price, location, type of shipping, availability, or other attributes.

The direct action API 116, upon identifying the type of request, can access the corresponding template from the template repository 132. Templates can include fields in a structured data set that can be populated by the direct action API 116 to further the operation that is requested of the service provider device 148 (such as the operation of sending a taxi to pick up an end user at a pickup location and transport the end user to a destination location). The direct action API 116 can perform a lookup in the template repository 132 to select the template that matches one or more characteristic of the trigger keyword and request. For example, if the request corresponds to a request for a car or ride to a destination, the data processing system 101 can select a car sharing service template. The car sharing service template can include one or more of the following fields:

device identifier, pick up location, destination location, number of passengers, or type of service. The direct action API 116 can populate the fields with values. To populate the fields with values, the direct action API 116 can ping, poll or otherwise obtain information from one or more sensors 134 of the client device 110 or a user interface of the device 104. For example, the direct action API 116 can detect the source location using a location sensor, such as a GPS sensor. The direct action API 116 can obtain further information by submitting a survey, prompt, or query to the end of user of the client device 110. The direct action API can submit the survey, prompt, or query via interface 146 of the data processing system 101 and a user interface of the client device 110 (e.g., audio interface, voice-based user interface, display, or touch screen). Thus, the direct action API 116 can select a template for the action data structure based on the trigger keyword or the request, populate one or more fields in the template with information detected by one or more sensors 134 or obtained via a user interface, and generate, create or otherwise construct the action data structure to facilitate performance of an operation by the service provider device 148.

The data processing system 101 can select the template based from the template data structure 132 based on various factors including, for example, one or more of the trigger keyword, request, third party provider device 108, type of third party provider device 108, a category that the third party provider device 108 falls in (e.g., taxi service, laundry service, flower service, or food delivery), location, or other sensor information.

To select the template based on the trigger keyword, the data processing system 101 (e.g., via direct action API 116) can perform a look-up or other query operation on the template database 132 using the trigger keyword to identify a template data structure that maps or otherwise corresponds to the trigger keyword. For example, each template in the template database 132 can be associated with one or more trigger keywords to indicate that the template is configured to generate an action data structure responsive to the trigger keyword that the third party provider device 108 can process to establish a communication session.

In some cases, the data processing system 101 can identify a third party provider device 108 based on the trigger keyword. To identify the third party provide 108 based on the trigger keyword, the data processing system 101 can perform a lookup in the data repository 124 to identify a third party provider device 108 that maps to the trigger keyword. For example, if the trigger keyword includes "ride" or "to go to", then the data processing system 101 (e.g., via direct action API 116) can identify the third party provider device 108 as corresponding to Taxi Service Company A. The data processing system 101 can select the template from the template database 132 using the identify third party provider device 108. For example, the template database 132 can include a mapping or correlation between third party provider devices 108 or entities to templates configured to generate an action data structure responsive to the trigger keyword that the third party provider device 108 can process to establish a communication session. In some cases, the template can be customized for the third party provider device 108 or for a category of third party provider devices 108. The data processing system 101 can generate the action data structure based on the template for the third party provider 108.

To construct or generate the action data structure, the data processing system 101 can identify one or more fields in the selected template to populate with values. The fields can be populated with numerical values, character strings, Unicode values, Boolean logic, binary values, hexadecimal values, identifiers, location coordinates, geographic areas, timestamps, or other values. The fields or the data structure itself can be encrypted or masked to maintain data security.

Upon determining the fields in the template, the data processing system 101 can identify the values for the fields to populate the fields of the template to create the action data structure. The data processing system 101 can obtain, retrieve, determine or otherwise identify the values for the fields by performing a look-up or other query operation on the data repository 124.

In some cases, the data processing system 101 can determine that the information or values for the fields are absent from the data repository 124. The data processing system 101 can determine that the information or values stored in the data repository 124 are out-of-date, stale, or otherwise not suitable for the purpose of constructing the action data structure responsive to the trigger keyword and request identified by the NLP component 112 (e.g., the location of the client device 110 may be the old location and not be the current location; an account can be expired; the destination restaurant may have moved to a new location; physical activity information; or mode of transportation).

If the data processing system 101 determines that it does not currently have access, in memory of the data processing system 101, to the values or information for the field of the template, the data processing system 101 can acquire the values or information. The data processing system 101 can acquire or obtain the information by querying or polling one or more available sensors of the client device 110, prompting the end user of the client device 110 for the information, or accessing an online web-based resource using an HTTP protocol. For example, the data processing system 101 can determine that it does not have the current location of the client device 110, which may be a needed field of the template. The data processing system 101 can query the client device 110 for the location information. The data processing system 101 can request the client device 110 to provide the location information using one or more location sensors 134, such as a Global Positioning System sensor, WIFI triangulation, cell tower triangulation, Bluetooth beacons, IP address, or other location sensing technique.

The direct action API 116 can transmit the action data structure to a third party provider device (e.g., service provider device 148) to cause the third party provider device 108 to invoke a conversational application programming interface (e.g., service provider NLP component 142) and establish a communication session between the third party provider device 108 and the client device 110. Responsive to establishing the communication session between the service provider device 148 and the client computing device 1004, the service provider device 148 can transmit data packets directly to the client device 110 via network 106. In some cases, the service provider device 148 can transmit data packets to the client device 110 via data processing system 101 and network 106.

In some cases, the third party provider device 108 can execute at least a portion of the conversational API 142. For example, the third party provider device 108 can handle certain aspects of the communication session or types of queries. The third party provider device 108 may leverage the NLP component 112 executed by the data processing system 101 to facilitate processing the audio signals associated with the communication session and generating responses to queries. In some cases, the data processing system 101 can include the conversational API 142 configured for the third party provider 108. In some cases, the data processing system routes data packets between the client computing device and the third party provider device to establish the communication session. The data processing system 101 can receive, from the third party provider device 108, an indication that the third party provider device established the communication session with the client device 104. The indication can include an identifier of the client device 110, timestamp corresponding to when the communication session was established, or other information associated with the communication session, such as the action data structure associated with the communication session. In some cases, the data processing system 101 can include a session handler component 114 to manage the communication session and a feedback monitor component 120 to measure the characteristic of the communication session.

The data processing system 101 can include, execute, access, or otherwise communicate with a session handler component 114 to establish a communication session between the client device 104 and the data processing system 101. The communication session can refer to one or more data transmissions between the client device 104 and the data processing system 101 that includes the input audio signal that is detected by a sensor 134 of the client device 104, and the output signal transmitted by the data processing system 101 to the client device 104. The data processing system 101 (e.g., via the session handler component 114) can establish the communication session responsive to receiving the input audio signal. The data processing system 101 can set a duration for the communication session. The data processing system 101 can set a timer or a counter for the duration set for the communication session. Responsive to expiration of the timer, the data processing system 101 can terminate the communication session.

The communication session can refer to a network-based communication session in which the client device 104 provides authenticating information or credentials to establish the session. In some cases, the communication session refers to a topic or a context of audio signals carried by data packets during the session. For example, a first communication session can refer to audio signals transmitted between the client device 104 and the data processing system 101 that are related to (e.g., include keywords, action data structures, or content item objects) a taxi service; and a second communication session can refer to audio signals transmitted between the client device 104 and data processing system 101 that are related to a laundry and dry cleaning service. In this example, the data processing system 101 can determine that the context of the audio signals are different (e.g., via the NLP component 112), and separate the two sets of audio signals into different communication sessions. The session handler 114 can terminate the first session related to the ride service responsive to identifying one or more audio signals related to the dry cleaning and laundry service. Thus, the data processing system 101 can initiate or establish the second session for the audio signals related to the dry cleaning and laundry service responsive to detecting the context of the audio signals.

The data processing system 101 can include, execute, or otherwise communicate with a content selection system 108 to receive the trigger keyword identified by the natural language processor and select, based on the trigger keyword, a content item via a real-time content selection process. In some cases, the direct action API 116 can transmit the action data structure to the content selection system 108 to perform the real-time content selection process and establish a communication session between the third-party content server 102 (or a third party provider device 108) and the client device 110.

The content selection process can refer to, or include, selecting sponsored content item objects provided by third party content providers 106. The content selection process can include a service in which content items provided by multiple content providers are parsed, processed, weighted, or matched in order to select one or more content items to provide to the client device 110. The content selection process can be performed in real-time or offline. Performing the content selection process in real-time can refer to performing the content selection process responsive to the request for content received via the client device 110. The real-time content selection process can be performed (e.g., initiated or completed) within a time interval of receiving the request (e.g., 5 seconds, 10 seconds, 20 seconds, 30 seconds, 1 minute, 2 minutes, 3 minutes, 5 minutes, 10 minutes, or 20 minutes). The real-time content selection process can be performed during a communication session with the client device 110, or within a time interval after the communication session is terminated.

For example, the data processing system 101 can include a content selection system 108 designed, constructed, configured or operational to select content item objects. To select content items for display in a voice-based environment, the data processing system 101 (e.g., via NLP component 112) can parse the input audio signal to identify keywords (e.g., a trigger keyword), and use the keywords to select a matching content item based on a broad match, exact match, or phrase match. For example, the content selection system 108 can analyze, parse, or otherwise process subject matter of candidate content items to determine whether the subject matter of the candidate content items correspond to the subject matter of the keywords or phrases of the input audio signal detected by the microphone of the client device 110. The content selection system 108 may identify, analyze, or recognize voice, audio, terms, characters, text, symbols, or images of the candidate content items using an image processing technique, character recognition technique, natural language processing technique, or database lookup. The candidate content items may include metadata indicative of the subject matter of the candidate content items, in which case the content selection system 108 may process the metadata to determine whether the subject matter of the candidate content item corresponds to the input audio signal.

Content providers 106 may provide additional indicators when setting up a content campaign that includes content items. The content provider 106 may provide information at the content campaign or content group level that the content selection system 108 may identify by performing a lookup using information about the candidate content item. For example, the candidate content item may include a unique identifier, which may map to a content group, content campaign, or content provider. The content selection system 108 may determine, based on information stored in content campaign data structure in data repository 124, information about the content provider 106.

The data processing system 101 can receive, via a computer network, a request for content for presentation on a client device 110. The data processing system 101 can identify the request by processing an input audio signal detected by a microphone of the client device 110. The request can include selection criteria of the request, such as the device type, location, and a keyword associated with the request. The request can include the action data structure or action data structure.

Responsive to the request, the data processing system 101 can select a content item object from data repository 124 or a database associated with the content provider 106, and provide the content item for presentation via the client device 110 via network 106. The content item object can be provided by a content provider device 108 different from the service provider device 148. The content item can correspond to a type of service different from a type of service of the action data structure (e.g., taxi service versus food delivery service). The client device 110 can interact with the content item object. The client device 110 can receive an audio response to the content item. The client device 110 can receive an indication to select a hyperlink or other button associated with the content item object that causes or allows the client device 110 to identify service provider 108, request a service from the service provider 108, instruct the service provider 108 to perform a service, transmit information to the service provider 108, or otherwise query the service provider device 148.

The data processing system 101 can include, execute, or communicate with an audio signal generator component 122 to generate an output signal. The output signal can include one or more portions. For example, the output signal can include a first portion and a second portion. The first portion of the output signal can correspond to the action data structure. The second portion of the output signal can correspond to the content item selected by the content selection system 108 during the real-time content selection process.

The audio signal generator component 122 can generate the output signal with a first portion having sound corresponding to the first data structure. For example, the audio signal generator component 122 can generate the first portion of the output signal based on one or more values populated into the fields of the action data structure by the direct action API 116. In a taxi service example, the values for the fields can include, for example, 123 Main Street for pick-up location, 1234 Main Street for destination location, 2 for number of passengers, and economy for the level of service. The audio signal generator component 122 can generate the first portion of the output signal in order to confirm that the end user of the client device 110 wants to proceed with transmitting the request to the service provider 108. The first portion can include the following output "Would you like to order an economy car from taxi service provider A to pick two people up at 123 Main Street and drop off at 1234 Main Street?"

In some cases, the first portion can include information received from the service provider device 148. The information received from service provider device 148 can be customized or tailored for the action data structure. For example, the data processing system 101 (e.g., via direct action API 116) can transmit the action data structure to the service provider 108 before instructing the service provider 108 to perform the operation. Instead, the data processing system 101 can instruct the service provider device 148 to perform initial or preliminary processing on the action data structure to generate preliminary information about the operation. In the example of the taxi service, the preliminary processing on the action data structure can include identifying available taxis that meet the level of service requirement that are located around the pick-up location, estimating an amount of time for the nearest available taxi to reach the pick-up location, estimating a time of arrival at the destination, and estimating a price for the taxi service. The estimated preliminary values may include a fixed value, an estimate that is subject to change based on various conditions, or a range of values. The service provider device 148 can return the preliminary information to the data processing system 101 or directly to the client device 110 via the network 104. The data processing system 101 can incorporate the preliminary results from the service provider device 148 into the output signal, and transmit the output signal to the client device 110. The output signal can include, for example, "Taxi Service Company A can pick you up at 123 Main Street in 10 minutes, and drop you off at 1234 Main Street by 9 AM for $10. Do you want to order this ride?" This can form the first portion of the output signal.

In some cases, the data processing system 101 can form a second portion of the output signal. The second portion of the output signal can include a content item selected by the content selection system 108 during a real-time content selection process. The first portion can be different from the second portion. For example, the first portion can include information corresponding to the action data structure that is directly responsive to the data packets carrying the input audio signal detected by the sensor 134 of the client device 110, whereas the second portion can include a content item selected by a content selector component 104 that can be tangentially relevant to the action data structure, or include sponsored content provided by a third-party content server 102. For example, the end user of the client device 110 can request a taxi from Taxi Service Company A. The data processing system 101 can generate the first portion of the output signal to include information about the taxi from the Taxi Service Company A. However, the data processing system 101 can generate the second portion of the output signal to include a content item selected based on the keywords "taxi service" and information contained in the action data structure that the end user may be interested in. For example, the second portion can include a content item or information provided by a different taxi service company, such as Taxi Service Company B. While the user may not have specifically requested Taxi Service Company B, the data processing system 101 may nonetheless provide a content item from Taxi Service Company B because the user may choose to perform an operation with Taxi Service Company B.

The data processing system 101 can transmit information from the action data structure to the Taxi Service Company B to determine a pick-up time, time of arrival at the destination, and a price for the ride. The data processing system 101 can receive this information and generate the second portion of the output signal as follows: "Taxi Service Company B can pick you up at 123 Main Street in 2 minutes, and drop you off at 1234 Main Street by 8:52 AM for $15. Do you want this ride instead?" The end user of client device 110 can then select the ride provided by Taxi Service Company A or the ride provided by Taxi Service Company B.

Prior to providing, in the second portion of the output signal, the sponsored content item corresponding to the service provided by Taxi Service Company B, the data processing system 101 can notify the end user computing device that the second portion corresponds to a content item object selected during a real-time content selection process (e.g., by the content selection system 108). However, the data processing system 101 can have limited access to different types of interfaces to provide the notification to the end user of the client device 110. For example, the client device 110 may not include a display device, or the display device may be disabled or turned off. The display device of the client device 110 may consume greater resources than the speaker of the client device 110, so it may be less efficient to turn on the display device of the client device 110 as compared to using the speaker of the client device 110 to convey the notification. Thus, in some cases, the data processing system 101 can improve the efficiency and effectiveness of information transmission over one or more interfaces or one or more types of computer networks. For example, the data processing system 101 (e.g., via the audio signal generator component 122) can module the portion of the output audio signal comprising the content item to provide the indication or notification the end user that that portion of the output signal comprises the sponsored content item.

The data processing system 101 (e.g., via interface 146 and network 106) can transmit data packets comprising the output signal generated by the audio signal generator component 122. The output signal can cause the audio driver component 138 of or executed by the client device 104 to drive a speaker (e.g., transducer 136) of the client device 104 to generate an acoustic wave corresponding to the output signal.

The data processing system 101 can include a feedback monitor component 120. The feedback monitor component 120 can include hardware or software to measure the characteristic of the communication session. The feedback monitor component 120 can receive data packets carrying auditory signals transmitted between the client device (e.g., client device 110) and a conversational application programming interface (e.g., NLP component 112 executed by the data processing system or the service provider NLP component 142 executed by the service provider device 148, a third party provider device, or the third-party content server 102) that established a communication session with the client device responsive to interaction with the content item. In some cases, the third-party content server 102 can execute an NLP component comprising one or more functions or components of the service provider NLP component 142 or the NLP component 112. The NLP component executed by the service provider device 148 or the third-party content server 102 can be customized for the service provider device 148 or the third-party content server 102. By customizing the NLP component, the NLP component can reduce bandwidth usage and request-responses as compared to a generic or standard NLP component because the NLP component can be configured with more precise queries and responses that result in reduced back-and-forth between the NLP component and the client device 110.

The feedback monitor component 120 can measure a characteristic of the communication session based on the auditory signals. The feedback monitor component 120 can generate a quality signal based on the measured characteristic. The quality signal can include or refer to a quality level, quality metric, quality score or quality level. The quality signal can include, for example, a numeric score (e.g., 0 to 10 with 0 being lowest quality and 10 being highest quality, or vice versa), a letter grade (e.g., A to F with A being the best quality), a binary value (e.g., Yes/No; Good/Bad; 1/0; high/low), rank, or percentile. The quality signal can include an average quality signal determined from communications between a plurality of client devices that communicate with a same NLP component or provider device 106 or 108.

The feedback monitor component 120 can measure the characteristic of the communication session using various measuring techniques, heuristic techniques, policies, conditions, or tests. The feedback monitor component 120 can parse data packets transmitted between the client device 104 and the content provider device, third party device, service provider or data processing system to determine a characteristic of the communication session. The quality can refer to the quality of the communication channel used to transmit the data or the quality of the data being communicated. For example, the quality of the communication channel can refer to a signal-to-noise ratio, ambient noise level, delay, lag, latency, choppiness, an echo, or dropped calls. The quality of the data being communicated can refer to the quality of the responses generated by the NLP component that is responding to audio signals detected by the microphone of the computing device. The quality of the data can be based on the responsiveness of the NLP component, accuracy of the NLP component, or latency between the NLP component receiving the audio signal or query from the client device 104 and transmitting a response.

The feedback monitor component 120 can determine the quality of the communication channel by measuring the amount of background noise and the signal level to determine the signal-to-noise ("SNR") ratio. The feedback monitor component 120 can compare the measured or determined SNR to a threshold to determine the quality level. For example, a 10 dB SNR may be considered good. The thresholds can be predetermined or determined via a machine learning model (e.g., based on feedback from a plurality of devices).

The feedback monitor component 120 can further determine the quality of the communication channel based on the ping time between the client device 104 and the provider device or data processing system. The data processing system can compare the ping time with a threshold to determine the quality level. For example, the ping threshold can be 20 ms, 30 ms, 50 ms, 100 ms, 200 ms or more. The feedback monitor component 120 can determine the quality of the communication channel based on choppiness of the audio (e.g., pauses or breaks in the audio; the audio cutting out). The feedback monitor component 120 can identify an echo in the communication channel to determine a low quality level. The feedback monitor component 120 can determine the number of dropped call for the NLP component during a time interval or a ratio of dropped call to total calls, and compare that with a threshold to determine the quality level. For example, the threshold can be 2 dropped calls per hour; or 1 dropped call for every 100 calls.

The feedback monitor component 120 can determine the quality of the communication session based on the quality of the responses generated by the NLP component (or conversational API) that is communicating with the client device 110. The quality of the responses can include or be based on, for example, the amount of time the NLP component takes to generate a response, the text of the response, the accuracy of the response, the relevancy of the response, a semantic analysis of the response, or a network activity of the client device in response to the response provided by the NLP component. The feedback monitor component 120 can determine the amount of time the NLP component takes to generate the response by differencing a timestamp corresponding to when the NLP component receives the audio signals from the client device 104, and a timestamp corresponding to when the NLP transmits the response. The feedback monitor component 120 can determine the amount of time by differencing a time stamp corresponding to when the client device transmits the audio signals and a time stamp corresponding to when the client device receives the response from the NLP component.

The feedback monitor component 120 can determine the quality of the response by parsing data packets comprising the response. For example, the feedback monitor component 120 can parse and analyze the text of the response, the accuracy of the response, or the relevancy of the response to the query from the client device. The feedback monitor component 120 can perform this assessment by providing the query to another NLP component and compare the responses from the two NLP components. The feedback monitor component 120 can perform this assessment by providing the query and response to a third party assessor. The feedback monitor component 120 can determine the consistency of the response by comparing a plurality of responses to a plurality of similar queries provided by a plurality of client devices. The feedback monitor component 120 can determine the quality of the response based on the number of times the client device transmits audio signals comprising the same query (e.g., indicating that the responses have not been fully responsive to the query submitted by the client device).

The feedback monitor component 120 can determine the quality of the response generated by the NLP based on network activity of the client device. For example, the NLP component can receive a voice query from the client device, generate a response to the voice query, and transmit data packets carrying the response to the client device. The client device, upon receiving the response from the NLP component, can perform a network activity or change a network activity. For example, the client device can terminate the communication session, which can indicate that the NLP component was fully responsive to the client device, or the NLP failed to successfully respond to the client device and the client device gave up on the NLP component. The feedback monitor component can determine that the client device terminated the call for good or bad reasons based on a confidence score associated with the response generated by the NLP component. The confidence score can be associated with a probabilistic or statistical semantic analysis used to generate the response.

The feedback monitor component 120 can determine that the client device terminated the communication session based on an absence of audio signals transmitted by the client device. The feedback monitor component 120 can determine that the client device terminated the communication session based on a terminate or end command transmitted by the client device. The feedback monitor component 120 can determine a quality level based on an amount of silence from the client device (e.g., absence of audio signals). The absence of audio signals can be identified based on the SNR from the client device being less than a threshold (e.g., 6 dB, 3 dB, or 0 dB). The feedback monitor component can measure the characteristic based on a duration of the communication session. For example, a duration greater than a threshold can indicate that the end user of the client device was satisfied with the communication session. However, a long duration combined with other characteristics such as an increased amplitude of audio signals, repeated queries, and decreased tempo may indicate a low quality since the user of the client may have spent an unnecessary or unwanted extended amount of time engaged with the communication session.

The NLP component can perform a semantic analysis on the queries transmitted by the client device to determine that the client device repeatedly transmits the same or similar queries even though the NLP component is generated and providing responses. The feedback monitor component 120 can determine, based on the number of repeat queries within a time interval (or sequentially repeated queries) exceeding a threshold (e.g., 2, 3, 4, 5, 6, 7 or more), that the quality level is low.

In some cases, the feedback monitor component 120 can determine the quality of the communication session at different parts of the communication session (e.g., beginning, middle, or end; or time intervals). The for example, the feedback monitor component 120 can determine the quality of a first portion or first time interval of the communication session; and the quality of a second portion or second time interval in the communication session that is subsequent to the first portion or first time interval. The feedback monitor component 120 can compare the quality at the two portions to determine a quality of the overall communication session. For example, a difference in quality between the two portions that is greater than a threshold can indicate a low quality, inconsistent quality, or unreliable quality.

In some cases, the feedback monitor component 120 can determine the quality based on a characteristic of the communication session or at least a portion thereof. The characteristic can include, for example, at least one of amplitude, frequency, tempo, tone, and pitch. For example, the feedback monitor component 120 can use the characteristic to determine a reaction of the user of the client device or sentiment of the use of the client. For example, if the amplitude of the audio signals transmitted by the client device increases after each response from the NLP, the feedback monitor can determine that the end user is frustrated with the NLP component generated responses. The feedback monitor component 120 can compare the amplitude of the audio signals detected by the client device with a threshold or with other audio signals received by the client device during the same communication session or different communication sessions.

The feedback monitor component 120 can determine the quality based on a characteristic such as the tempo or pitch of the audio signals detected by the client device and transmitted to the NLP component. The feedback monitor component 120 can determine, for example, that a slowing down of the tempo (e.g., rate of words spoken per time interval) after each NLP response can indicate that the end user is not satisfied with the response generated by the NLP component and is repeating it slower to allow the NLP component to better parse the audio signals and improve the response. In some cases, an increase or steady tempo can indicate that the use of the client device is satisfied with the responses generated by the NLP and has confidence in the responses. In some cases, an increase in the pitch of the audio signals detected by the client device can indicate a poor quality of responses from the NLP or lack of confidence in the responses.

In some cases, the feedback monitor component 120 can transmit queries to the client device to measure or determine the quality. For example, the feedback monitor component 120 can transmit survey questions to the end user asking about the quality of the communication session, NLP component, or provider device. In some cases, the feedback monitor component 120 can generate the query responsive to the feedback monitor component 120 determining that a first quality signal is below a threshold. For example, the feedback monitor component 120 can determine a first quality signal based on measuring the quality using characteristics such as the increase in amplitude of the audio signals detected by the client device in combination with the decrease in tempo of the audio signals detected by the client device. The feedback monitor component 120 can generate a quality signal indicating a low level of quality based on the combined characteristics of amplitude and tempo. Responsive to the low quality signals determined based on the combination characteristic, the feedback monitor component 120 can generate and transmit a query to the client device that either implicitly or explicitly enquires about the quality of the communication session (e.g., How satisfied are you with the responses generated by the NLP component?; How satisfied are you with the communication session?). In another example, the data processing system can determine a quality based on whether the service provider 108 can provide the requested service. For example, the end user may request a product or service, but the service provider 108 responds stating that they do not have that product or cannot perform that service, which can cause the end user to indicate frustration with the service provider 108. The data processing system 101 can identify this frustration, and assign a quality accordingly.

In some cases, the feedback monitor component 120 can measure the characteristic based on network activity on multiple electronic surfaces, and aggregate the quality measured from the multiple electronic surfaces to generate a summed quality signal. The summed quality signal can be an average, weighted average, absolute sum, or other combined quality signal value. The feedback monitor component 120 can further generate statistics for the combined quality signal value or perform a statistical analysis, such as determine the standard deviation, variance, 3 sigma quality, or 6 sigma qualities.

The feedback monitor component 120 can adjust the real-time content selection process performed by the content selection system 108. Adjusting the real-time content selection process can refer to adjusting a weight used to select the content item provided by the third-party content server 102 or service provider device 148 or third party provider device 108 that executed the NLP component used to establish the communication session with the client device 104. For example, if the content item led to a low quality communication session, the feedback monitor component 120 can adjust an attribute or parameter of the content data 130 comprising the content item to reduce the likelihood of that content item being selected for similar action data structures or similar client devices 104 (or accounts or profiles thereof).

In some cases, the feedback monitor component 120 can prevent or block the content selection system 108 from selection, in the real-time selection process, of the content item responsive to the quality signal less than a threshold. In some cases, the feedback monitor component 120 can allow or permit the content selection system 108 to select, in the real-time selection process, the content item responsive to the quality signal greater than or equal to a threshold.

The thread optimization component 150 can obtain or access data packets of the first and second (and any other) data transmissions. For example, the direct action API 116 can provide the transmissions (e.g., the corresponding data packets) to the data repository 124 for storage, where they can be retrieved by the thread optimization component 150. The thread optimization component 150 can also receive the data packets (or other protocol based structure) of the data transmissions from the direct action API 116 (or other data processing system 101 component) bypassing the data repository 124.

The thread optimization component 150 can parse or otherwise extract information from data packets of multiple data transmissions that correspond respectively to multiple action data structures. For example, the thread optimization component 150 can apply a heuristic technique to data packets of a first data transmission (or to the corresponding first data structure) and to data packets of a second data transmission (or to the corresponding second data structure) to determine at least one sequence dependency parameter. The heuristic or other statistical technique can determine or identify with a threshold degree of certainty patterns among the first and second data transmissions (or corresponding data structures) that indicate a sequence dependency of actions indicated by the data transmissions.

The sequence dependency parameter can indicate the existence or likelihood (e.g., relative to a threshold level or other benchmark) of actions represented by the data transmissions (or corresponding action data structures) having an order of operations, time, or sequence dependency on each other. The sequence dependent operations or actions, indicated by the sequence dependency parameters, can include a number of actions that occur in a known, suggested, required, or particular order. For example, going from home to a movie theater, then back home can include three sequence dependent operations or actions. The first action in this example includes travelling from home to the movie theater. The second action includes watching the movie in the theater. The third action includes returning home from the theater.

These three (and perhaps other) actions can be determined by the direct action API 116 from requests or trigger keywords corresponding to the input audio signal "OK, I would like to catch a movie later". In this example, the second action in the sequence (watching the movie) is subsequent to and dependent on the first action (going out from home to the movie theater), and the third action (returning home) is subsequent to and dependent on the first action and the second action. The third action can be considered subsequent to and dependent on the second action, as having expressed an intent to do so, the data processing system 101 determines or predicts that the end user would watch the movie in the theater before returning home as well.

Based on the sequence dependency parameter, the thread optimization component 150 can merge two or more packetized data transmissions (or their corresponding action data structures) into a single thread. The single thread can include data identifying actions as well as other data (e.g., metadata or third party data) from multiple data action structures. The single thread can be in packetized (or other protocol based) form, e.g., in the same format as the first and second data transmissions. The single thread can also be in a data structure format, e.g., generated by the direct action API 116, or following a format of at least one template 132, policy 128, or parameter 126. The single thread can include or indicate an association or linking of actions from one or more data transmissions, or from one or more action data structures.

The data transmissions or action data structures can be merged or otherwise associated with one another by the thread optimization component 150 to generate the single thread prior to transmission of the data indicated by the action data structures via the communication session to the service provider computing device 148. In this example, the direct action API 116 or other data processing system 101 component (e.g., the interface 146) can transmit at least part of the data indicated by the single thread, subsequent to the merger or creation of the single thread, to the service provider computing device 148 for the first time. For example, prior to creation of the single thread, the data processing system 101 may have delayed, prevented withheld, or not transmitted data associated with the first or second (or any other) data structure. In some examples, at least some of the data indicated by individual data structures can be provided by and from the data processing system 101 to the service provider computing device 148 prior to creation of the single thread.

The thread optimization component 150 can merge or otherwise consolidate or associate the data transmissions (or corresponding action data structures) into the single thread based on the sequence dependency parameter. For example, the first data transmission (and first data structure) can represent actions associated with the first input audio signal "OK, I would like to go to go dinner tonight" the second data transmission (and second data structure) can represent actions associated with the second input audio signal "OK, I would like to catch a movie later". The first and second (or any other) input audio signals can be sequential (following on another by less than one minute), separated from one another by time (e.g., greater than one minute), and can originate from the same or different client computing devices 110. The thread optimization component 150 can obtain data packets (or other data) representing this information, and can determine at least one sequence dependency parameter. For example, the sequence dependency parameter can indicate that the action of returning home from the movie theater occurs after the action of watching the movie, or that the action of watching the movie occurs or is predicted to occur after the action of eating dinner.

The single thread (in any data structure or format) can indicate a set of sequence dependent operations that correspond to one or more input audio signals (or corresponding data structures or data transmissions), such as a series of actions. The thread can include any two or more actions, such as a first action, a second action, and a third action. For example, a merger of the first input audio signal "OK, I would like to go to go dinner tonight," and the second input audio signal "OK, I would like to catch a movie later" can include at least one request indicating an interest to attend dinner and a movie, and at least one trigger keyword, e.g., "go" indicating a need for transportation. The thread optimization component 150 can identify at least one sequence dependency parameter indicating at least one sequence, temporal, or order of operations dependency between the actions and can generate the single thread to combine the multiple input audio signals (or corresponding template based data structures or packet/protocol based data transmissions). The thread optimization component 150 can create the single thread that indicates at least three actions, such as a dinner action (first action), a movie action (second action), and a transportation home action (third action). In this example, from the requests or the trigger keywords the thread optimization component 150 generates a single thread from multiple separate inputs that indicates the three actions. The single thread can include other actions, such as an initial transport to dinner action.

The data processing system 101 or component thereof such as the thread optimization component 150 can determine that the actions of the thread are sequence dependent operations. For example, the thread optimization component can determine that the second action of watching the movie is subsequent to the first action of eating dinner, and that the third action of travelling home from the movie theater is after the second action of watching the movie. The thread optimization component 150 can access the parameters 126 or policies 128 in the data repository 124 to determine or otherwise estimate the order of the sequence dependent actions. For example, the parameters 126 or policies 128 could indicate that a transport action (e.g., a taxi home) can occur after an event action (e.g., watching a movie).

The content selection system 108 can obtain indications of any of the actions of the single thread. For example, the thread optimization component 150 can directly or indirectly (e.g., via the data repository 124) provide at least a portion of the single thread that indicates the third (or any other) action to the content selection system 108. The content selection system 108 can obtain this information from the data repository 124, where it can be stored as part of the content data 130. The indication of the third action can inform the content selection system 108 of a need for transportation from the location of the movie theater to a location as determined or indicated by the client computing device 110, such as a ride to an end destination.

The content selection system 108 can obtain indications of a later action in the thread prior to the occurrence of at least one earlier action. For example, the content selection system 108 can receive an indication of the third action (e.g., a need for a ride from the movie theater) before the movie plays in the theater (second action), or before the person who input the input audio signal into the client computing device 110 eats dinner at the restaurant (first action). The content selection system 108 can obtain indications of at least one action of the thread before completion of at least one action of the thread.

From the information received by the content selection system 108, e.g., an indication of the third action before occurrence of at least one prior action in the sequence dependent thread, the content selection system 108 can identify at least one content item. The content item can be responsive or related to the third (or any other) action. For example, the content item can include an audio message offering services of a car share company, responsive to the third action that indicates a transportation need. The content selection system 108 can query the data repository 124 to select or otherwise identify the content item, e.g., from the content data 130. The content selection system 108 can also select the content item from the third-party content server 102. For example responsive to a query received from the data processing system 101, the third-party content server 102 can provide a content item to the data processing system 101 (or component thereof) for eventual output by the client computing device 110.

The audio signal generator component 122 can generate or otherwise obtain an output signal that includes the content item responsive to the third (or any other) action. For example, the data processing system 101 can execute the audio signal generator component to generate or create an output signal corresponding to the content item. The interface 146 of the data processing system 101 can provide or transmit one or more data packets that include the output signal via the computer network 165 to the client computing device 110, e.g., as part of the communication session. The interface 146 can be designed, configured, constructed, or operational to receive and transmit information using, for example, data packets. The interface 146 can receive and transmit information using one or more protocols, such as a network protocol. The interface 146 can include a hardware interface, software interface, wired interface, or wireless interface. The interface 146 can facilitate translating or formatting data from one format to another format. For example, the interface 146 can include an application programming interface that includes definitions for communicating between various components, such as software components of the system 100.

For example the data processing system 101 can provide the output signal from the data repository 124 or from the audio signal generator component 122 to the client computing device 110. The data processing system 101 can also instruct, via data packet transmissions, the third-party content server 102 or the service provider computing device 148 to provide the output signal to the client computing device 110. The output signal can be obtained, generated, transformed to or transmitted as one or more data packets (or other communications protocol) from the data processing system 101 (or other computing device) to the client computing device 110.

The content selection system 108 can skip to a later action in a set of sequence dependent operations indicated by the single thread to select a content item for the later action prior to occurrence (and prior to an immediate need) for activity corresponding to the later action. By skipping to a later sequenced action, e.g., to select a content item for the second subsequent action prior to selecting a content item for a first prior action, the data processing system 101 is not required to first process information related to the prior action to select content items for subsequent actions. This reduces processor utilization, power consumption and bandwidth from data transmissions that would otherwise be associated with selecting a content item (for the first action) prior to selecting the content item for the second action.

The content selection system 108 can select the content item for the (subsequent or later) action as part of a real-time content selection process. For example, the content item can be provided to the client computing device for transmission as audio output in a conversational manner in direct response to the input audio signal. The real-time content selection process to identify the content item and provide the content item to the client computing device 110 can occur within one minute or less from the time of the input audio signal and be considered real-time.

Figure 2A:
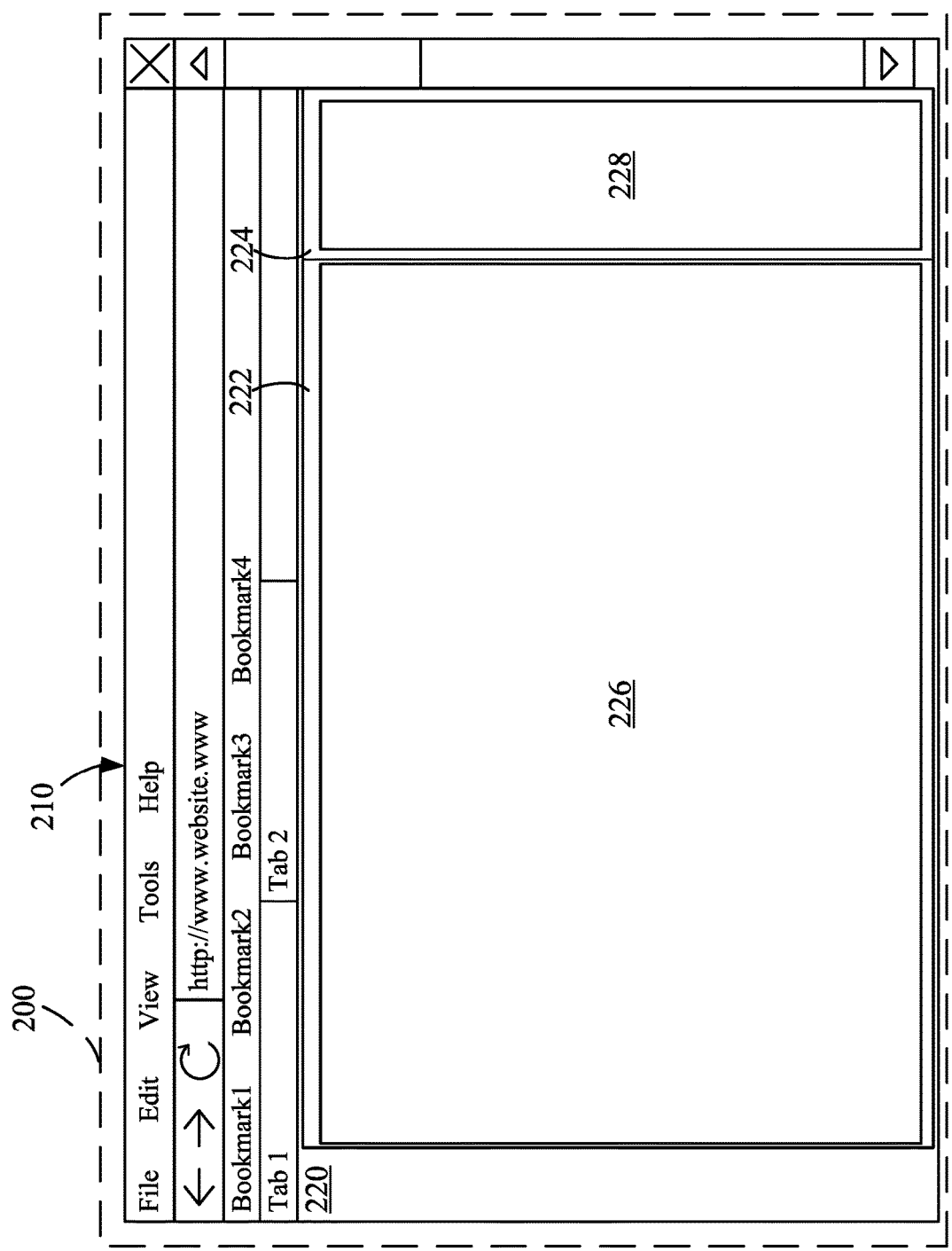
FIG. 2A is an illustration of an implementation of a first-party resource having third-party content shown in a window of a browser.

While the foregoing has provided an overview of a system 100 for selecting and serving content items to client devices 110, examples of content items served with resources will now be described in reference to FIGS. 2A-3B. FIG. 2A depicts an example display 200 (shown in phantom) of a client device, such as client device 110 of FIG. 1A, with a web browser 210 for displaying resources on the display 200. The web browser 210 may operate by receiving input of a URL in an address bar, such as a web address, from an input device (e.g., a pointing device, a keyboard, a touch screen, or another form of input device). In response, one or more processing modules of a client device executing the instructions from the web browser 210 may request data from another device connected to a network, such as network 106, referred to by the URL address (e.g., a resource server 104). The other device may then provide data to effect presentation of the resource to the client device, which causes visual indicia to be displayed by the display 200 of the client device. Accordingly, the web browser 210 displays a retrieved resource 220, such as a webpage.

An example resource 220 is shown displayed by the display 200 of the client device using the web browser 210. The resource 220 includes a first content portion 222 and a second content portion 224. A first-party content provider may separate the first content portion 222 and the second content portion 224 via a div element. In some implementations, such as resources implementing responsive web design aspects, the first content portion 222 and the second content portion 224 may be defined based on a percentage of a viewport of the device on which the resource 220 is to be displayed. The viewport is the area that is visible within the browser 210 or other application when displaying the resource 220. The first content portion 222 and/or the second content portion 224 may include first-party content 226 of the first-party content provider, such as a news article, a social network interface, an application, etc. The resource 220 may also include code to request one or more third-party content items, such as third party content item 228, to be presented with the first-party content 226. In the implementation shown in FIG. 2A, a third-party content item 228 is shown served in the second content portion 224, such as through the use of content item selection system 108 of FIG. 1A. The first-party content provider may include code to identify all or a portion of the second content portion 224 where the third-party content item 228 will be shown. For example, the first-party content provider may insert a piece of code, such as "ins class='contentitem'/ins" at each point where a third-party content item is to be presented. In other implementations, elements other than an insert element may be used, such as a div element, "div class='contentitem'/div." In addition, the cascading style sheet (CSS) class may have a label other than "contentitem." As will be described in greater detail below, an asynchronous tag may be included to request a script, such as JavaScript®, when the resource 220 is to be rendered on the client device. The script is configured to automatically determine a size for a content item to be presented with the resource 220 based on a type of the client device, a screen size of the client device, the viewport size, and/or the size of a parent element (e.g., second content portion 224) such that a request sent to the content item selection system results in an appropriately sized content item for the resource 220 presented on the display 200 of the client device.

Figure 2B:
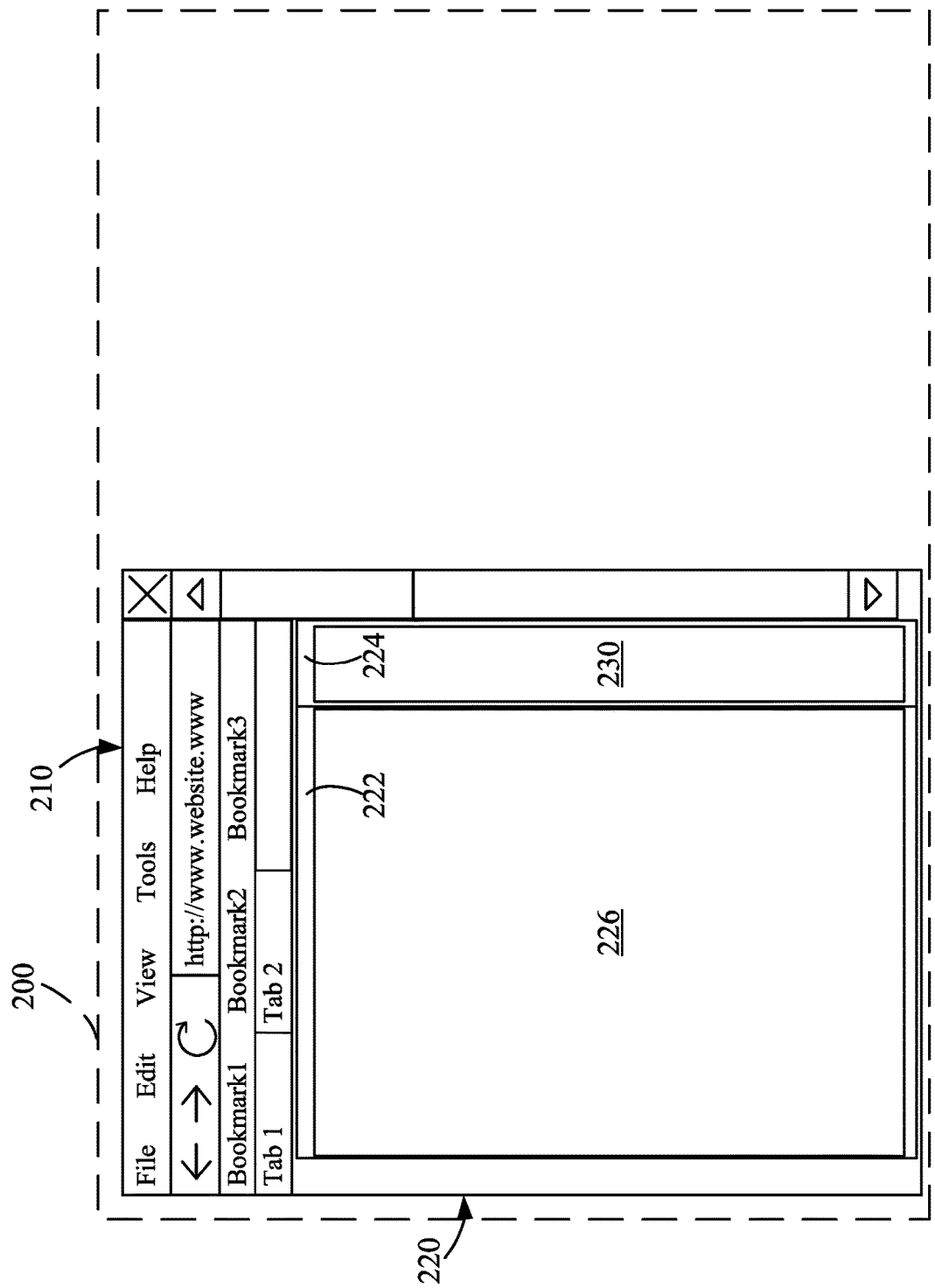
FIG. 2B is an illustration of the implementation of the first-party resource having third-party content of FIG. 2A shown with the window of the browser resized.

FIG. 2B depicts the display 200 of FIG. 2A showing the web browser 210 resized such that the resource 220 is also resized, such as through responsive web page design. The script may be configured to automatically determine a new size for the third-party content item based on the resizing of the resource 220. In some implementations, the new size for the third-party content item 228 may be the same such that the third-party content item 228 may simply remain presented. In instances where the new size is different, a third-party content item 230 of the corresponding new size may be requested from the content item selection system to be displayed with the resource 220 or the previously served third-party content item 228 may be resized at the client device without a request to the content item selection system (e.g., via seam-carving, stretching, etc.). In some implementations, the third-party content item 230 may be the same as third-party content item 228, only in a different size.

Figure 3A:
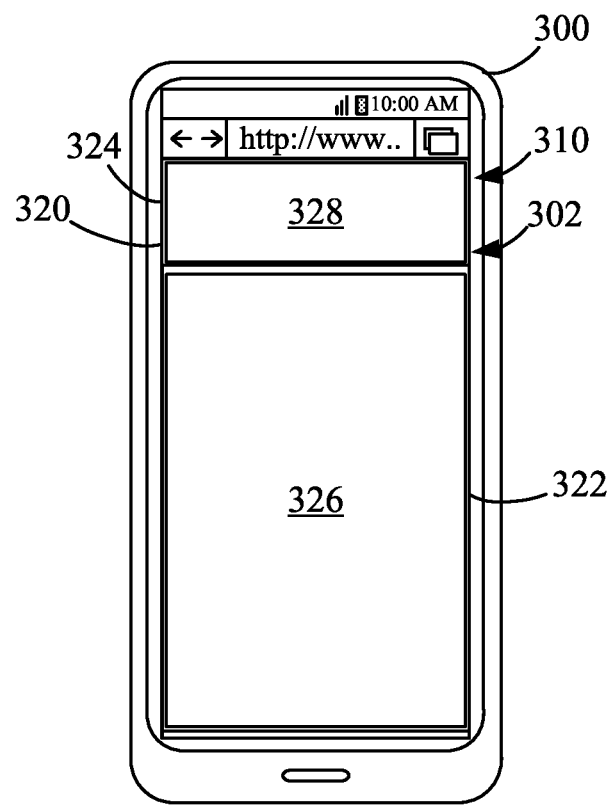
FIG. 3A is an illustration of an implementation of another first-party resource displayed on a mobile device and having third-party content.

FIG. 3A depicts a mobile client device 300, such as a smartphone or tablet, on which a resource 320 may be displayed by a display 302 of the client device 300. In the implementation show, a web browser 310 is executing on the module client device 300 for displaying resources 320 on the display 302. The web browser 310 may operate by receiving input of a URL in an address bar, such as a web address, from an input device (e.g., a pointing device, a keyboard, a touch screen, or another form of input device). In response, one or more processing modules of the client device 300 executing the instructions from the web browser 310 may request data from another device connected to a network, such as network 106, referred to by the URL address (e.g., a resource server 104). The other device may then provide data to effect presentation of the resource 320 to the client device 300, which causes visual indicia to be displayed by the display 302 of the client device 300. Accordingly, the web browser 310 displays a retrieved resource 320, such as a webpage.

An example resource 320 is shown displayed by the display 302 of the client device 300 using the web browser 310. The resource 320 includes a first content portion 322 and a second content portion 324. A first-party content provider may separate the first content portion 322 and the second content portion 324 via a div element. In some implementations, such as resources implementing responsive web design aspects, the first content portion 322 and the second content portion 324 may be defined based on a percentage of a viewport of the device 300 on which the resource 320 is to be displayed. The first content portion 322 and/or the second content portion 324 includes the first-party content 326 of the first-party content provider, such as a news article, a social network interface, an application, etc. The resource 320 may also include code to request one or more third-party content items, such as third-party content item 328, to be presented with the first-party content 326. In the implementation shown in FIG. 3A, a third-party content item 328 is shown served in the second content portion 324, such as through the use of content item selection system 108 of FIG. 1A. The first-party content provider may include code to identify all or a portion of the second content portion 324 where the third-party content item 328 will be shown. For example, the first-party content provider may insert a piece of code, such as "ins class='contentitem'/ins" at each point where a third-party content item 328 is to be presented. In other implementations, elements other than an insert element may be used, such as a div element, "div class='contentitem'/div." In addition, the cascading style sheet (CSS) class may have a label other than "contentitem." As will be described in greater detail below, the class may include an asynchronous tag to request a script, such as JavaScript®, when the resource 320 is to be rendered on the client device 300. The script is configured to automatically determine the size for a content item to be presented with the resource 320 based on a type of the client device 300, a screen size of the client device 300, the viewport size, and/or the size of a parent element (e.g., second content portion 324) such that a request sent to the content item selection system results in an appropriately sized content item for the resource 320 presented on the display 302 of the client device 300.

Figure 3B:
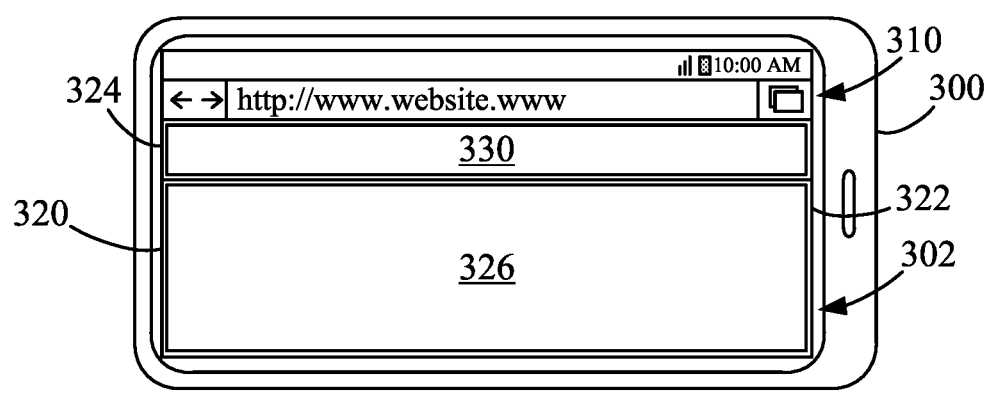
FIG. 3B is an illustration of the implementation of the first-party resource displayed on the mobile device of FIG. 3A shown displayed after the mobile device is rotated.

FIG. 3B depicts the device 300 of FIG. 3A rotated such that the resource 320 presented on the display 302 of the device 300 is rotated from a portrait orientation to a landscape orientation. In some instances, the orientation change for the resource 320 may result in the resource 320 being presented with a different configuration or sizing. The script may be configured to automatically determine a new size for the third-party content item based on the different configuration or sizing of the resource 320. In some implementations, the new size for the third-party content item 328 may be the same such that the third-party content item 328 may simply remain presented. In instances where the new size is different, a third-party content item 330 of the corresponding new size may be requested from the content item selection system to be displayed with the resource 320 or the previously served third-party content item 328 may be resized at the client device 300 without a request to the content item selection system (e.g., via seam-carving, stretching, etc.). In some implementations, the third-party content item 330 may be the same as third-party content item 328, only in a different size. As may be appreciated, the sizing for the third-party content item may be determined automatically such that the owner or creator of the resource 220, 320 may not need to determine the right size for a third-party content item for various sizes or configurations of the resource 220, 320.

The CSS classes described above, such as 'contentitem,' may include an asynchronous tag that requests a script. The asynchronous tag may be a tag, such as:
script async
src="/pagead/js/contentitem.js"/script
ins class="contentitem" data-ad-client="ca-pub-1234" data-ad-slot="my-slot"/ins
script(content item=window.content item||[ ]).push({ });/script
that is inserted into a portion of the resource where a third-party content item is to be displayed. In some implementations, the tag may be further configured to limit the geometric types of third-party content items that may be selected. For example, the tag may include a value or values for a variable that limits the geometric types of third-party content items that may be selected, such as a variable named "data-ad-format,". Such geometric types may include horizontal, vertical, rectangle, etc. Thus, including the variable of data-ad-format="horizontal,vertical" in the tag results in only horizontal and vertical content item sizes being eligible for selection for that tag. If data-ad-format is omitted, then any geometric type of content item may be selected.

When the script, such as contentitem.js, is received and executed by the client device, the script may be configured to locate all the portions of the resource where third-party content items will be served and a size determination is needed (e.g., where ins class='contentitem'/ins or div class='contentitem'/div are located), determine a size of a viewport, determine a width of a parent element for each portion where a third-party content item will be served, and determine a content item size for each portion where third-party content items will be served. In some implementations, the script may be triggered to be executed based on a DOMContentLoaded event such that there is enough information about the various sizes of the elements of the resource even if all the elements of the resource have not necessarily finished loading. Thus, the script can determine an appropriate size for the third-party content item for resources that are rendered differently based on the client device, such as web pages implementing responsive web page design. The determination of the content item size may be based, at least in part, on the size of the viewport and the width of a parent element of the resource, as will be described in greater detail herein. The script may be configured to query the document object model (DOM) to find the parent element of the where ins class='contentitem'/ins or div class='contentitem'/div is located and query the DOM for the width of the parent element. In some implementations, the height of the parent element may also be used in the determination of the content item size.

The content item size determination may include selecting a predetermine standard size, such as a standard size specified by the Interactive Advertising Bureau (IAB). Such standard sizes may include 320 px by 50 px, 234 px by 60 px, 468 px by 60 px, 728 px by 90 px, 970 px by 90 px, 125 px by 125 px, 180 px by 150 px, 200 px by 200 px, 250 px by 250 px, 300 px by 250 px, 336 px by 280 px, 120 px by 600 px, 160 px by 600 px, 300 px by 600 px, and/or any other standard content item size. As will be described in greater detail herein, the set of standard sizes may be ranked and the highest ranked standard size may be selected.

In some implementations, the set of standard sizes that may be eligible for ranking may be subject to additional limitations. For example, a standard size may not be ranked if the area of the standard size exceeds a threshold value for a predetermined percentage of a viewport area. The threshold value may be a value between 10%, inclusive, to 50%, inclusive. In one implementation the threshold value may be 15%. In other implementations, the first-party content provider may specify the threshold value. Other limitations to the inclusion of a standard content item size in the ranking may be whether the width of the standard content item size exceeds a width of the viewport, whether the height of the standard content item size exceeds a height of the viewport, and/or whether the standard content item size is an excluded geometric type based on the value or values of the variable of data-ad-format.

Once the set of eligible standard content item sizes is determined, each standard content item size of the set of standard content item sizes may be ranked. The ranking may be based, at least in part, on an area of each predetermined standard content item size, an estimated revenue value of each predetermined standard content item size, and/or a ratio match value. In some implementations, the rating for each standard content item size may be based on the equation:

$$Rating = Area * eRPM * ratio\_match$$

In some implementations, each multiplier in the foregoing equation may be weighted. The area of each predetermined standard content item size may be the pixel area of the predetermined standard content item size, such as 320 px by 50 px, which has an area of 16,000 pixels. The estimated revenue value for a predetermined standard content item size (i.e., estimated revenue per thousand impressions or eRPM in the equation above) may be a value determined for each predetermined standard content item size based on global data for that particular predetermined standard content item size. That is, a list of static values for each standard content item size may be used based on historical data. In other implementations, the estimated revenue value for a predetermined standard content item size may a value that is publisher-specific, website specific, webpage specific, and/or location-specific.

The ratio match value provides a measure of how well suited the predetermined standard content item size is for the portion of the resource where a third-party content item will be served. The ratio match value may be based on a width of a parent element and a width of the viewport. In brief, vertical standard content item sizes may be preferable to be displayed in narrow columnar portions of the displayed resource, horizontal standard content item sizes may be preferable to be displayed in wide portions of the displayed resource, and rectangular standard content item sizes may be preferable to be displayed in the remaining portions of the displayed resource. In an implementation, an if-then statement may be used to sort standard content item sizes based on the ratio match value. For example:
if width of parent element<=25% of width of body:
   favor vertical, then square, then horizontal
else if width of parent element<=50% of width of body:
   favor square then horizontal then vertical
else:
   favor horizontal then square then vertical.

Figure 4:
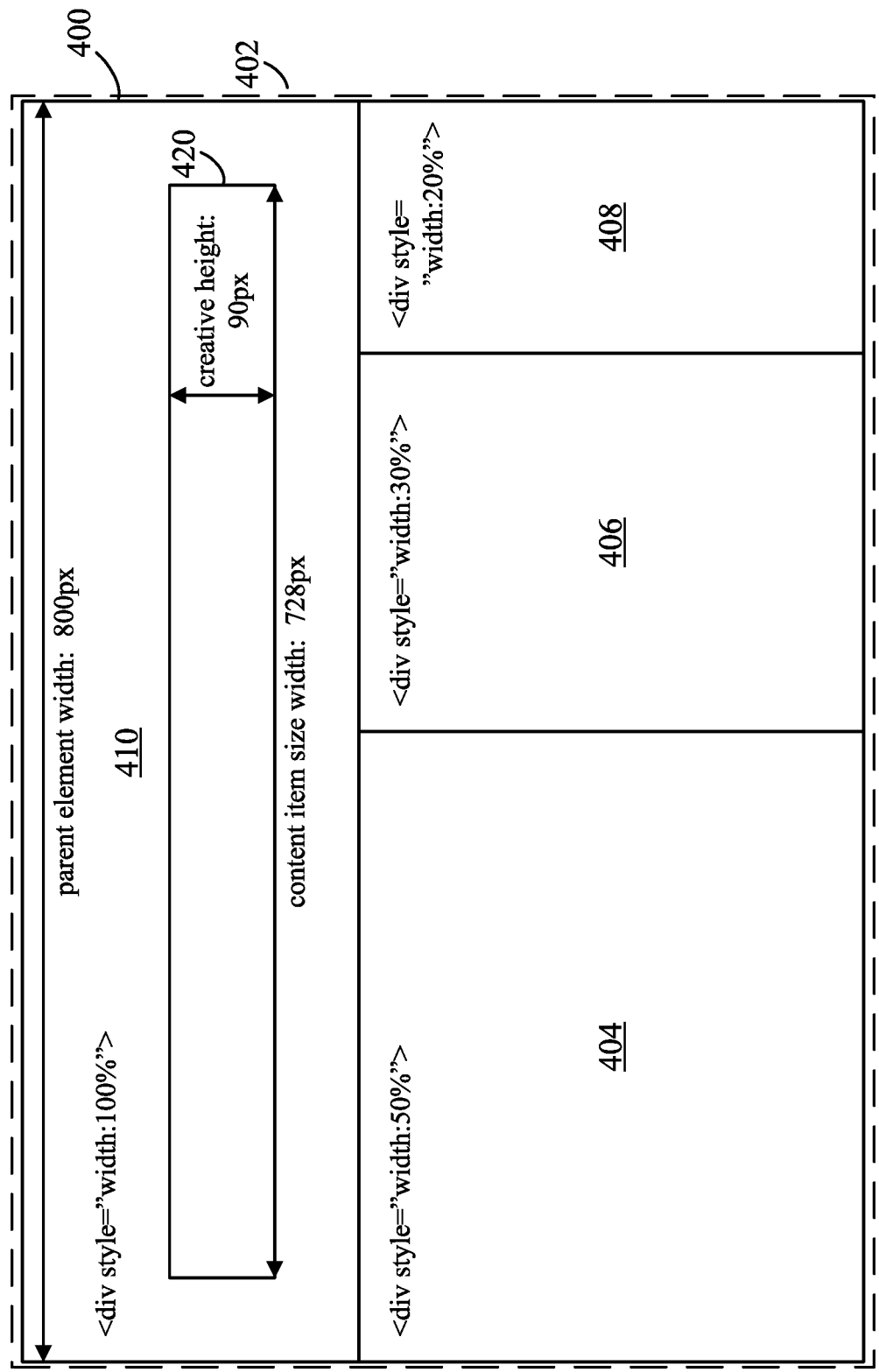
FIG. 4 is an illustration of an implementation of a first-party resource having multiple divisions and showing an example third-party content item in a parent element.

Another implementation may determine a value for the ratio match value based on a percentage of a width of a parent element that the standard content item size would occupy. For example, FIG. 4 is an illustration of an implementation of a first-party resource 400 shown in a viewport 402. The resource 400 includes multiple divisions of elements 404, 406, 408, 410 and showing an example third-party content item 420 having a standard content item size of 728 pixels by 90 pixels in a parent element 410. The parent element 410 has a width of 800 pixels and spans across the entire width of the viewport 402. For a set of standard content item sizes, such as those enumerated above, the standard content item size that does not exceed the width of the parent element 410 and occupies the highest percentage of the width of the parent element 410 is the standard content item size of 728 pixels by 90 pixels; an example third-party content item 420 of this size is shown within the parent element 410. Thus, the ratio match value for the standard content item size of 728 px by 90 px may be determined to be 728 divided by 800, or 0.91 or 91%. The ratio match value may be used in the rating equation described above to determine a rating for the standard content item size such that a standard content item size with the best rating may be determined and selected. The other standard content item sizes may also have ratio match values determined in a similar manner.

Figure 5A:
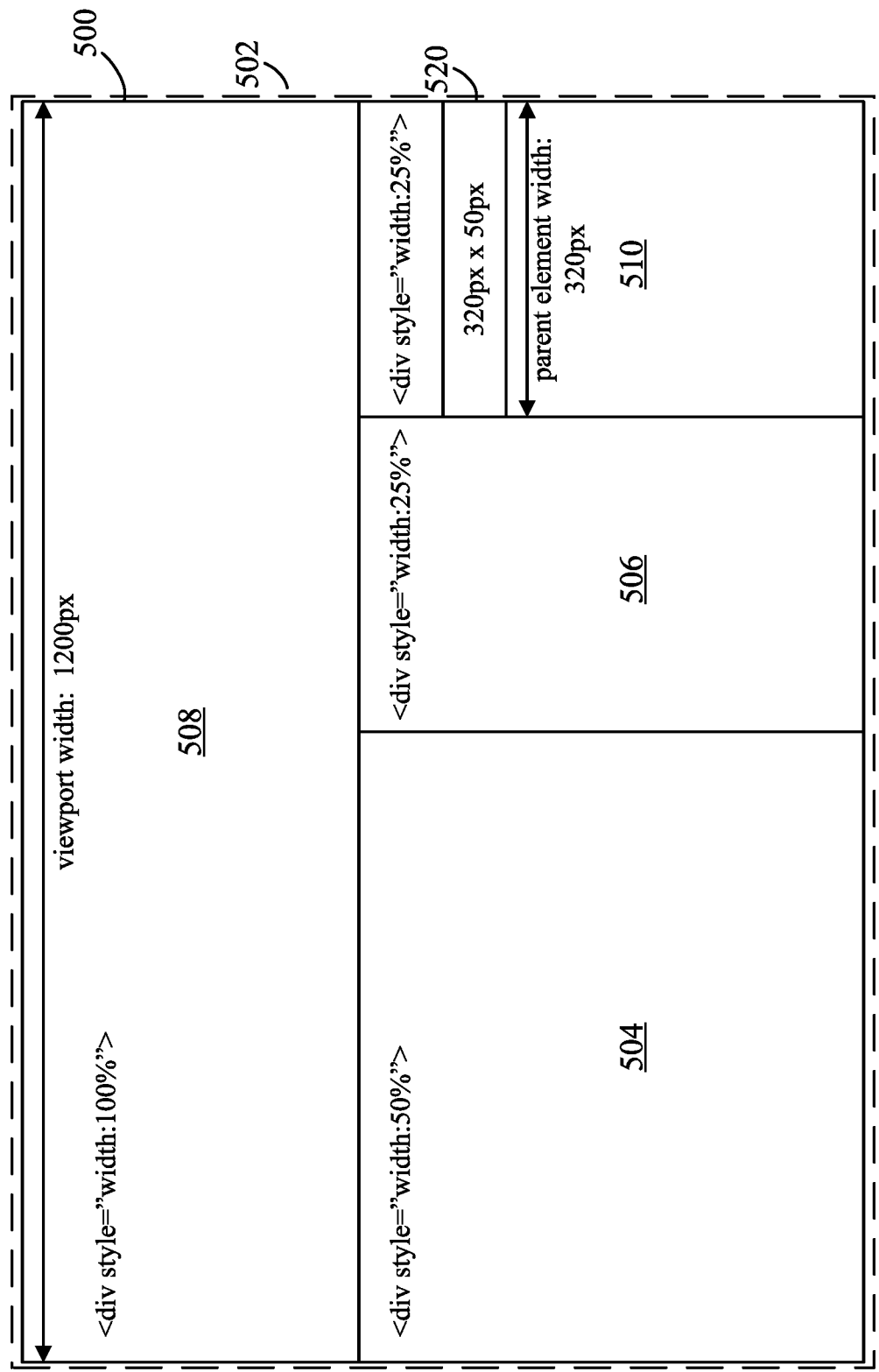
FIG. 5A is an illustration of an implementation of a first-party resource having multiple divisions and showing an example third-party content item in a parent element.
Figure 5B:
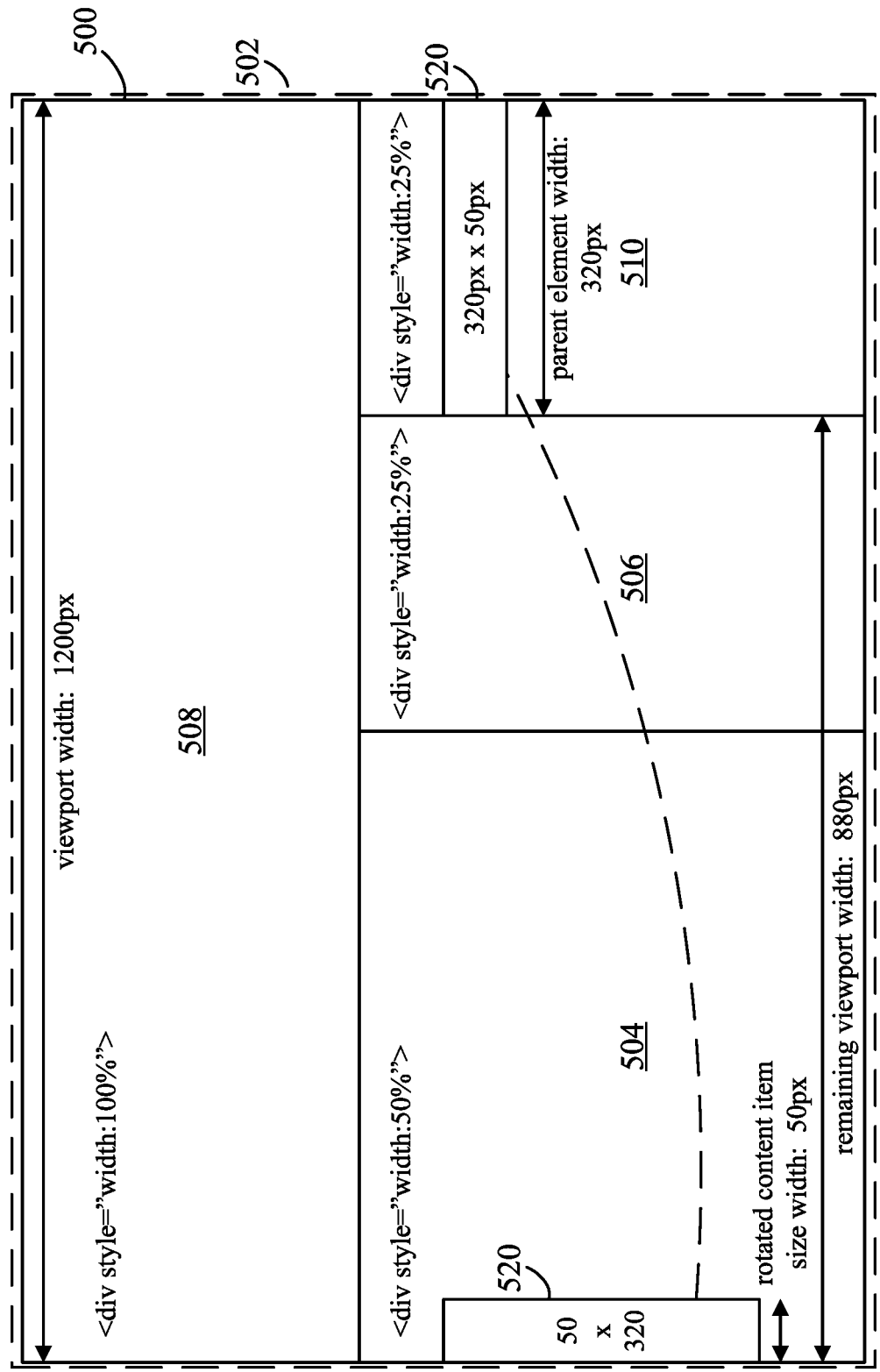
FIG. 5B is an illustration of the first-party resource of FIG. 5A showing the example third-party content item rotated relative to the first-party resource.

Another implementation may determine the ratio match value based on a percentage of a width of a parent element that the standard content item size would occupy and a percentage of a remaining portion of a viewport width that a height dimension of the standard content item size would occupy. FIG. 5A is an illustration of an implementation of a first-party resource 500 shown in a viewport 502. The resource 500 includes multiple divisions of elements 504, 506, 508, 510 and showing an example third-party content item 520 having a standard content item size of 320 pixels by 50 pixels in a parent element 510. The parent element 510 has a width of 320 pixels and spans 25% of the width of the viewport 502. For the standard content item size of the content item 520, the percentage of the width of the parent element 510 that the standard content item size occupies is 100% (i.e., 320 px divided by 320 px is one). However, as shown in FIGS. 5A-5B, the standard content item size of 320 pixels by 50 pixels occupies very little vertical space of the parent element 510. Accordingly, a second percentage may be calculated based on a remaining portion of the viewport 502 width (i.e., after subtracting the width of the parent element 510 from the total width of the viewport 502) and a height dimension of the standard content item size, shown in FIG. 5B. The width of the remaining portion of the viewport 502 in the example shown is 880 pixels (1200 pixels minus 320 pixels). The percentage of the height dimension of the standard content item size relative to the width of the remaining portion of the viewport 502 is 50 divided by 880, or approximately 6%. Thus, the ratio match value for the standard content item size of 320 pixels by 50 pixels for the parent element 510 may be the first percentage, 100% or 1.0, multiplied by the second percentage, 6% or 0.06, resulting in a ratio match value of 0.06.

In contrast, for a standard content item size of 300 pixels by 600 pixels for a third-party content item to be displayed in the parent element 510, the first percentage is approximately 94% (300 pixel width for the standard content item size divided by 320 pixel width for the parent element 510) and the second percentage is approximately 68% (600 pixel height for the standard content item size divided by 880 pixel width of the remaining portion of the viewport 502). Accordingly, the ratio match value for the standard content item size of 300 pixels by 600 pixels may be 0.94 multiplied by 0.68, or approximately 0.64. As may be appreciated, the standard content item size of 300 pixels by 600 pixels has a greater ratio match value than the standard content item size of 320 pixels by 50 pixels, which indicates that the standard content item size of 300 pixels by 600 pixels is likely to be better suited for portion of the resource where a third-party content item will be served.

In some implementations, a multiplier may be used with the second percentage of the ratio match value. For example, for a vertical standard content item size, such as 120 px by 600 px, 160 px by 600 px, or 300 px by 600 px, a multiplier for the second percentage may be zero since the vertical format may be out of proportion relative to the rest of the resource. The multiplier for horizontal or rectangular standard content item sizes, such as 320 px by 50 px, 234 px by 60 px, 468 px by 60 px, 728 px by 90 px, 970 px by 90 px, 125 px by 125 px, 180 px by 150 px, 200 px by 200 px, 250 px by 250 px, 300 px by 250 px, or 336 px by 280 px, may be between 1, inclusive, and 2, inclusive. In some implementations, the multiplier for horizontal standard content item sizes, such as 320 px by 50 px, 234 px by 60 px, 468 px by 60 px, 728 px by 90 px, or 970 px by 90 px, may be 1 and the multiplier for rectangular standard content item sizes, such as 125 px by 125 px, 180 px by 150 px, 200 px by 200 px, 250 px by 250 px, 300 px by 250 px, or 336 px by 280 px, may be 1.5.

Once each eligible standard content item size of the set of standard content item sizes is ranked, then the top ranked standard content item size may be determined. The height value of the determined standard content item size and the width of the parent element are sent to the content item selection system, such as part of a content item request. In the implementation shown in FIG. 4, the height value is set to 90 pixels, which is the height of the determined standard content item size, and the width value is set to 800 pixels, which is the width of the parent element 410. The full width of the parent element 410 is sent such that, if a textual third-party content item is selected by the content item selection system, then the full width of the parent element 410 may be used for displaying the textual content item. If an image third-party content item is selected by the content item selection system then the standard content item size may be used. Data to effect display of the selected content item may be transmitted to the client device such that the selected content item is displayed with the resource.

In some implementations, further limits may be applied during the selection of content item sizes. For example, a total limit threshold value may be used such that the total area of all the content item sizes does not exceed a predetermined percentage of the viewport area or a total limit threshold value may be used such that the total area of the content item sizes above the fold do not exceed a predetermined percentage of the viewport area.

Figure 6:
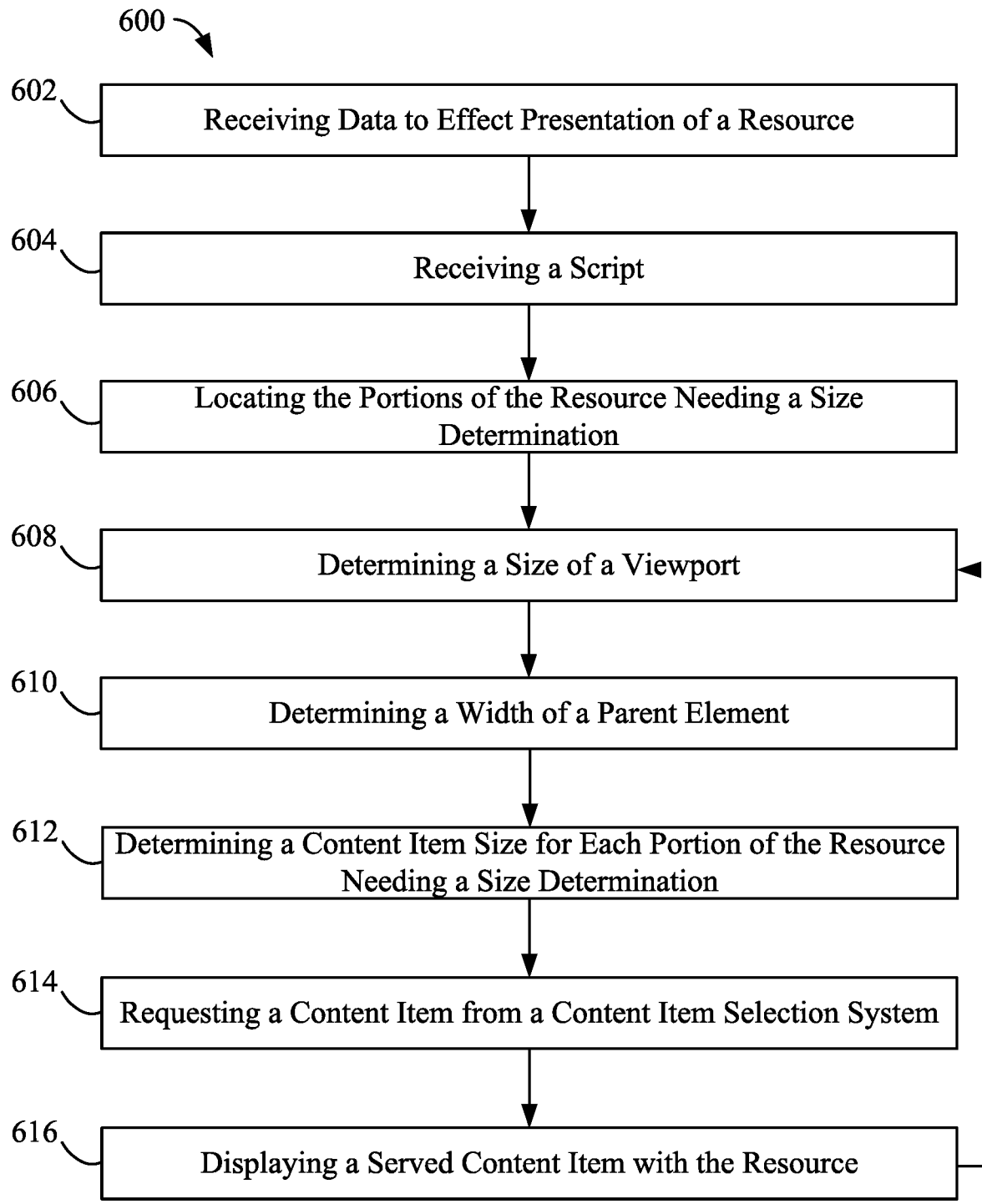
FIG. 6 is a flow diagram of an implementation of a process to automatically determine a size for a content item based on a parent element of the content item slot.

FIG. 6 depicts an example flow diagram of a process 600 that may be implemented by a client device, such as client device 110 of FIG. 1A, to automatically determine a size for a content item based on a parent element. The process 600 includes receiving data to effect presentation of a requested resource (block 602). The client device may request the data to effect presentation of a resource via a user entering a URL into an address portion of a web browser. A resource server, such as resource server 104 of FIG. 1A, sends the data to effect presentation of the resource to the client device via network 106.

The process 600 further includes receiving a script (block 604). In some implementations the script may be requested and received from another device, such as the content item selection system 108 of FIG. 1A or another device. In some other implementations, the script may be cached on the client device and retrieved and executed.

The script is configured to cause the client device to locate the portions of the resource where third-party content items will be served and a size determination is needed (block 606). The locating of the portions of the resource where third-party content items will be served and a size determination is needed may include identifying the portions of the resource having an insert element for "ins class='contentitem'/ins". In other implementations, other identifiers to indicate the locations in the resource where third-party content items will be served and a size determination is needed may be used, such as "div class='contentitem'/div".

The script is further configured to cause the client device to determine a size of a viewport (block 608). In some implementations, the determination of the size of the viewport may include retrieving the values for body offsetWidth and body offsetHeight for the width and height of the body of the resource. The script is further configured to cause the client device to determine a width of a parent element for each portion where a third-party content item will be served (block 610). For example, the determination of the parent element width may be determined based on the viewport width, a parent element of the parent element, a static value for the parent element width, etc. In some implementations, the script may be configured to query the DOM to find the parent element of the where ins class='contentitem'/ins or div class='contentitem'/div is located and query the DOM for the width of the parent element. The height of the parent element may also be queried and used in the determination of the content item size.

The script is further configured to cause the client device to determine a content item size for each portion where third-party content items will be served (block 612). The determination of the content item size may be based, at least in part, on the size of the viewport and the width of a parent element of the resource, as described in greater detail herein. In some implementations, the height of the parent element may also be used in the determination of the content item size. The content item size determination may include selecting a predetermine standard content item size based on a ranking of each predetermined standard content item size. As noted above, the set of standard sizes that may be eligible for ranking may be subject to additional limitations in some implementations. For example, a predetermined standard content item size may not be ranked if the standard size exceeds a threshold value for a predetermined percentage of a viewport area, such as a threshold value of 15% of the area of the viewport. A predetermined standard content item size may also not be ranked if the width of the standard size exceeds the width of the parent element and/or the height of the standard size exceeds the height of the parent element. Once the set of eligible standard content item sizes is determined, each standard content item size of the set of standard content item sizes may be ranked. The ranking may be based, at least in part, on an area of each predetermined standard content item size, an estimated revenue value of each predetermined standard content item size, and/or a ratio match value. In some implementations, the rating for each standard content item size may be based on the equation:

$$Rating = Area * eRPM * ratio\_match$$

In some implementations, each multiplier in the equation may be weighted. The area of each predetermined standard content item size may be the pixel area of the predetermined standard content item size. The estimated revenue value for a predetermined standard content item size (i.e., estimated revenue per thousand impressions or eRPM in the equation above) may be a value determined for each predetermined standard content item size based on global data for that particular predetermined standard content item size. In other implementations, the estimated revenue value for a predetermined standard content item size may a value that is publisher-specific, website specific, webpage specific, and/or location-specific.

The ratio match value may be based, at least in part, on the width of the parent element and a width of the viewport. In some implementations, the ratio match value for each predetermined standard content item size may be based, at least in part, on a ratio of a first dimension of the standard content item size, such as a width dimension, to the width of the parent element. In a further implementation, the ratio match value for each predetermined standard content item size may be based, at least in part on a ratio of a second dimension of each standard content item size, such as a height dimension, to the width of the viewport less the width of the parent element. Once each eligible standard content item size of the set of standard content item sizes is ranked, then the top ranked standard content item size may be determined.

A content item may be requested by the client device from a content item selection system (block 614) for each portion of the resource needing a third-party content item. The content item request may include the height value of the determined standard content item size and the width value of the parent element. In other implementations, the content item request may include the height value and the width value of the determined standard content item size. The request may be in the form of a content item request URL. In some implementations, device and/or the resource information or parameters may also be included with the content item request, such as appended to a content item request URL (e.g., /page/contentitem?devid=abc123&devnfo=A34r0).

A content item served in response to the content item request may be displayed with the resource (block 616). The client device may receive data to effect display of a served content item from a content item selection system. Using the received data, the client device may display the served content item with the resource.

In some implementations, the process 600 may determine a second content item size based on a second size of the viewport and/or a second width of the parent element (block 608, 610, 612). For example, as shown in FIGS. 2B and 3B, a resource may be modified or resized in response to a reduction in size to a web browser window or an orientation change of a mobile device or tablet. The script may be configured to query the DOM to find the parent element of the where ins class='contentitem'/ins or div class='contentitem'/div is located and query the DOM for the new width of the parent element. The new height of the parent element may also be queried and used in the determination of the second content item size. In some instances, the client device may request a second content item from the content item selection system (block 614) and display the served second content item with the resource (block 616). In other implementations, the script may be configured to cause the client device to resize the originally served content item based on the determined second content item size (e.g., via seam carving, stretching, etc.). In some implementations, the served second content item may be the same as previous served content item but having a size according to the determined second content item size.

Figure 7:
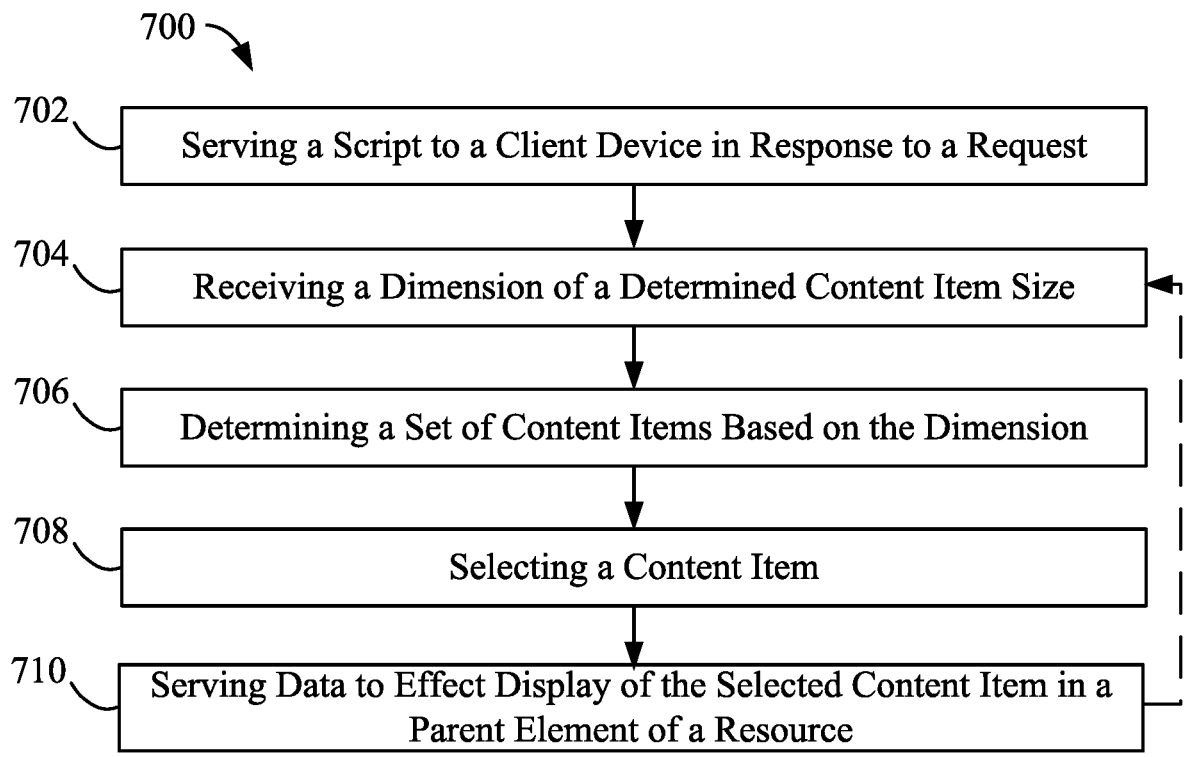
FIG. 7 is a flow diagram of an implementation of a process to select and serve a content item based on an automatic determination of a size for the content item.

FIG. 7 depicts an example flow diagram of a process 700 that may be implemented by a content item selection system, such as content item selection system 108 of FIG. 1A, to select and serve a content item based on an automatic determination of a size for the content item. The process 700 includes serving a script to a client device in response to a request (block 702). The script is configured to cause the client device to perform several operations described herein, including one or more of the operations described in reference to blocks 606, 608, 610, 612 of FIG. 6. For example, the script may be configured to cause the client device to cause the client device to locate the portions of the resource where third-party content items will be served and a size determination is needed, determine a size of a viewport, determine a width of a parent element for each portion where a third-party content item will be served, and/or determine a content item size for each portion where third-party content items will be serve. In some implementations, the height of the parent element may also be used in the determination of the content item size.

The determination of the content item size may be based, at least in part, on the size of the viewport and the width of a parent element of the resource, as described in greater detail herein. The content item size determination may include selecting a predetermine standard content item size based on a ranking of each predetermined standard content item size. The set of standard sizes that may be eligible for ranking may be subject to additional limitations in some implementations. For example, a predetermined standard content item size may not be ranked if the standard size exceeds a threshold value for a predetermined percentage of a viewport area, such as a threshold value of 15% of the area of the viewport. Once the set of eligible standard content item sizes is determined, each standard content item size of the set of standard content item sizes may be ranked. The ranking may be based, at least in part, on an area of each predetermined standard content item size, an estimated revenue value of each predetermined standard content item size, and/or a ratio match value. In some implementations, the rating for each standard content item size may be based on the equation:

$$Rating = Area * eRPM * ratio\_match$$

In some implementations, each multiplier in the equation may be weighted. The area of each predetermined standard content item size may be the pixel area of the predetermined standard content item size. The estimated revenue value for a predetermined standard content item size (i.e., estimated revenue per thousand impressions or eRPM in the equation above) may be a value determined for each predetermined standard content item size based on global data for that particular predetermined standard content item size. In other implementations, the estimated revenue value for a predetermined standard content item size may a value that is publisher-specific, website specific, webpage specific, and/or location-specific.

The ratio match value may be based, at least in part, on the width of the parent element and a width of the viewport. In some implementations, the ratio match value for each predetermined standard content item size may be further based, at least in part, on a ratio of a first dimension of the standard content item size, such as a width dimension, to the width of the parent element. In a further implementation, the ratio match value for each predetermined standard content item size may be based, at least in part on a ratio of a second dimension of each standard content item size, such as a height dimension, to the width of the viewport less the width of the parent element. Once each eligible standard content item size of the set of standard content item sizes is ranked, then the top ranked standard content item size may be determined by the client device. In some implementations, the script may be further configured to ease the transition display of the resource once the content item size is determined. For example, the script may include "transition:

height 0.5s ease-out;" to cause the client device to ease the height out to the height of the determine content item size over half a second to smoothly expand the resource displayed on a display of the client device.

A dimension, such as a height or a width, of the determined content item size may be received (block 704). The dimension of the determined content item size may be received as part of a content item request from a client device. The content item request may also include a dimension of the parent element, such as a width value or a height value. In one implementation, the content item request may include the height value of the determined standard content item size and the width value of the parent element. The request may be in the form of a content item request URL. In some implementations, device and/or the resource information or parameters may also be included with the content item request, such as appended to a content item request URL (e.g.,./page/contentitem?devid=abc123&devnfo=A34r0).

A set of content items may be determined based, at least in part, on the received dimension of the determined content item size (block 706). In some implementations, image content items having a content item size corresponding to the determined content item size, based on the received dimension, may be included in the set of content items for a content selection process to be performed by the content item selection system. The set of content items may also include textual content items or other content items. A content item may be selected (block 708) based, at least in part, on a content selection process performed by the content item selection system. The selection of the content item may be based on a bid associated with each content item of the set of content items in the content selection process. In some implementations, a score may be generated for each content item of the set of content items in the content selection process and the score may be used to rank each content item of the set of content items. A content item may be selected based on the rank by the content item selection system.

Data to effect display of the selected content item in a parent element of a resource (block 710). The data may be transmitted from the content item selection system 108 to a client device 110 and/or resource server 104 via the network 106.

In some implementations, the process 700 may receive a dimension of a second content item size based on a second size of the viewport and/or a second width of the parent element as determined by the script, such as that described in reference to blocks 608, 610, 612 of FIG. 6. For example, as shown in FIGS. 2B and 3B, a resource may be modified or resized in response to a reduction in size to a web browser window or an orientation change of a mobile device or tablet. In some instances the process 700 may further include receiving a dimension of the determined second content item size and serving second data to the client device to effect display of the selected content item with the resource based on the dimension of the determined second content item size. In other implementations, the script may be configured to cause the client device to resize the originally served content item based on the determined second content item size (e.g., via seam carving, stretching, etc.).

In some implementations, the dimensions of the determined content item size included in the content item request may be stored in a database of the content item selection system or another system. The dimensions of the served content item may also be stored in the database. In addition, any specific requested shapes, e.g., vertical, horizontal, and/or rectangular, may be stored in the database. The requested dimensions and served dimensions may be integer widths and heights. The requested shapes may be defined as an enum. The stored requested dimensions, served dimensions, and/or the requested shapes may be used to generate reporting data, such as numerical data or a visualization. The requested width dimensions may be bucketized into buckets such as <120 px, >=120 px<125 px, >=125 px<160 px, >=160 px<180 px, >=180 px<200 px, >=200 px<234 px, >=234 px<250 px, >=250 px<300 px, >=300 px<320 px, >=320 px<336 px, >=336 px<468 px, >=468 px<728 px, >=728 px<970 px, and/or >=970 px. Thus, statistical data may be generated for a first-party content provider of a resource regarding the performance of various sized content items and/or for a third-party content provider regarding the performance of their various sized content items.

In some implementations, one or more operations of the script may be performed by the content item selection system. For example, the script may be configured to output the viewport size and the parent element width to the content item selection system and the content item selection system may be configured to determine the content item size, determine a set of content items based on the determined content item size, select a content item, and serve the selected content item to the client device to be displayed in the parent element with the resource.

Figure 8:
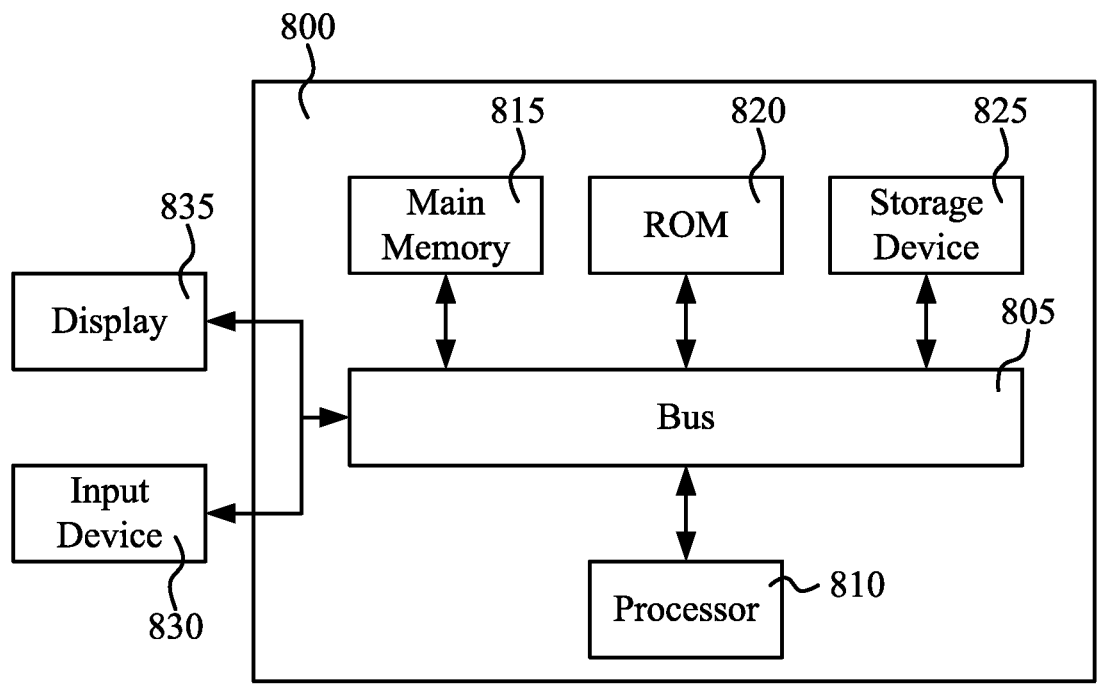
FIG. 8 is a is a block diagram illustrating a general architecture for a computer system that may be employed to implement various elements of the systems and methods described and illustrated herein.

FIG. 8 is a block diagram of a computer system 800 that can be used to implement the client device 110, content item selection system 108, third-party content server 102, resource server 104, etc. The computing system 800 includes a bus 805 or other communication component for communicating information and a processor 810 or processing module coupled to the bus 805 for processing information. The computing system 800 can also include one or more processors 810 or processing modules coupled to the bus for processing information. The computing system 800 also includes main memory 815, such as a RAM or other dynamic storage device, coupled to the bus 805 for storing information, and instructions to be executed by the processor 810. Main memory 815 can also be used for storing position information, temporary variables, or other intermediate information during execution of instructions by the processor 810. The computing system 800 may further include a ROM 820 or other static storage device coupled to the bus 805 for storing static information and instructions for the processor 810. A storage device 825, such as a solid state device, magnetic disk or optical disk, is coupled to the bus 805 for persistently storing information and instructions. Computing device 800 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 800 may be coupled via the bus 805 to a display 835, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. An input device 830, such as a keyboard including alphanumeric and other keys, may be coupled to the bus 805 for communicating information and command selections to the processor 810. In another implementation, the input device 830 may be integrated with the display 835, such as in a touch screen display. The input device 830 can include a cursor control, such as a mouse, a trackball, or cursor direction keys, for communicating direction information and command selections to the processor 810 and for controlling cursor movement on the display 835.

According to various implementations, the processes and/or methods described herein can be implemented by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes and/or method steps described herein. One or more processors in a multi-processing arrangement may also be employed to execute the instructions contained in main memory 815. In alternative implementations, hard-wired circuitry may be used in place of or in combination with software instructions to effect illustrative implementations. Thus, implementations are not limited to any specific combination of hardware circuitry and software.

Figure 9:
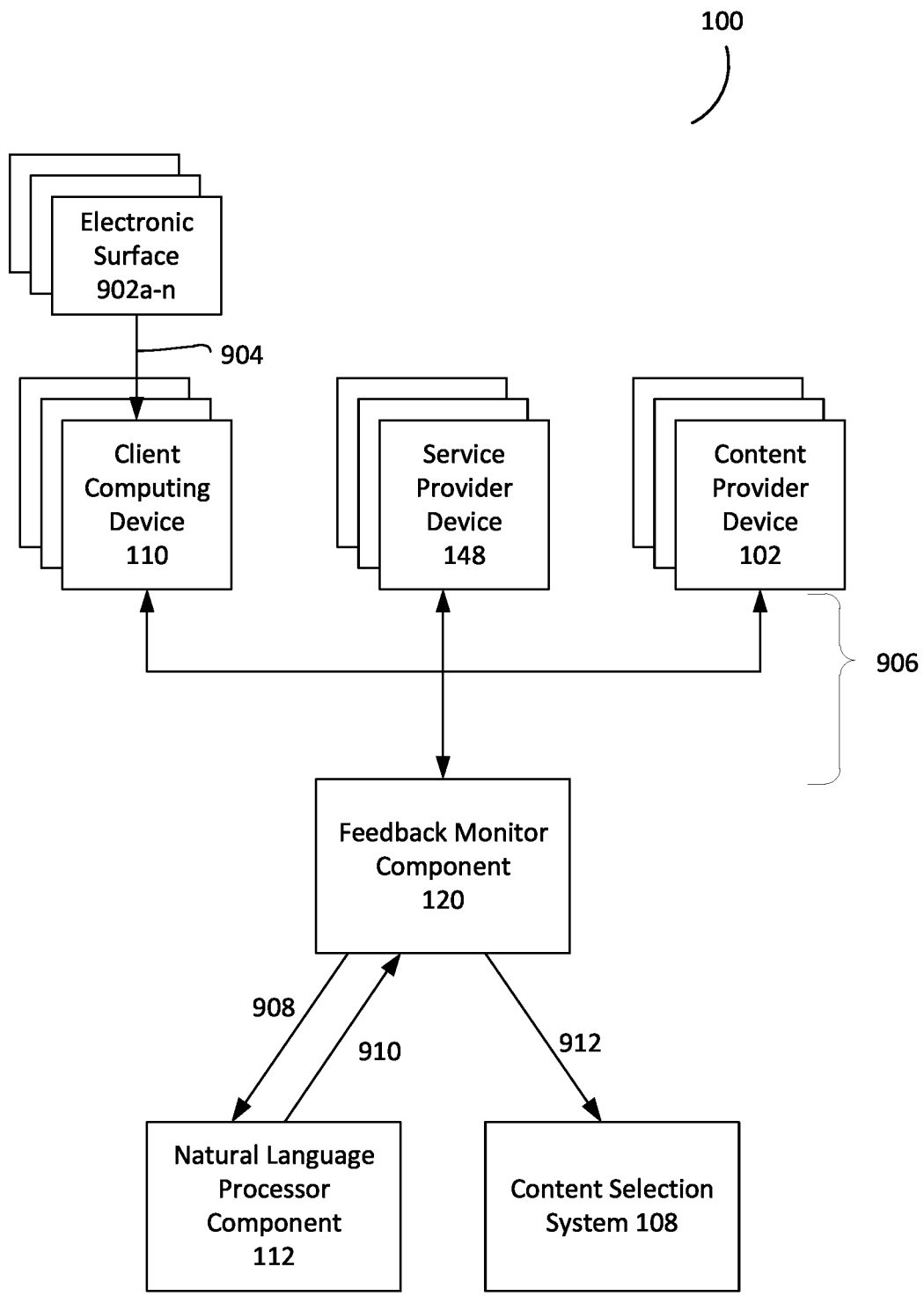
FIG. 9 is an illustration of an operation of a feedback control system for data transmissions over a computer network.

FIG. 9 is an illustration of an operation of a feedback control system for data transmissions over a computer network. The system can include one or more component of system 100 depicted in FIG. 1A and FIG. 1B. The system 100 can include one or more electronic surfaces 902a-n that are executed or provided by one or more client computing devices 110a-n. Examples of electronic surfaces 902a-n can include audio interfaces, voice-based interfaces, display screen, HTML content items, multimedia, images, video, text-based content items, SMS, messaging application, chat application, or natural language processors.

At ACT 904, the client computing device 110 can receive data packets, signals or other information indicative of a feedback from or via an electronic surface 902. At ACT 906, the one or more client computing devices 110a-n, one or more service provider device 148, or the one or more third party content servers 102 can transmit data packets to the feedback monitor component 120. The data packets can be associated with the communication session established between the client device 110 and one or more of the service provider device 148 or the third party content servers 102. The data packets can be transmitted from a respective device to the feedback monitor component 120.

In some cases, the feedback monitor component 120 may intercept data packets transmitted from a device 110, 102 or 148 to a respective device. The feedback monitor component 120 can analyze the intercepted data packet and route or forward the data packet to its intended destination. Thus, the feedback monitor component 120 can be intermediary to the client device 110 and the service provider device 148 or the service provider device 148.

At ACT 908, the feedback monitor component 120 can transmit the intercepted or received data packets from the communication session to the NLP component 112. At ACT 910, the NLP component 112 can perform a semantic analysis of the data packets and provide them back to the feedback component 120. In some cases, the NLP component 112 can perform natural language processing on the audio signals from the communication session 906 to compare the NLP component's responses generated by the provider devices 102 or 148. The feedback monitor component 120 can compare the responses generated by a control NLP component 112 to determine whether the third party NLP components are functioning on a comparable or satisfactory level.

At ACT 912, the feedback monitor component 120 can determine a quality signal for the communication session 906, and adjust the real-time content selection process performed by the content selection system 108 such that the next time the content selection system 108 receives a request for content, the content selection system 108 can appropriately weight the content item (or content provider) associated with the communication session 906 to either increase or decrease the likelihood of the content item being selected. For example, if provider 148 is associated with a plurality of low quality communication session, the feedback monitor component 120 can instruct the content selection system 108 to prevent selecting content items that can result in establishment of a communication session with provider 148.

Referring to FIG. 1A, FIG. 1B, and FIG. 9, among others, based on the sequence dependency parameter, the thread optimization component 150 can create at least one single thread data structure 1000. The single thread data structure 1000 can include a packet based architecture (or other format) and can include at least one header 1005. The header 1005 can include supplemental data identifying the data processing system 101, source or destination address information, governing protocol information, IP addresses, frame synchronization data, size data, resolution data, or metadata associated with action data structures. The payload or body of the single thread data structure 1000 can include at least one sequence dependency parameter 1010, or other information such as at least one first data transmission 1015 or at least one second data transmission 1020. The single thread data structure 1000 can include one or more than one structures, e.g., multiple packets having respective headers 1005 and payloads indicating at least part of the first data transmission 1015 or the second data transmission 1020. The sequence dependency parameter 1015 can indicate a sequence dependency of actions from the plurality of actions indicated by the first data transmission 1015 or the second data transmission 1020.

The header 1005, sequence dependency parameter 1010, first data transmission 1015, and the second data transmission 1020 may but need not be included in the single thread data structure 1000. For example, the body of the single thread data structure 1000 can include only the first data transmission 1015 (or portion thereof) and not include any of the sequence dependency parameter 1010 or the second data transmission 1020, or the body of the single thread data structure 1000 can include the sequence dependency parameter 1010 as well as one or more of the first data transmission 1015 and the second data transmission 1020. The single thread data structure 1000 can include one or more individual packets transmitted separately in sequence or parallel as part of one or more data transmissions between the data processing system 101 and the service provider device 148 or the third-party content server 102. The header 1005 or the sequence dependency parameter 1010 can indicate that the separate transmissions or separate data packets are associated with the same batch transmission, e.g., the same overall single thread data structure 1000. The direct action API 116 can merge or otherwise link together multiple different single thread data structures into one single thread data structure 1000. The single thread data structure 1000 can include multiple packets or multiple different structures that are separate but associated with one another.

The thread optimization component 150 can prioritize one action of the single thread data structure 1000 over another action. The prioritization can be indicated by the sequence dependency parameter 1010 or otherwise provided to the direct action API 116 or the content selection system 108. For example, the thread optimization component 150 can prioritize a first in time action indicated by the single thread data structure 1000. Responsive to the prioritization, the direct action API 116 or other component such as the content selection system 108 can provide data transmissions (e.g., at least part of the first data transmission 1015 or the second data transmission 1020) to the third-party content server 102 or to the service provider device 148 to effect a conversion related to the first in time action.

Figure 10:
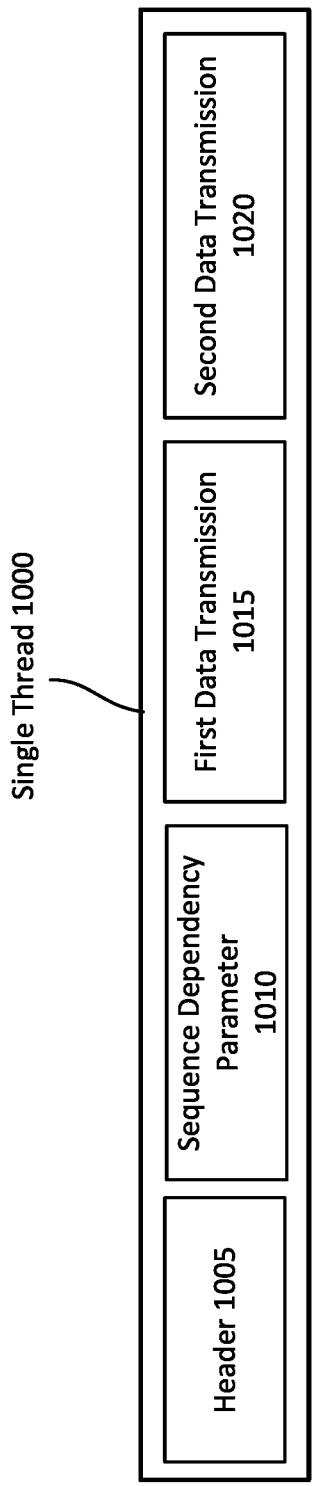
FIG. 10 depicts a functional diagram of a single thread structure for a voice activated data packet based computer network environment.
Figure 11:
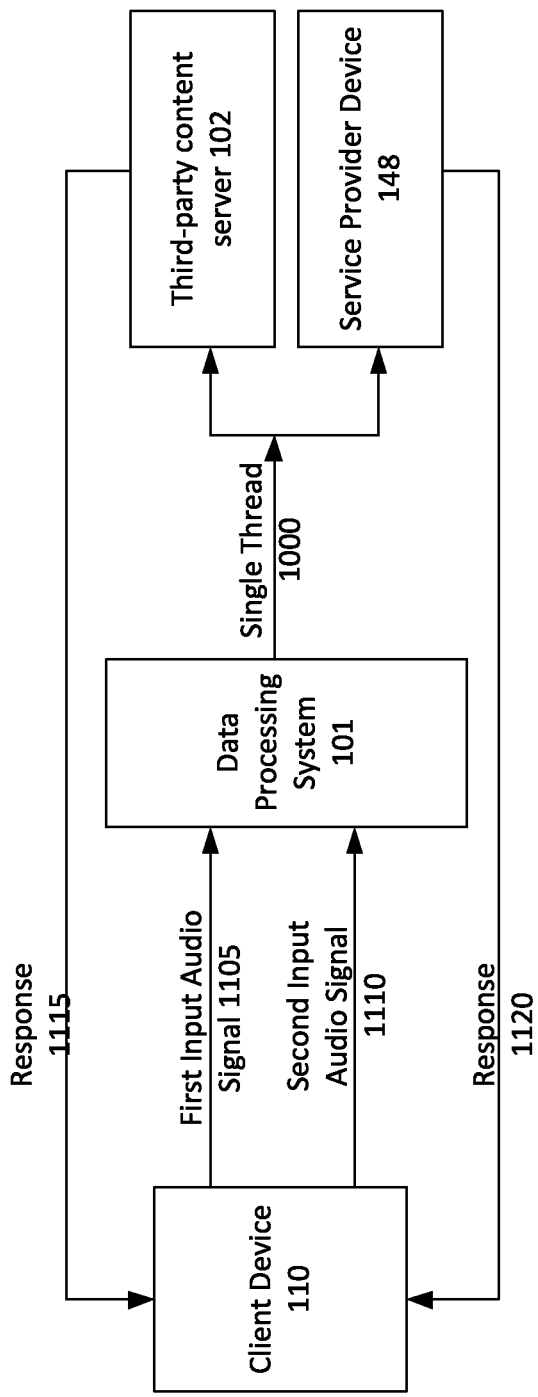
FIG. 11 depicts a functional diagram of thread data structure generation and communication between remote data processing systems and service provider computing devices in a voice activated data packet based computer network environment.

Referring to FIG. 10, among others, the data processing system 101 can receive, from a first client device 110, the first input audio signal 1105, (e.g., "OK, I would like to go to go dinner tonight"). The data processing system 101 can also receive, from the same or a different client device 110, the second input audio signal 1110, (e.g., "OK, I would like to catch a movie later"). The data processing system 101 can generate respective action data structures and corresponding data transmissions for the first and second audio input signals 1105, 1110. Data processing system 101 components such as the thread optimization component 150 can apply statistical or heuristic techniques to the first input audio signal 1105 and the second input audio signal 1110 to generate at least one sequence dependency parameter indicative of sequence dependent actions from among the actions of the first input audio signal 1105 and the second input audio signal 1110. The data processing system 101 can batch or pool the data transmission (e.g., packets) or the action data structures corresponding to the first input audio signal 1105 and the second input audio signal 1110 to create the batched or pooled single thread data structure 1000. The data processing system 101 can transmit or otherwise provide the single thread data structure 1000 to the service provider device 148 for processing by the service provider device 148 to, for example reserve at least one car, purchase movie tickets, or make a dinner reservation responsive to the first and second input audio signals 1105, 1110.

Different instances of portions of the same single thread data structure can be provided to different computing devices. For example, all or some of the single thread 1000 can be provided to a service provider device 148 to effect a conversion, e.g., order a car from a car share service, and the same or different portions of the single thread 1000 can be provided (simultaneously is sequentially) to a third-party content server 102 to effect another conversion, e.g., obtain a content item for a restaurant.

Responsive to receipt of the single thread data structure 1000, the third-party content server 102 or the service provider device 148 can perform at least one operation defined or indicated by the single thread data structure 1000. The operation can correspond to one or more of the respective actions of the action data structures (or data transmissions) of the first or second input audio signals 1105, 1110. For example, the operations can include reserving a car from a car share service, from the service provider device 148, or providing a content item for a movie. For example, the third-party content server 102 can provide a first response 1115 (e.g., a content item for a movie) to the client device 110, and the service provider device 148 can provide a second response 1120 (e.g., to reserve a car) to the same or a different client device 110. The first and second responses 1115, 1120, can bypass the data processing system 101 during transmission from the third-party content server 102 or the service provider device 148 to the client device 110. The responses 1115, 1120, can include text, image, or other data messages (including audio) that confirm a conversion action, such as a reservation for a car from a car service or rending of a content item. The data processing system 101 can receive an indication of the conversion (or of the responses 1115, 1120) via the computer network 165 from the service provider device 148, the third-party content server 102, or from the client device 110.

The single thread 1000 created by the data processing system 101 (e.g., by the thread optimization component 150 or the direct action API 116) can indicate an actual, known, scheduled, or estimated time of actions that correspond to the thread. These times can include movie start times, transport pick up times, dinner reservation times, or event times, among others. The times can be discrete times, e.g., 8:00 pm dinner reservations, or relative times relative to other actions, e.g., the action 'B' is scheduled to begin 15 minutes after the known or estimated conclusion time of action 'A'. For example, the thread 1000 can indicate that a first action (e.g., eating dinner) is scheduled to occur prior to a second action (e.g. watching a movie). These actions can correspond to data structure (or data transmission) actions identified from input audio signals. The direct action API 116 can detect the completion of a first action. For example, the client device 110 can execute a script to pay the bill at the restaurant, or the direct action API 116 can estimate that dinner will last for 90 minutes, or the end user can provide an audio input signal or other data message to indicate that the first action is complete or scheduled for completion at a time or within a time window. Responsive to detection of completion (e.g., a known or estimate end time) of a first action, the direct action API 116 can proceed to transmit data packets of the single thread to a service provider device 148 or to a third-party content server 102. This transmission can occur subsequent to known or estimated completion of the first action, or during a time window, (e.g., within one hour) of known or estimated completion of the first action. For example, upon completion of dinner, the direct action API 116 can provide at least part of the single thread 1000 to a service provider device 148 to purchase movie tickets, or to a third-party content server 102 to obtain a content item for a movie. Indications of the conversions (e.g., purchase of the tickets or rendering of the content item at the client device 110) can be provided to the data processing system 101 from the client device 110, the third-party content server 102, or the service provider device 148. The sequence dependency parameter 1010 can indicate the order in which actions of the single thread 1000 are scheduled to occur, e.g., can indicate that a first action is scheduled to occur prior to a second action.

The direct action API 116 can identify at least one deadlock condition of at least one action of the single thread 1000. A deadlock condition can indicate that a second action cannot proceed until after a first, prior action is complete. For example, the direct action API 116 can identify a deadlock condition when the first action is a movie action (watching a movie in a theater) and a second action is transport home via a car share service after the movie is over. The direct action API 116 can determine a deadlock condition for the second action (e.g., the ride home) that lasts until a time associated with the first action, such as a scheduled end time of the movie. The direct action API 116 or other component such as the interface 115 can prevent transmission of the data transmission to a service provider computing device (e.g., a car share service) responsive to the deadlock condition. For example, the data processing system 101 or component thereof can prevent transmission of data packets of the data transmission (or data structure) for the action (e.g., to reserve a car) to a service provider device 148 (e.g., of a car share service) during the time period of the deadlock condition. This prevents the service provider device 148 from receiving the request for a car (or other service) too early.

The direct action API 116 can obtain an indication or otherwise determine that the deadlock condition has terminated or no longer exists. For example, the direct action API 116 can query the service provider device 148 or other third party computing device to determine a scheduled end time of a movie or other action. Upon arrival of this time, or within a threshold time period (e.g., 30 minutes or 5 minutes) in advance of this time the direct action API can break, release, or terminate the deadlock condition. Subsequent to expiration of the deadlock condition the data processing system 101 can transmit (e.g., via the interface 146) to the service provider device 148 data of the data transmission or data structure corresponding to a subsequent action such as a ride home after the movie.

The direct action API 116 can receive an indication form the client device 110 to terminate the deadlock condition. For example, the end user may decide to leave the movie early, before the movie is finished, and can enter an input audio signal into the client computing device, e.g., "OK, this movie stinks, I'd like a ride home please". The data processing system 101 (e.g., the NLP component 110 or the direct action API 116) can determine from this input audio signal that the deadlock condition has expired, and can transmit data for the subsequent action to the service provider device 148. Subsequent to release of the deadlock condition the direct action API 116 can also provide data for an action (e.g., data of a data transmission or action data structure of the single thread 1000) to the third-party content server 102 to obtain a content item related to the post-deadlock action. The content item can be provided by the data processing system 101 or by the third-party content server 102 to the client device 110 for rendering. The content item can indicate, for example, "Sorry to hear about the movie, would you like to order a car from a car share company?". The content selection system 108 (or other component such as the interface 146 or the direct action API 116) can block selection of the content item, or transmission of the selected content item to the client device 110, responsive to a deadlock condition or until release of the deadlock condition.

The direct action API 116 can modify sequential orders of actions indicated by the single thread 1000. For example, the direct action API can determine an indication of a first sequential order, e.g., a first action, a second action subsequent to the first action, and a third action subsequent to the second action (dinner, then a movie, then a ride home). The direct action API 116 and other components such as the NLP component 110 and the interface 115 can receive a request to modify the sequential order. For example, the data processing system 101 can receive in input audio signal from the client computing device of "OK I'd like to eat dinner after the movie." The direct action API 116 (or NLP component 110) can obtain from this audio input signal a request to modify the sequential order of the actions to, for example, a movie, then dinner, then a ride home. From this information, the direct action API 116 can generate a modified sequential order so that the second action (watching the movie) is now scheduled to occur prior to the first action (eating dinner). The direct action API 116 or content selection system 108 (or other components) can proceed accordingly to transmit data transmission of the movie action prior to data transmissions of the dinner action to the third-party content server 102 or the service provider device 148. The direct action API 116 can also identify or modify a deadlock condition to delay operations related to the dinner action based on an end time of the first movie action. The actions of dinner, movies, and transport are examples and any number of end user activities or requests can constitute actions. The modifications can occur responsive to inputs other than the input audio signal. For example, if tickets to the 9 pm movie (after dinner) are sold out, the data processing system 101 can provide an audio output for rendering at the client device 110 to suggest watching a movie (e.g., the 5 pm showing) prior to dinner.

The data processing system 101 can perform offline action. This can save processing and electrical power requirements and reduce or shift network traffic to off-peak times. For example, the single thread 1000 can indicate a first action and a second subsequent action that depends on resolution of the first action. These actions can be days or weeks (or more) apart from one another, such as buying a plane ticket (first action, today) for a three week tropical beach vacation that will occur six months in the future, and booking scuba lessons for the last day of the vacation (second action, more than six months away). The direct action API 116 can communicate in real time with the service provider device 148 corresponding to an airline entity responsive to receipt of the input audio signal to buy the plane tickets in an online action to effect a conversion—the purchase of the plane tickets. The second action in this example remains six months away. Over this six month period or other time window the direct action API 116 or other component such as the content selection system 108 can select content items or perform other operations responsive to the second action (scuba lessons). For example, the direct action API can obtain offline by obtaining this information from the data repository 124 or from a third party data repository relating to scuba lessons. The offline action may or may not be in real time, and an offline action does not require time separation (e.g., six months) between actions. For example, the data processing system 101 can obtain information responsive to actions from the data repository 124 or from a third party database in a real time, as part of a communication session or synchronous or asynchronous conversation with the client computing device.

Figure 12:
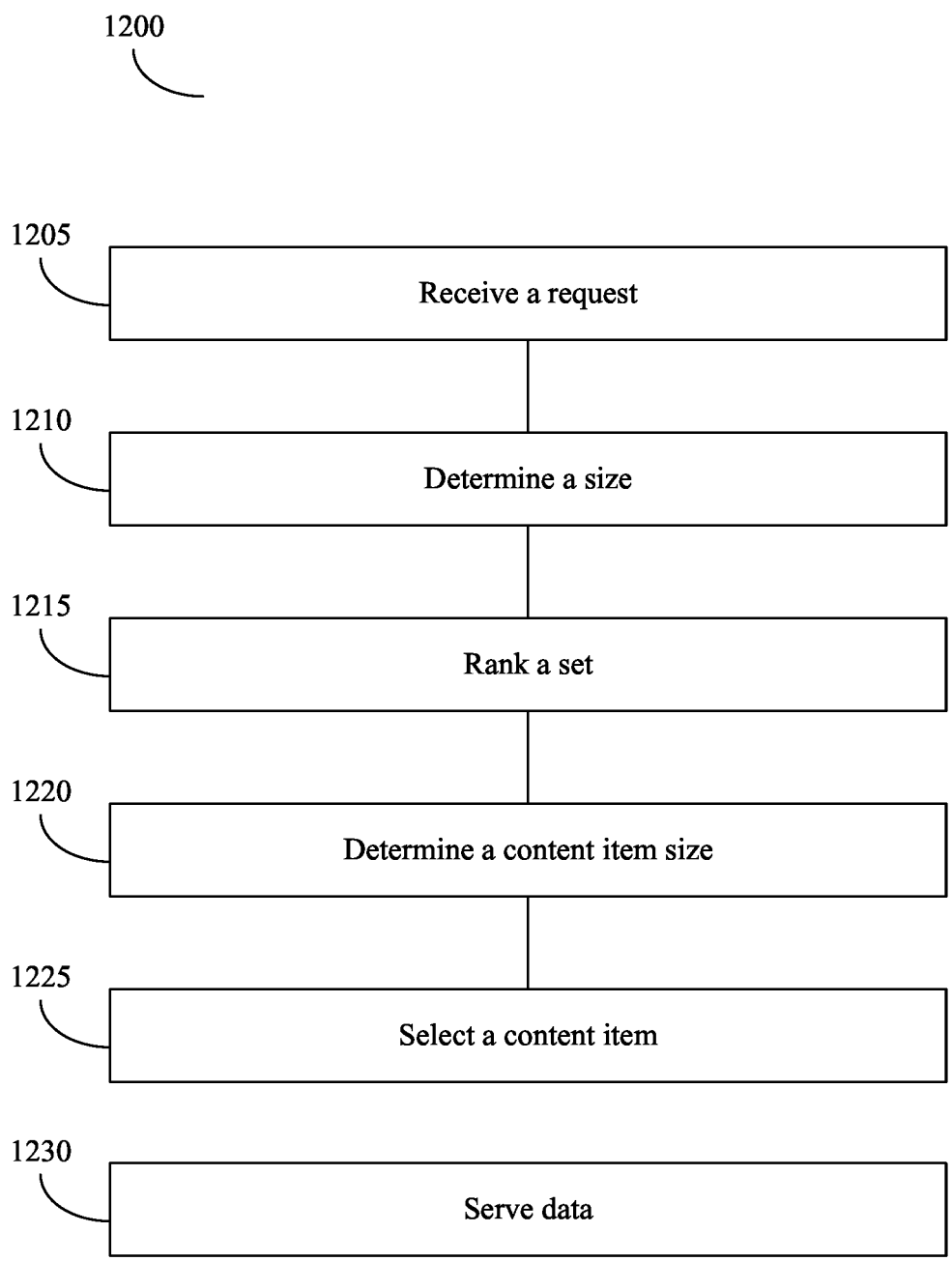
FIG. 12 depicts a method of serving content.

FIG. 12 depicts a method of serving content. The method 1200 can be performed by one or more system or component depicted in FIG. 1A, FIG. 1B, FIG. 8, FIG. 9, FIG. 10, or FIG. 11. For example, method 1200 can be performed by data processing system 101, content selection system 108, client device 110, or thread optimization component 150.

At Act 1205, the data processing system can receive a request. The request can be a request for content. The data processing system can receive the request responsive to a resource loading for presentation via the client. For example, the request can be responsive to the resource being selected and provided for presentation via the client device. The resource can include an online web page, audio content or multimedia content. For example, the resource can include audio output provided by an audio signal generator component 122, an NLP component 112, or NLP component 142.

At Act 1210, the data processing system can determine a size. The data processing system can determine the size of a slot and a parameter of a resource. The slot can refer to a viewport and the parameter can include a width and a height of the resource. In some cases, the parameter can refer to a parameter of an element in the resource, such as the width and height of a parent element in the resource. The data processing system can determine the size of the viewport based on one or more retrieved values for the width and the height of the parent element of the resource.

The data processing system can determine that the slot refers to or includes an audio slot, the parameter includes a duration, and the resources includes audio output. The duration can refer to a length of time of an audio output, sequence, series of actions, thread, task, or other duration. The data processing system can determine the size of the audio slot based on the duration of the audio output. For example, the duration of the audio slot can be determined not to exceed the duration of the audio output or not to exceed a percentage of the audio output (e.g., 5%, 10%, 15%, 20%, 25%, 30%, 40%, 50%, 60%, 70%, 80%, or more). For example, the data processing system can determine a first duration of an audio slot and a second duration of a resource comprising an audio output. The data processing system can rank each predetermined standard size based on a duration of each predetermined standard size, an estimated revenue value of each predetermined standard size, and a ratio match value. The data processing system can base the ratio match value on a ratio of the first duration of the audio slot and the second duration of the audio output.

In some cases, the data processing system can determine the size of the audio slot based on the duration of the thread. For example, the resource can include a single thread merged based on a sequence dependency parameter. The data processing system can determine the size of the audio slot based on the duration of the single thread.

At Act 1215, the data processing system can rank a set. The data processing system can rank each predetermined standard size of a set of predetermined standard sizes based, at least in part, on the size of the slot and the parameter of the resource. The data processing system can determine not to rank a second predetermined standard size of the set of predetermined standard sizes based on the second predetermined standard size greater than a predetermined percentage of the size of the slot. For example, the data processing system can determine a ratio of a first duration of the predetermined size to a second duration of the audio output and determine that the ratio is greater than a predetermined percentage, such as, for example (e.g., 5%, 10%, 15%, 20%, 25%, 30%, 40%, 50%, 60%, 70%, 80%, or more). By not including for rank such predetermined size, the data processing system can filter out excessive content items that may consume excessive resources, such as computational resources, bandwidth, or battery power.

At Act 1220, the data processing system can determine a content item size. The data processing system can determine a content item size based on the ranking of each predetermined standard size of the set of predetermined standard sizes.

At Act 1225, the data processing system can select a content item. For example, the data processing system can determine a set of content items based, at least in part, on the content item size. The data processing system can select, from the set of content items based on the content item size, a content item.

The data processing system can select the content item using a content selection process. The data processing system can identify the set of content items using the content selection process, and then select the content item based on the content item size. For example, the data processing system can receive data packets comprising an input audio signal detected by a sensor of a client device. The data processing system can parse the input audio signal to identify a request and a trigger keyword corresponding to the request. The data processing system can select, based on the trigger keyword and the content item size, the content item via a real-time content selection process.

In another example, the data processing system can receive data packets carrying auditory signals transmitted between the client device and a conversational application programming interface that established a communication session with the client device responsive to interaction with the content item. The data processing system can measure a duration of the communication session based on the auditory signals. The data processing system can select a second content item based on the duration of the communication session.

In another example, the data processing system can receive data packets carrying auditory signals transmitted between the client device and a conversational application programming interface that established a communication session with the client device responsive to interaction with the content item. The data processing system can measure the size of the communication session based on the auditory signals. The data processing system can generate a quality signal based on the measured characteristic. The data processing system can adjust a real-time selection process based on the quality signal At Act 1230, the data processing system can serve data. The data processing system can serve, to the client device, data to effect presentation of the content item in the resource.

For example, the data processing system can determine the size of an audio slot based on the duration of a thread. The data processing system can determine for a thread, such as wedding plan, that can run for an extended period of time that an audio slot can be longer. For example, a wedding planning thread can run for several months or a year, whereas a thread for invoking a ride service to request a ride may run for an hour. In the event the data processing system determines the thread runs for an extended duration, such as several months or a year or more, the data processing system can determine the audio slot size to be longer as compared to a short thread. For example, the data processing system can set the audio slot size for the wedding planning thread to be 1 minute, 90 seconds, 2 minutes, 3 minutes, 4 minutes, or more, whereas the data processing system can set the audio slot for the ride service thread to be 30 seconds, 45 seconds, 1 minute or more such that the audio slot for the shorter thread is shorter than the audio slot for the longer thread.

Although an implementation of a computing system 800 has been described in FIG. 8, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus," "computing device," "processing circuit," or "processing module" encompass all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A system, comprising:
a data processing system including one or more processors coupled to memory to:
receive data packets comprising an input audio signal detected by a sensor of a client device;
parse the input audio signal to identify a request and a trigger keyword corresponding to the request;
identify a resource for presentation via a client device;
identify a size of a slot of the resource;
determine a content item size based on a comparison between the size of the slot and one or more standard sizes for the resource;
determine a set of content items based, at least in part, on the content item size;
select, from the set of content items based on the content item size and the trigger keyword, a content item via a real-time content selection process; and
serve, to the client device, data to cause presentation of the content item in the resource.

2. The system of claim 1, comprising:
the data processing system to receive, from the client device, a request for content responsive to the resource for presentation via the client device.

3. The system of claim 1, comprising the data processing system to:
identify a parameter of the resource; and
determine the content item size based on the parameter of the resource.

4. The system of claim 3, comprising:
the data processing system to determine the content item size based on a comparison between the size of the slot and the one or more standard sizes and the parameter of the resource.

5. The system of claim 3, wherein the slot comprises an audio slot, the parameter comprises a duration, and the resource comprises an audio output.

6. The system of claim 5, comprising:
the data processing system to determine the size of the audio slot based on the duration of the audio output.

7. The system of claim 3, wherein the slot comprises an audio slot, the parameter comprises a duration, and the resource comprises a thread, comprising the data processing system to:
determine the size of the audio slot based on the duration of the thread.

8. The system of claim 3, wherein the slot comprises an audio slot, the parameter comprises a duration, and the resource comprises a single thread merged based on a sequence dependency parameter, comprising the data processing system to:
determine the size of the audio slot based on the duration of the single thread.

9. The system of claim 1, comprising the data processing system to:
receive data packets carrying auditory signals transmitted between the client device and a conversational application programming interface that established a communication session with the client device responsive to interaction with the content item;
measure a duration of the communication session based on the auditory signals; and
select a second content item based on the duration of the communication session.

10. A method, comprising:
receiving, by a data processing system including one or more processors coupled to memory, data packets comprising an input audio signal detected by a sensor of a client device;
parsing, by the data processing system, the input audio signal to identify a request and a trigger keyword corresponding to the request;
identifying, by the data processing system, a resource for presentation via a client device;
identifying, by the data processing system, a size of a slot of the resource;
determining, by the data processing system, a content item size based on a comparison between the size of the slot and one or more standard sizes for the resource;
determining, by the data processing system, a set of content items based, at least in part, on the content item size;
selecting, by the data processing system, from the set of content items based on the content item size and the trigger keyword, a content item via a real-time content selection process; and
serving, by the data processing system to the client device, data to cause presentation of the content item in the resource.

11. The method of claim 10, comprising:
receiving, by the data processing system from the client device, a request for content responsive to the resource for presentation via the client device.

12. The method of claim 10, comprising:
identifying, by the data processing system, a parameter of the resource; and
determining, by the data processing system, the content item size based on the parameter of the resource.

13. The method of claim 12, comprising:
determining, by the data processing system, the content item size based on a comparison between the size of the slot and the one or more standard sizes and the parameter of the resource.

14. The method of claim 12, wherein the slot comprises an audio slot, the parameter comprises a duration, and the resource comprises an audio output.

15. The method of claim 14, comprising:
determining, by the data processing system, the size of the audio slot based on the duration of the audio output.

16. The method of claim 12, wherein the slot comprises an audio slot, the parameter comprises a duration, and the resource comprises a thread, comprising:
determining, by the data processing system, the size of the audio slot based on the duration of the thread.

17. The method of claim 12, wherein the slot comprises an audio slot, the parameter comprises a duration, and the resource comprises a single thread merged based on a sequence dependency parameter, comprising:
determining, by the data processing system, the size of the audio slot based on the duration of the single thread.

18. The method of claim 10, comprising:
receiving, by the data processing system, data packets carrying auditory signals transmitted between the client device and a conversational application programming interface that established a communication session with the client device responsive to interaction with the content item;
measuring, by the data processing system, a duration of the communication session based on the auditory signals; and selecting, by the data processing system, a second content item based on the duration of the communication session.

19. A system, comprising:
a data processing system including one or more processors coupled to memory to:
  identify a resource for presentation via a client device;
  identify a parameter of the resource;
  identify a size of a slot of the resource;
  determine a content item size based on a comparison between the size of the slot and one or more standard sizes for the resource, wherein the content item size is determined based on the parameter of the resource;
  determine a set of content items based, at least in part, on the content item size;
  select, from the set of content items based on the content item size, a content item; and
  serve, to the client device, data to cause presentation of the content item in the resource;
wherein the slot comprises an audio slot, the parameter comprises a duration, and the resource comprises a thread, the system comprising the data processing system to determine the size of the audio slot based on the duration of the thread.

20. A system, comprising:
a data processing system including one or more processors coupled to memory to:
  identify a resource for presentation via a client device;
  identify a parameter of the resource;
  identify a size of a slot of the resource;
  determine a content item size based on a comparison between the size of the slot and one or more standard sizes for the resource, wherein the content item size is determined based on the parameter of the resource;
  determine a set of content items based, at least in part, on the content item size;
  select, from the set of content items based on the content item size, a content item; and
  serve, to the client device, data to cause presentation of the content item in the resource;
wherein the slot comprises an audio slot, the parameter comprises a duration, and the resource comprises a single thread merged based on a sequence dependency parameter, the system comprising the data processing system to determine the size of the audio slot based on the duration of the single thread.

21. A system, comprising:
a data processing system including one or more processors coupled to memory to:
  identify a resource for presentation via a client device;
  identify a parameter of the resource;
  identify a size of a slot of the resource;
  determine a content item size based on a comparison between the size of the slot and one or more standard sizes for the resource, wherein the content item size is determined based on the parameter of the resource;
  determine a set of content items based, at least in part, on the content item size;
  select, from the set of content items based on the content item size, a content item;
  serve, to the client device, data to cause presentation of the content item in the resource;
  receive data packets carrying auditory signals transmitted between the client device and a conversational application programming interface that established a communication session with the client device responsive to interaction with the content item;
  measure a duration of the communication session based on the auditory signals; and
  select a second content item based on the duration of the communication session.

* * * * *